US011736973B2

(12) United States Patent
Alkurd et al.

(10) Patent No.: US 11,736,973 B2
(45) Date of Patent: Aug. 22, 2023

(54) ENABLING WIRELESS NETWORK PERSONALIZATION USING ZONE OF TOLERANCE MODELING AND PREDICTIVE ANALYTICS

(71) Applicant: CARLETON UNIVERSITY, Ottawa (CA)

(72) Inventors: Rawan Alkurd, Ottawa (CA); Halim Yanikomeroglu, Ottawa (CA); Ibrahim Abu Alhaol, Ottawa (CA)

(73) Assignee: CARLETON UNIVERSITY

( * ) Notice: Subject to any disclaimer, the term of this patent is extended or adjusted under 35 U.S.C. 154(b) by 0 days.

(21) Appl. No.: 17/188,683

(22) Filed: Mar. 1, 2021

(65) Prior Publication Data
US 2021/0266781 A1 Aug. 26, 2021

Related U.S. Application Data

(63) Continuation-in-part of application No. PCT/CA2019/051197, filed on Aug. 29, 2019.
(Continued)

(51) Int. Cl.
*H04W 28/02* (2009.01)
*H04W 28/24* (2009.01)
*H04W 72/54* (2023.01)

(52) U.S. Cl.
CPC ....... *H04W 28/0268* (2013.01); *H04W 28/24* (2013.01); *H04W 72/54* (2023.01)

(58) Field of Classification Search
CPC . H04W 28/0268; H04W 28/24; H04W 72/08; H04W 72/087; H04L 41/0895;
(Continued)

(56) References Cited

U.S. PATENT DOCUMENTS 7,512,545 B2  3/2009  Knott et al.
8,751,305 B2  6/2014  Manoogian, III
(Continued)

FOREIGN PATENT DOCUMENTS

CN    102662764    9/2012 ............... G06F 9/50
CN    102932308    2/2013 ............. H04L 27/26
(Continued)

OTHER PUBLICATIONS

R. Schoenen and H. Yanikomeroglu, "User-in-the-loop: spatial and temporal demand shaping for sustainable wireless networks," IEEE Commun. Mag., vol. 52, No. 2, pp. 196-203, Feb. 2014.
(Continued)

*Primary Examiner* — Charles C Jiang
*Assistant Examiner* — Shawn D Miller
(74) *Attorney, Agent, or Firm* — Hayes Soloway P.C.

(57) ABSTRACT

The subject application relates to telecommunication networks and more particularly, to a method and system for managing and allocating wireless network resources to optimize User satisfaction. One aspect of the invention is directed to a system comprising a wireless base station; a user device; and a wireless network connecting said wireless base-station to said user device; said wireless base station being operable: to employ a 'zone of tolerance' to model user satisfaction; and to respond to a request from said user device to access network resources, by allocating network resources based on said 'zone of tolerance' model. Other aspects of the invention are also shown and described including a system and method of allocating network resources based on an AI-Enabled and Big Data-Driven Multi-Objective Optimization Process.

18 Claims, 26 Drawing Sheets

Related U.S. Application Data

(60) Provisional application No. 63/057,560, filed on Jul. 28, 2020, provisional application No. 62/724,195, filed on Aug. 29, 2018.

(58) Field of Classification Search
CPC ... H04L 41/149; H04L 41/40; H04L 41/0806; H04L 41/16; H04L 41/5054; H04L 41/5067; H04L 43/028; H04L 43/0805; H04L 43/0852; H04L 43/0894; H04L 41/0823; H04L 41/145; H04L 41/147
See application file for complete search history.

(56) References Cited

U.S. PATENT DOCUMENTS

| | | |
|---|---|---|
| 9,819,610 B1 * | 11/2017 | Crump ............... G06V 40/172 |
| 2005/0169453 A1 | 8/2005 | Knott et al. ............. 379/265.02 |
| 2014/0122594 A1 * | 5/2014 | Uzunalioglu ....... H04L 41/5067 709/204 |
| 2014/0229210 A1 | 8/2014 | Sharifian et al. ...... G06Q 10/06 |
| 2018/0143858 A1 * | 5/2018 | Sanjabi ................. G06F 9/5061 |
| 2018/0349514 A1 * | 12/2018 | Alzate Perez .... G06F 16/90332 |
| 2019/0280530 A1 * | 9/2019 | Navarro .................. H02J 50/23 |
| 2019/0312791 A1 * | 10/2019 | Ligata ..................... H04L 47/24 |

FOREIGN PATENT DOCUMENTS

| | | | |
|---|---|---|---|
| JP | 201249598 | 3/2012 | ............ H04W 72/08 |
| WO | WO2020041883 | 5/2020 | ............ H04Q 72/08 |

OTHER PUBLICATIONS

Y. Bao, H. Wu, and X. Liu, "From prediction to action: Improving user experience with data-driven resource allocation," IEEE J. Sel. Areas Commun, vol. 35, No. 5, pp. 1062-1075, May 2017.

X. Hu, J. Cheng, M. Zhou, B. Hu, X. Jiang, Y. Guo, K. Bai, and F. Wang, "Emotion-aware cognitive system in multi-channel cognitive radio ad hoc networks," IEEE Commun. Mag., vol. 56, No. 4, pp. 180-187, Apr. 2018.

C. Corneanu, F. Noroozi, D. Kaminska, T. Sapinski, S. Escalera, and G. Anbarjafari, "Survey on emotional body gesture recognition," IEEE Transactions on Affective Computing, pp. 1-1, Oct. 2018.

S. Li and W. Deng, "Reliable crowdsourcing and deep locality-preserving learning for unconstrained facial expression recognition," IEEE Trans. Image Process, vol. 28, No. 1, pp. 356-370, Sep. 2018.

A. Parasuraman, V. A. Zeithaml, and L. L. Berry, "A conceptual model of service quality and its implications for future research," The Journal of Marketing, pp. 41-50, Oct. 1985.

A. Kaloxylos, "A survey and an analysis of network slicing in 5G networks," IEEE Communications Standards Magazine, vol. 2, No. 1, pp. 60-65, Mar. 2018.

P. Christen and A. Pudjijono, "Accurate synthetic generation of realistic personal information," in Proc. 2009 Pacific-Asia Conference on Knowledge Discovery and Data Mining, Bangkok, Thailand, Apr. 2009, pp. 507-514.

R. Alkurd, I. Abualhaol, and H. Yanikomeroglu. A synthetic user behavior dataset design for data-driven AI-based personalized wireless networks. [Online]. Available: https://github.com/rawanalkurd/Personalization-Framework-Datasets.

D. Anguita, A. Ghio, L. Oneto, X. Parra, and J. L. Reyes-Ortiz, "A public domain dataset for human activity recognition using smartphones." in Proc. 2013 European Symposium on Artificial Neural Networks, Computational Intelligence and Machine Learning (ESANN), Bruges, Belgium, Apr. 2013, pp. 437-442.

R. Kwan, C. Leung, and J. Zhang, "Resource allocation in an LTE cellular communication system," in Proc. of the IEEE International Conference on Communications (ICC), 2009, pp. 1-5.

A. Parasuraman, V. A. Zeithaml, and L. L. Berry, "Alternative scales for measuring service quality: A comparative assessment based on psychometric and diagnostic criteria," Journal of Retailing, vol. 70, No. 3, pp. 201-230, 1994.

H. Gjoreski, M. Ciliberto, F. J. O. Morales, D. Roggen, S. Mekki, and S. Valentin, "A versatile annotated dataset for multimodal locomotion analytics with mobile devices," in Proc. of the 15th ACM Conference on Embedded Network Sensor Systems, 2017, p. 61.

M. Haas and W. H. Kunz, "How to master the challenges of service mass customization: a persona-based approach," in Handbook of Research in Mass Customization and Personalization. World Scientific, 2010, pp. 603-621.

J. Li, M. Galley, C. Brockett, G. P. Spithourakis, J. Gao, and B. Dolan, "A persona-based neural conversation model," arXiv preprint arXiv:1603.06155, 2016.

S. Kujala and M. Kauppinen, "Identifying and selecting users for user-centered design," in Proc. of the Third Nordic Conference on Human-Computer Interaction. ACM, 2004, pp. 297-303.

A. Shahri, M. Hosseini, M. Almaliki, K. Phalp, J. Taylor, and R. Ali, "Engineering software-based motivation: a persona-based approach," in Proc. 2016 IEEE Tenth International Conference on Research Challenges in Information Science (RCIS), Jun. 2016, pp. 1-12.

R. Sinha, "Persona development for information-rich domains," in Proc. CHI'03 Extended Abstracts on Human Factors in Computing Systems. ACM, 2003, pp. 830-831.

F. Tanudjaja and L. Mui, "Persona: a contextualized and personalized web search," in Proc. of the 35th Annual Hawaii International Conference on System Sciences, Jan. 2002, pp. 1232-1240.

J. An, H. Kwak, and B. J. Jansen, "Validating social media data for automatic persona generation," in Proc. 2016 IEEE/ACS 13th International Conference of Computer Systems and Applications (AICCSA), Nov. 2016, pp. 1-6.

N. Tu, X. Dong, P. P. Rau, and T. Zhang, "Using cluster analysis in Persona development," in Proc. 2010 8th International Conference on Supply Chain Management and Information, Oct. 2010, pp. 1-5.

A. Coates and A. Y. Ng, "The importance of encoding versus training with sparse coding and vector quantization," in Proc. of the 28th International Conference on Machine Learning (ICML-11), 2011, pp. 921-928.

T. Howley, M. G. Madden, M.-L. O'Connell, and A. G. Ryder, "The effect of principal component analysis on machine learning accuracy with high dimensional spectral data," in Proc. of 2005 International Conference on Innovative Techniques and Applications of Artificial Intelligence. Springer, 2005, pp. 209-222.

P. Baldi and K. Hornik, "Neural networks and principal component analysis: Learning from examples without local minima," Neural Networks, vol. 2, No. 1, pp. 53-58, 1989.

C. Zhang, P. Patras, and H. Haddadi, "Deep learning in mobile and wireless networking: A survey," IEEE Communications Surveys Tutorials, pp. 1-1, 2019.

M. A. Alsheikh, D. Niyato, S. Lin, H. Tan, and Z. Han, "Mobile big data analytics using deep learning and apache spark," IEEE Network, vol. 30, No. 3, pp. 22-29, May 2016.

P. Reichl, S. Egger, R. Schatz, and a. D'Alconzo, "The logarithmic nature of QoE and the role of the Weber-Fechner law in QoE assessment," in 2010 IEEE International Conference on Communications, May 2010, pp. 1-5.

N. Eswara, S. Ashique, A. Panchbhai, S. Chakraborty, H. P. Sethuram, K. Kuchi, A. Kumar, and S. S. Channappayya, "Streaming video QoE modeling and prediction: A long short-term memory approach," IEEE Transactions on Circuits and Systems for Video Technology, pp. 1-1, 2019.

X. Tao, Y. Duan, M. Xu, Z. Meng, and J. Lu, "Learning QoE of mobile video transmission with deep neural network: a data-driven approach," IEEE Journal on Selected Areas in Communications, pp. 1-1, 2019.

M. Lopez-Martin, B. Carro, J. Lloret, S. Egea, and A. Sanchez-Esguevillas, "Deep learning model for multimedia quality of experience prediction based on network flow packets," IEEE Communications Magazine, vol. 56, No. 9, pp. 110-117, Sep. 2018.

X. Tao, C. Jiang, J. Liu, A. Xiao, Y. Qian, and J. Lu, "QoE driven resource allocation in next generation wireless networks," IEEE Wireless Communications, vol. 26, No. 2, pp. 78-85, Apr. 2019.

(56) References Cited

OTHER PUBLICATIONS

V. Vasilev, J. Leguay, S. Paris, L. Maggi, and M. Debbah, "Predicting QoE factors with machine learning," in 2018 IEEE International Conference on Communications (ICC), May 2018, pp. 1-6.
P. Makris, D. N. Skoutas, and C. Skianis, "A survey on context-aware mobile and wireless networking: On networking and computing environments' integration," IEEE Communications Surveys Tutorials, vol. 15, No. 1, pp. 362-386, First 2013.
B. Xu, Y. Fu, Y. Jiang, B. Li, and L. Sigal, "Heterogeneous knowledge transfer in video emotion recognition, attribution and summarization," IEEE Transactions on Affective Computing, vol. 9, No. 2, pp. 255-270, Apr. 2018.
C. Wu and W. Liang, "Emotion recognition of affective speech based on multiple classifiers using acoustic-prosodic information and semantic labels," IEEE Transactions on Affective Computing, vol. 2, No. 1, pp. 10-21, Jan. 2011.
K. Wang, N. An, B. N. Li, Y. Zhang, and L. Li, "Speech emotion recognition using fourier parameters," IEEE Transactions on Affective Computing, vol. 6, No. 1, pp. 69-75, Jan. 2015.
N. Fourati and C. Pelachaud, "Perception of emotions and body movement in the emilya database," IEEE Transactions on Affective Computing, vol. 9, No. 1, pp. 90-101, Jan. 2018.
Z. Yang and S. S. Narayanan, "Modeling dynamics of expressive body gestures in dyadic interactions," IEEE Transactions on Affective Computing, vol. 8, No. 3, pp. 369-381, Jul. 2017.
C. Qing, R. Qiao, X. Xu, and Y. Cheng, "Interpretable emotion recognition using EEG signals," IEEE Access, vol. 7, pp. 94 160-94 170, 2019.
H. M. Nguyen, E. W. Cooper, and K. Kamei, "Borderline oversampling for imbalanced data classification," in Proc. fifth International Workshop on Computational Intelligence & Applications, vol. 2009, No. 1. IEEE SMC Hiroshima Chapter, 2009, pp. 24-29.
J. Duchi, E. Hazan, and Y. Singer, "Adaptive subgradient methods for online learning and stochastic optimization," Journal of Machine Learning Research, vol. 12, No. Jul, pp. 2121-2159, 2011.
D. P. Kingma and J. Ba, "Adam: A method for stochastic optimization," arXiv preprint arXiv:1412.6980, 2014.
N. Srivastava, G. Hinton, A. Krizhevsky, I. Sutskever, and R. Salakhutdinov, "Dropout: a simple way to prevent neural networks from over-fitting," The Journal of Machine Learning Research, vol. 15, No. 1, pp. 1929-1958, 2014.
J. Tang, X. Shu, R. Yan, and L. Zhang, "Coherence constrained graph lstm for group activity recognition," IEEE Transactions on Pattern Analysis and Machine Intelligence, pp. 1-1, 2019.
M. Chen, Y. Zhang, Y. Li, S. Mao, and V. C. M. Leung, "EMC: Emotion-aware mobile cloud computing in 5G," IEEE Network, vol. 29, No. 2, pp. 32-38, Mar. 2015.
R. Alkurd, I. Abualhaol, and H. Yanikomeroglu, "Big data-driven and AI-based framework to enable personalization in wireless networks," IEEE Communications Magazine, vol. 58, No. 3, pp. 18-24, Mar. 2020.
H. Takagi, "Interactive evolutionary computation: fusion of the capabilities of ec optimization and human evaluation," Proceedings of the IEEE, vol. 89, No. 9, pp. 1275-1296, Sep. 2001.
K. Deb, A. Sinha, P. J. Korhonen, and J. Wallenius, "An interactive evolutionary multiobjective optimization method based on progressively approximated value functions," IEEE Transactions on Evolutionary Computation, vol. 14, No. 5, pp. 723-739, Oct. 2010.
R. Alkurd, I. Abualhaol, and H. Yanikomeroglu, "User satisfaction prediction framework for personalized networks: a deep neural network approach," submitted to 2020 IEEE Global Communications Conference (Globecom).
Yaochu Jin and J. Branke, "Evolutionary optimization in uncertain environments—a survey," IEEE Transactions on Evolutionary Computation, vol. 9, No. 3, pp. 303-317, Jun. 2005.
Y. Jin, M. Olhofer, and B. Sendhoff, "On evolutionary optimization with approximate fitness functions," in Proc. 2nd Annual Conference on Genetic and Evolutionary Computation (GECCO). Morgan Kaufmann Publishers Inc., 2000.
I. Loshchilov, M. Schoenauer, and M. Sebag, "A mono surrogate for multiobjective optimization," in Proc. the 12th Annual Conference on Genetic and Evolutionary Computation (GECCO), 2010.
B. Liu, Q. Zhang, and G. G. E. Gielen, "A Gaussian process surrogate model assisted evolutionary algorithm for medium scale expensive optimization problems," IEEE Transactions on Evolutionary Computation, vol. 18, No. 2, pp. 180-192, Apr. 2014.
O. Grøndalen, A. Zanella, K. Mahmood, M. Carpin, J. Rasool, and O. N. Østerbø, "Scheduling policies in time and frequency domains for LTE downlink channel: a performance comparison," IEEE Transactions on Vehicular Technology, vol. 66, No. 4, pp. 3345-3360, Apr. 2017.
J. Cho, Y. Wang, I. Chen, K. S. Chan, and A. Swami, "A survey on modeling and optimizing multi-objective systems," IEEE Communications Surveys Tutorials, vol. 19, No. 3, pp. 1867-1901, May 2017.
K. Deb, A. Pratap, S. Agarwal, and T. Meyarivan, "A fast and elitist multiobjective genetic algorithm: NSGA-II," IEEE Transactions on Evolutionary Computation, vol. 6, No. 2, Apr. 2002.
K. Deb and H. Jain, "An evolutionary many-objective optimization algorithm using reference-point-based nondominated sorting approach, part I: Solving problems with box constraints," IEEE Transactions on Evolutionary Computation, vol. 18, No. 4, pp. 577-601, Aug. 2014.
M. Basseur and E. Zitzler, "Handling uncertainty in indicator-based multiobjective optimization," International Journal of Computational Intelligence Research, vol. 2, No. 3, pp. 255-272, 2006.
E. Zitzler, M. Laumanns, and L. Thiele, "SPEA2: Improving the strength Pareto evolutionary algorithm," Eidgenössische Technische Hochschule Zürich (ETH), Institut für Technische, Tech. Rep., 2001.
B. L. Miller, D. E. Goldberg et al., "Genetic algorithms, tournament selection, and the effects of noise," Complex systems, vol. 9, No. 3, pp. 193-212, 1995.
A. Zhou, B.-Y. Qu, H. Li, S.-Z. Zhao, P. N. Suganthan, and Q. Zhang, "Multiobjective evolutionary algorithms: A survey of the state of the art," Swarm and Evolutionary Computation, vol. 1, No. 1, pp. 32-49, 2011.
S. Jiang, Y. Ong, J. Zhang, and L. Feng, "Consistencies and contradictions of performance metrics in multiobjective optimization," IEEE Transactions on Cybernetics, vol. 44, No. 12, pp. 2391-2404, Dec. 2014.
D. A. Van Veldhuizen and G. B. Lamont, "On measuring multiobjective evolutionary algorithm performance," in Proc. 2000 Congress on Evolutionary Computation (CEC00), Jul. 2000.
J. R. Schott, "Fault tolerant design using single and multicriteria genetic algorithm optimization." Air force Inst. of Tech. Wright-Patterson AFB OH, Tech. Rep., 1995.
E. Zitzler and L. Thiele, "Multiobjective evolutionary algorithms: a comparative case study and the strength pareto approach," IEEE Transactions on Evolutionary Computation, vol. 3, No. 4, pp. 257-271, Nov. 1999.
H. Li and Q. Zhang, "Multiobjective optimization problems with complicated Pareto sets, MOEA/D and NSGA-II," IEEE Transactions on Evolutionary Computation, vol. 13, No. 2, pp. 284-302, Apr. 2009.
E. Zitzler, L. Thiele, M. Laumanns, C. M. Fonseca, and V. G. da Fonseca, "Performance assessment of multiobjective optimizers: an analysis and review," IEEE Transactions on Evolutionary Computation, vol. 7, No. 2, pp. 117-132, Apr. 2003.
S. Garcia, D. Molina, M. Lozano, and F. Herrera, "A study on the use of non-parametric tests for analyzing the evolutionary algorithms' behaviour: a case study on the cec'2005 special session on real parameter optimization," Journal of Heuristics, vol. 15, No. 6, p. 617, May 2008.
International Search Report issued in corresponding PCT International Patent Application Serial No. PCT/CA2019/051197, dated Mar. 3,2020 (4 pages).
Written Opinion issued in corresponding PCT International Patent Application Serial No. PCT/CA2019/051197, dated Oct. 22,2019 (5 pages).

(56) References Cited

OTHER PUBLICATIONS

Preliminary Report on Patentability issued in corresponding PCT International Patent Application Serial No. PCT/CA2019/051197, dated Mar. 2, 2021 (6 pages).

* cited by examiner

Fig. 14

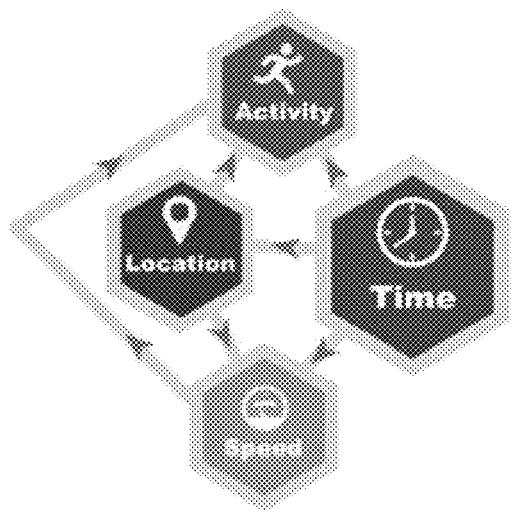
Fig. 15
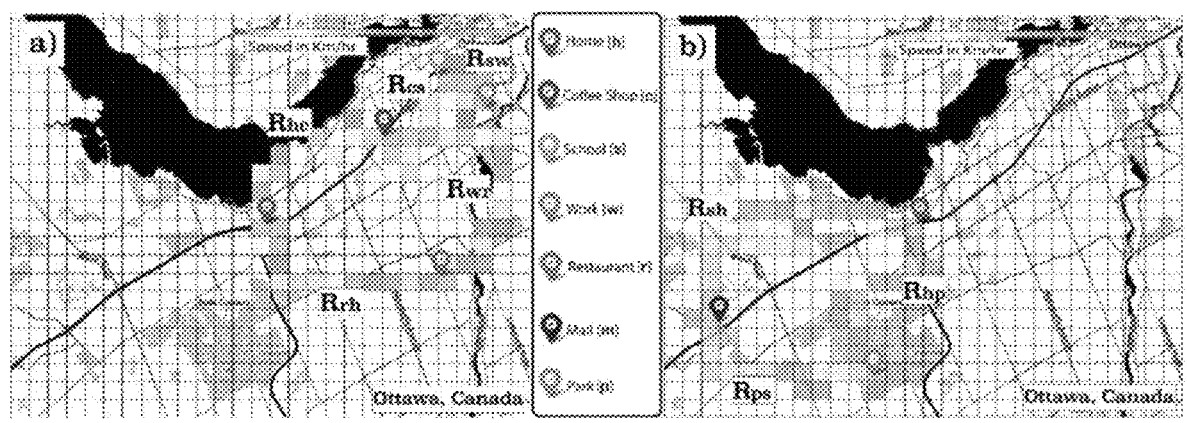
Fig. 16a
Fig. 16b

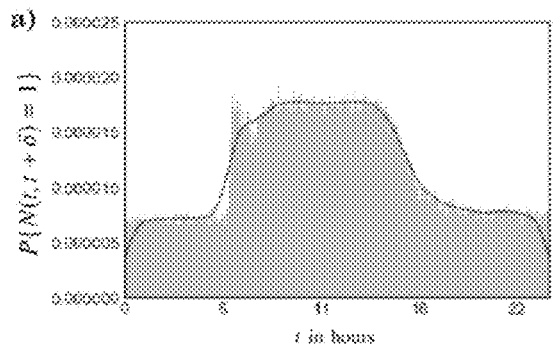
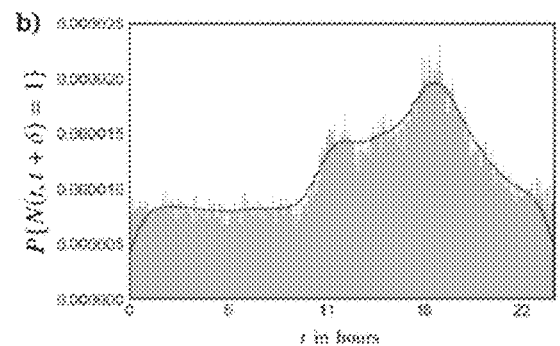
Fig. 19a  Fig. 19b
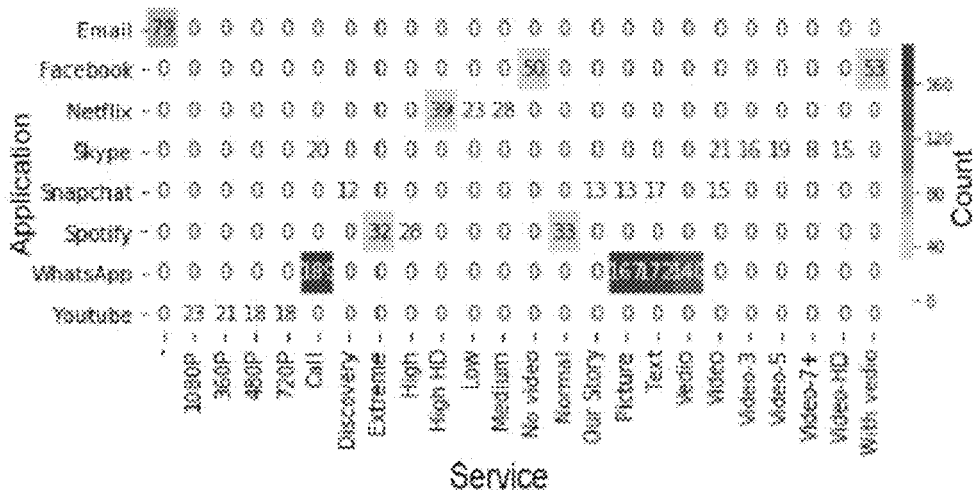
Fig. 20

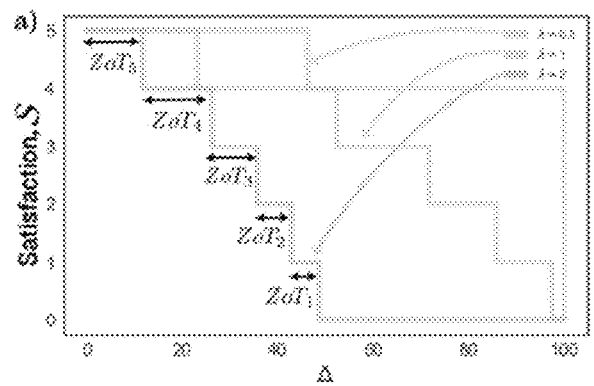
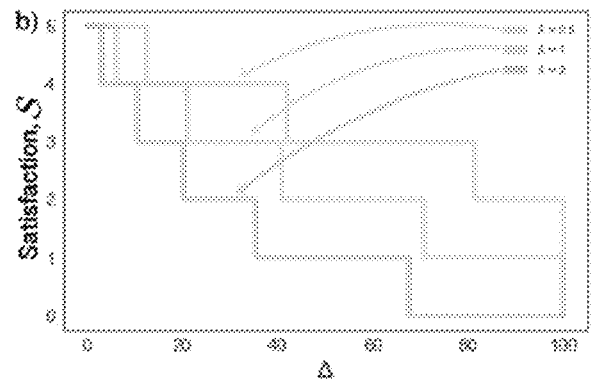
Fig. 21a          Fig. 21b
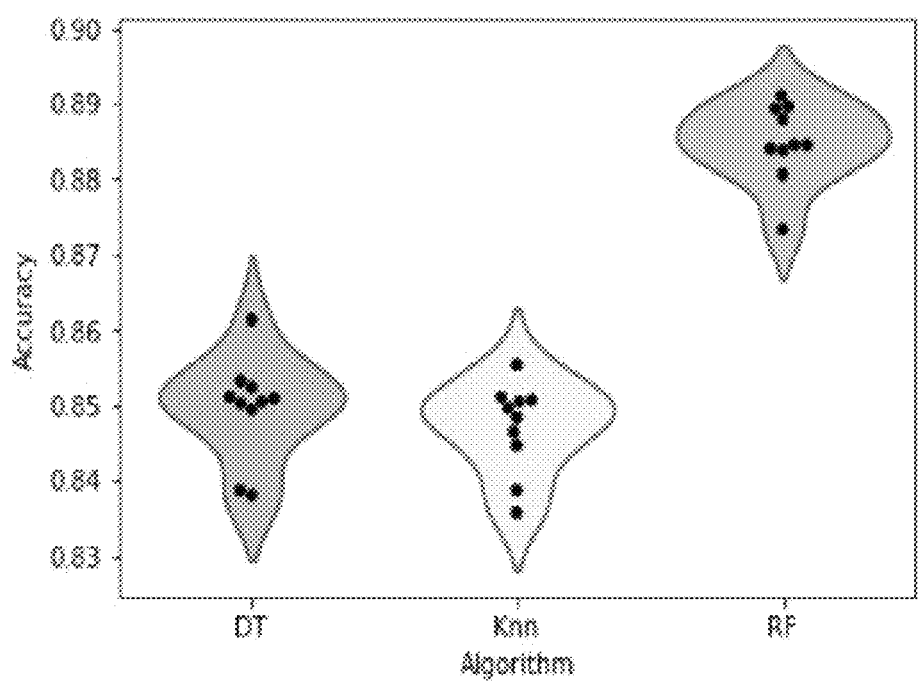
Fig. 22

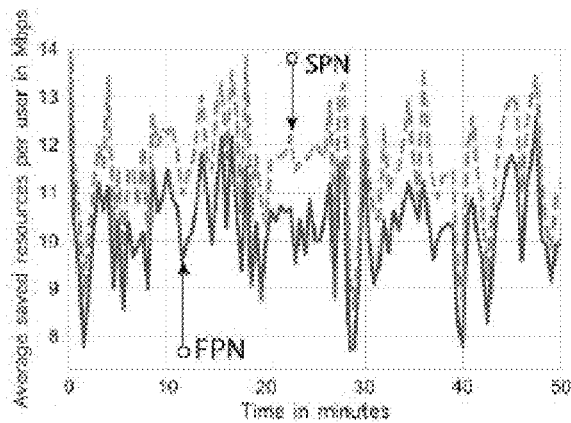
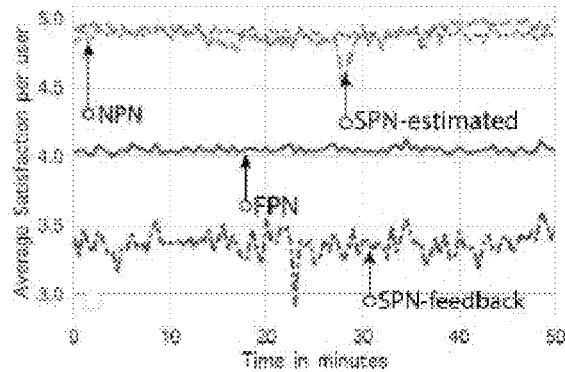
Fig. 43a                    Fig. 43b
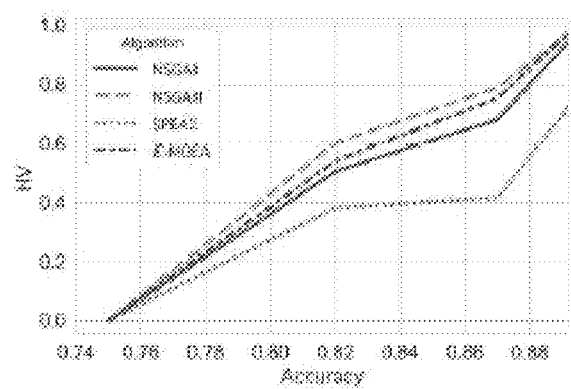
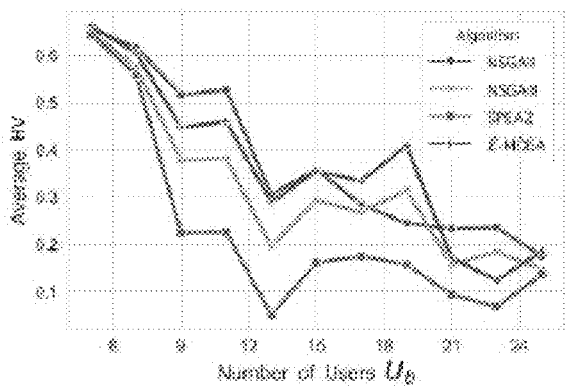
Fig. 44                    Fig. 45

ENABLING WIRELESS NETWORK PERSONALIZATION USING ZONE OF TOLERANCE MODELING AND PREDICTIVE ANALYTICS

CROSS REFERENCE TO RELATED APPLICATIONS

This application is a continuation-in-part of PCT International Patent Application Serial No. PCT/CA2019/051197, Filed Aug. 29, 2019, which claims benefit to U.S. Provisional Patent Application Ser. No. 62/724,195, filed Aug. 29, 2018. Additionally, this application claims benefit of U.S. Provisional Patent Application Ser. No. 63/057,560, filed Jul. 28, 2020, the contents of which are all incorporated herein by reference.

FIELD OF THE INVENTION

The subject application relates to telecommunication networks and more particularly, to a method and system for managing and allocating wireless network resources to optimize User satisfaction and resource utilization.

BACKGROUND OF THE INVENTION

Current wireless networks are over-provisioned to unnecessarily provide high Quality-of-Service (QoS) levels in order to achieve high satisfaction levels for all users. In certain contexts, some users may have lower QoS requirements, yet the network will always attempt to provide higher QoS levels, and consequently charge users more for the unnecessary high-quality services. Arguably, although this non-granular average-based single-objective approach is currently adopted by all operators, it is far from optimum and it is costing the majority of users more money for the provided extra bandwidth they do not need or use. In addition, this over-provisioned design will not be able to cope with the emerging network requirements as future wireless networks are designed to support the emerging bandwidth-hungry applications, such as Virtual Reality (VR), Augmented Reality (AR), and self-driving cars. Tackling the exploding rate demand issue by continuously investing in new infrastructure will eventually make wireless networks unprofitable or make network services very expensive.

Over the past decade, the convergence of Internet of Things (IoT) and Ambient Intelligence (AmI) technologies have paved the way for more connected, adaptive, proactive, and smart environments. However, human emotions and preferences are rarely taken into consideration. Users interact with technology through sight and sound; by 2025, it is envisioned that advanced technology will enable a full internet of senses, including touch, taste, smell, and mind. The emerging internet of senses technology will enable the transparent (i.e., without direct user feedback) integration of human emotions and preferences, which will improve the personalized user experience for various services and products.

In wireless networks, emotion-aware applications have proved to offer better user experience and improved systems efficiency. Examples of such applications include cognitive radio ad-hoc networks [3] and mobile cloud computing [58]. One of the main emerging emotion-aware applications in wireless networks is network personalization, in which user experience is greatly enhanced by providing services personalized to users' individual needs and expectations in continuously varying contexts.

Such applications require network services to be delivered with a variety of network performance characteristics (e.g., rate, latency, security, and quality of experience (QoE)) which will raise significant technical challenges for service providers. In addition, revenues associated with different services and application will widely vary which, in effect, will bring new business challenges. Current networks lack flexibility in balancing the implementation of cost-optimized and performance-optimized applications.

The evolving fifth generation (5G) wireless networks are envisioned to cope with these rising challenges while maintaining a profitable business and high end-user QoE. But as will be explained, they fall short of providing a complete solution. Network Function Virtualization (NFV) technology is proposed for 5G and beyond networks to isolate the software and hardware aspects of networks in order to transform network functions from dedicated hardware appliances to software-based applications running on commercial off-the-shelf equipment. Software Defined Networks (SDN) along with NFV are considered as enablers for Network Slicing (NS) in 5G. The concept of NS is proposed to allow operators to provide customized, reliable services with increased efficiency while reducing capital expenditure and the operating expenses of wireless networks. Each slice is associated with a set of resources including bandwidth and network topology. The differentiator of NS from the current QoS-based solution is its ability to provide an end-to-end virtual network for a given user. This level of flexibility cannot be offered by any of the current networks. For example, 4G networks can discriminate between VoIP traffic from other traffic types such as web browsing. On the other hand, 4G networks are not able to differentiate and customize the same type of traffic (e.g., VoIP) initiated by different users. The aforementioned shortcomings of the current networks are addressed by the features offered by NS in 5G and beyond networks. Service Slicing can be also utilized to deal with different types of services with different QoS requirements. Since wireless networks resources are extremely limited, services are sliced based on their QoS requirements and network scenario. QoS Requirements associated with each slice are decided based on the service associated with the slice. For instance, it has been suggested to define a service utility function for each service according to the service-specific constraints and QoS requirements.

But further optimization of the resources and increasing the network efficiency is needed, and in order to achieve this, an even more agile and flexible network is required. There is, therefore, a need for an improved method and system for providing wireless networks.

SUMMARY OF THE INVENTION

It is an object of the invention to provide an improved wireless network.

As explained above, further optimization of the resources and increasing the network efficiency is needed. The network described herein is more agile and flexible, and is able to micro-manage the resources within a slice and tailor them to the end user's specific needs and requirements. There are two main correlated objectives to be optimized in wireless networks: user satisfaction and resources. These objectives contradict each other and to maximize efficiency, the network should be optimized for both of them. However, since user satisfaction behavior information is not available in current networks, the range of QoS to achieve the required average user satisfaction for all users in most situations is predetermined and is fixed. Based on the specified QoS range for a particular service, networks are optimized to increase the efficiency of the resources. But this results in an inefficient system.

In comparison to current wireless networks, the described personalized networks provide a more efficient system, at the same time providing higher levels of User satisfaction. The improved network:

- Introduces a novel Zone-of-Tolerance (ZoT) based model to quantify user satisfaction in wireless networks.
- Introduces a synthetic dataset design that mimics real data with realistic characteristics which can be used to personalized wireless networks.
- Introduces deep network modeling with multi-phase persona and user satisfaction prediction.
- Introduces a framework to integrate personalization into wireless networks.
- We formulate the resource allocation problem as a data-driven multi-objective decision to enable networks to micro-manage and optimize resources, and users' satisfaction simultaneously based on each user's QoS requirement and user satisfaction behavior.

It is believed that this approach addresses the objectives of:

1) modeling user feedback uncertainty;
2) automating machine learning model selection, tuning, and real-time model validation;
3) modeling/synthesizing a representative data dataset;
4) augmenting and tuning the modeled dataset to be as close as possible to a real network data; and
5) formulating and solving a data-driven multi-objective optimization problem.

The proposed framework utilizes user satisfaction feedback to personalize the cellular network decisions and hence, micro-manages the available resources so that maximum user satisfaction is achieved with a minimum amount of resources. Saving resources is very valuable to the network since it can be utilized for more critical applications such as public safety and autonomous cars. In order to achieve the ultimate balance between network resources and user satisfaction, we answer the following questions:

1) How to measure user satisfaction in wireless networks
2) What type of data can be used to enable wireless network personalization
3) How to predict future user satisfaction levels
4) How to integrate personalization into wireless networks
5) How to use decisions made by personalized networks to make actions in the network One aspect of the invention avoids network over-provisioning by designing orthogonal networks which achieves the required user satisfaction levels using minimum resources, such as bandwidth and power.

Personalization is done using the proposed framework. The framework implements a multi-phase persona and user satisfaction prediction. Then, the output model is used by the network in order to optimize resources in a multi-objective manner; hence achieve the required user satisfaction using minimum resources. Embodiments of the invention include the following:

1) Personalized wireless networks utilize the non-intrusive real-time user satisfaction feedback in order to personalize wireless networks decisions and hence, micromanage the available resources so that the required personalized satisfaction levels are achieved with the minimum allocated resources.
2) In order to enable the utilization of user feedback (or user satisfaction) to personalize wireless networks, a way to measure and model the non-intrusive real-time user satisfaction feedback should be defined.
3) The availability of users behavior and context data is a requirement for the preferred embodiment of the personalized network. This data can be collected and analysed as described herein, or can be obtained from a third party.

The design and optimization of wireless networks have mostly been based on strong mathematical and theoretical modeling. Nonetheless, as novel applications emerge in the era of 5G and beyond, unprecedented levels of complexity will be encountered in the design and optimization of the network. Embodiments of the invention employ Artificial Intelligence (AI) for wireless network design and optimization due to the flexibility and adaptability it offers in solving extremely complex problems in real-time. One of the main future applications of AI is enabling user-level personalization for numerous use cases. AI will revolutionize the way humans interact with computers in which computers will be able to sense commands and emotions from humans in a non-intrusive manner, making the entire process transparent to users. By leveraging this capability, and accelerated by the advances in computing technologies, wireless networks can be redesigned to enable the personalization of network services to the user level in real-time.

While current wireless networks are being optimized to achieve a predefined set of quality requirements, the personalization technology described herein is supported by an intelligent big data-driven layer designed to micro-manage the scarce network resources. This layer provides the intelligence required to decide the necessary service quality that achieves the target satisfaction level for each user. Due to its dynamic and flexible design, the personalized networks of the invention may achieve unprecedented improvements in optimizing two contradicting objectives in wireless networks: saving resources and improving user satisfaction levels. This document presents some foundational background on the proposed network personalization technology and its enablers. Then, an AI-enabled big data-driven surrogate-assisted multi-objective optimization formulation is proposed and tested to illustrate the feasibility and prominence of this technology.

In a first aspect, the present invention provides a method of managing wireless network resources, comprising (a) establishing a model to quantize user satisfaction into a number of discrete QoS levels and (b) responding to a user request for network resources by identifying a context of the user request, determining a predicted satisfaction level based on said identified context using a surrogate machine learning process, determining a QoS level based on the predicted satisfaction level; satisfying the user request by allocating network resources based on said determined QoS level, capturing user satisfaction feedback, and using said user satisfaction feedback to adjust the surrogate machine learning process.

In one embodiment, the QoS model comprises a 'zone of tolerance' model where the range of quality of service (QoS) on a wireless network is divided into a number of discrete QoS levels.

In another embodiment, the QoS comprises at least one metric selected from the group consisting of: data rate, reliability, latency and jitter. In other embodiments, the step of determining a QoS level is determined by solving an Evolutionary Multi-Objective Optimization (EMOO) problem. In some embodiments, the EMOO problem comprises two objectives: maximizing resource savings in the network and maximizing average satisfaction for all users.

In another embodiment, the context comprises one or more of the parameters: time, day, location, speed, activity, service request arrival, application choice, application service choice, request rate demand, given rate, and Δ (the difference between desired quality of service level and offered quality of service level). In some embodiments, wherein the context comprises activity, and activity is predicted using machine learning from data collected using user sensors.

In other embodiments, the predicted satisfaction level is determined based on said context further comprises generating a dataset, which provides the predicted satisfaction level for a given set of context values. In other embodiments, the dataset that provides the predicted satisfaction level for a given set of context values is generated by: acquiring context data, associating the acquired context data with user satisfaction values; and measuring the correlation between the user satisfaction values and the service being used by the user. In some embodiments, the context data is acquired via monitoring sensors, aggregating and analyzing collected data, and predicting missing and future context information.

In other embodiments, user satisfaction values are obtained by capturing and sensing actual user satisfaction levels using sensors including microphones and cameras.

In other embodiments, user feedback is used to validate the predicted satisfaction level, error data being fed to the predictive model for relearning.

In still other embodiments, allocation of network resources may comprise allocating network resources as a Pareto-based multi-objective solution.

In other embodiments, the surrogate machine learning process comprises an algorithm selected from the group consisting of a NSGAII (non-dominated sorting evolutionary algorithm II), a NSGAIII (non-dominated sorting evolutionary algorithm III), a SPEA2 (Strength Pareto Evolutionary Algorithm 2)—a multi-objective evolutionary algorithm that incorporates the concept of elitism), and an ε-MOEA algorithm (an indicator-based multi-objective evolutionary algorithm).

In another aspect, the present invention relates to a system for managing wireless network resources comprising: a wireless base station, a user device operable to communicate with said wireless base station, and a wireless network for receiving user communications via said wireless base station, wherein said wireless base station is operable to effect the method of the first aspect, described above and herein.

In another aspect, the present invention relates to a system comprising: a wireless base station, a user device operable to communicate with said wireless base station, and a wireless network for receiving user communications via said wireless base station, wherein said the wireless network includes an intelligent, big data driven layer, operable to respond to a user request for network resources, by: identifying a context of the user request, determining a predicted satisfaction level based on said identified context, using a machine learning process, determining a QoS (Quality of Service) level based on the predicted satisfaction level, satisfying the user request by allocating network resources based on said determined QoS level, capturing user satisfaction feedback; and using said user satisfaction feedback to adjust the surrogate machine learning process In a final aspect, the present invention provides an improvement to a 5G network comprising a layer for micromanaging the resources within the 5G network and tailoring said resources to an end user's specific needs and requirements, resulting in greater agility and flexibility.

BRIEF DESCRIPTION OF THE DRAWINGS

These and other features of the invention will become more apparent from the following description, in which reference is made to the appended drawings, wherein:

FIG. 14 presents a table of exemplary sample instances from the proposed synthetic dataset.

FIG. 15 presents a block diagram showing the relationships between the features of time, location, speed, and activity, in an embodiment of the invention.

FIGS. 16a and 16b present a user speed heat map and the ring of locations for a weekday and a weekend day, respectively.

FIGS. 19a and 19b present the probability of request arrival (i.e., $P\{N(t, t+\delta)=1\}$) vs. t in hours for a weekday and a weekend day, respectively.

FIG. 20 presents a heat map of an instance count for the requested services and the corresponding applications over a week.

FIGS. 21a and 21b present exemplary Satisfaction mappers for $\psi=h$ and $\lambda=0.5$, 1, 2; and for $\psi=l$ and $\lambda=0.5$, 1, 2; respectively.

FIG. 22 presents an exemplary accuracy swarm plot for 10-folds cross-validation using DT, Knn, and RF algorithms.

FIGS. 43a and 43b present graphs showing simulation results of the Direct Feedback Personalized Network (FPN) and the Surrogate-assisted Personalized Network (SPN) for four network users, FIG. 43a showing the amount of saved resources (QoSNP–QoSP) by FPN and SPN for the four users vs. time in minutes, and FIG. 43b showing the average user satisfaction for the four users vs. time in minutes for SPN and FPN.

FIG. 44 presents a graph showing the average HV computed for different surrogate models with varying performance levels for NSGAII, NSGAIII, SPEA2, and ε-MOEA.

FIG. 45 presents a graph showing the number of users Ub vs. average HV for NSGAII, NSGAIII, SPEA2, and ε-MOEA.

Figure 1:
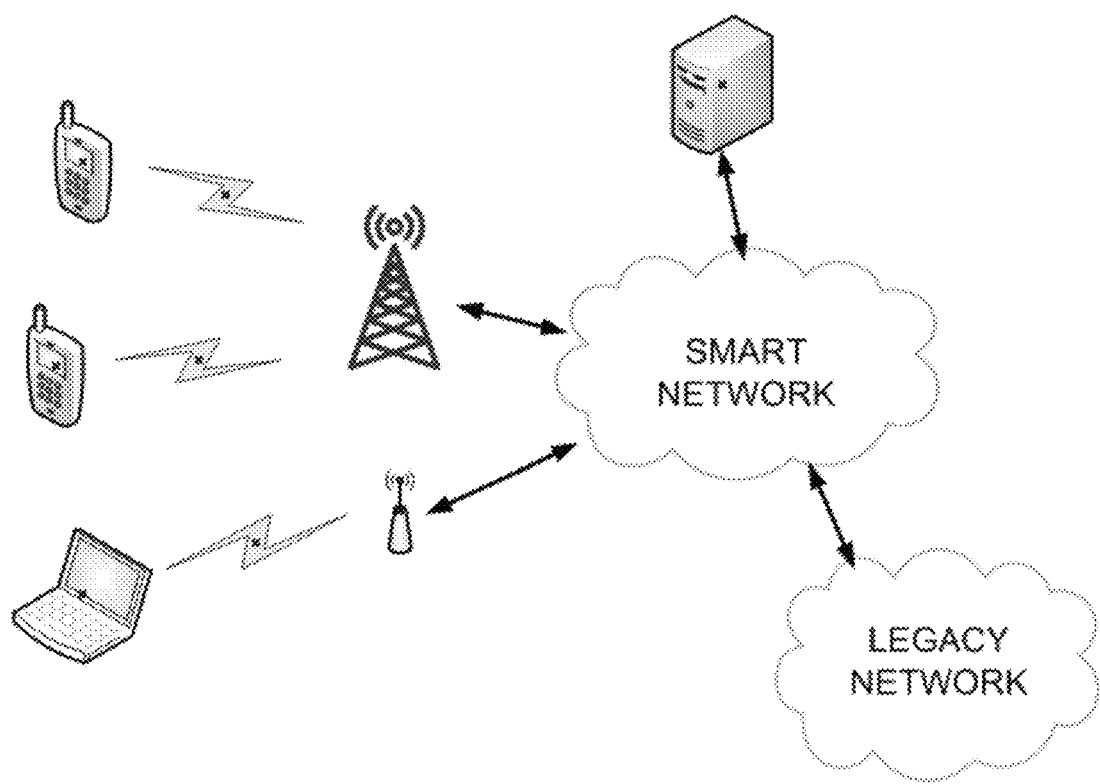
FIG. 1 presents a block diagram of an exemplary communication network for effecting the invention.

Table I sets out an exemplary set of simulation parameters.

Table II sets out exemplary weekdays and weekends location rings for the four user personas.

Table III presents an exemplary set of services and their associated demand rate for the considered set of applications.

Table IV sets out exemplary features of the CH dataset.

Table V sets out exemplary features of a WPP dataset in an embodiment of the invention.

Table VI: Features of the WPP Dataset.

Table VII: Performance of the adopted DNN design in terms of accuracy.

Table VIII: Cellular network simulation parameters.

Table IX: Statistical and Friedman test results.

Table X: Pairwise comparison of algorithms rejected by the posthoc tests.

DETAILED DESCRIPTION OF THE PREFERRED EMBODIMENTS OF THE INVENTION

One or more currently preferred embodiments have been described by way of example. It will be apparent to persons skilled in the art that a number of variations and modifications can be made without departing from the scope of the invention as defined in the claims.

As explained above, continuously advancing technology has contributed to a surge in data traffic, making user satisfaction the cardinal competitive advantage for all service providers. Besides user satisfaction, service providers try to make the most of the scarce resources available. In order to meet these objectives simultaneously, more agile, intelligent, and flexible networks are required. Such networks should be capable of micro-managing resources in a way that meets each user's expectations of the network while using a minimum amount of resources.

Current wireless telecommunication networks are designed based on worst-case scenarios, being over-engineered to achieve a minimum Quality-of-Service (QoS) value. But optimizing the wireless network based on worst-case scenarios decreases its efficacy and efficiency, and does not necessarily achieve the desired user satisfaction levels. The currently operating networks and the published literature do not consider any variation in the degree of user satisfaction and assume that all users will be satisfied with the same service performance level at all times.

The micro-management of network resources as described herein allows for wireless network personalization. Personalized networks optimize two correlated and contradicting objectives in real-time: user satisfaction and resource utilization. Naturally, wireless networks produce colossal amounts of data and most of this data is in real-time. A system that is capable of digesting these data to create relevant and meaningful decisions in real-time at the user level using machine learning (ML) and big data analytics is the ultimate solution to meeting the aforementioned objectives simultaneously. We refer to such a system as a big data-driven AI-based personalized wireless network. Enabling wireless network awareness of context data and user feedback data and, consequently, enabling wireless network personalization will bring substantial benefits to both users and service providers.

The system and methods of the invention are described in the context of a wireless communications network along the lines of that shown in FIG. 1, although they need not be so limited. As shown in FIG. 1, such a wireless communications network will typically comprise various wireless devices such as smart phones and laptop computers, which can access a smart network (5G, Internet, etc.) via wireless base-stations and/or networks, Wi-Fi routers, WiLAN, metronet and other similar wireless devices and networks. The software which provides much of the functionality described herein will typically operate on one or more servers, either as part of the smart network, or connected to it. Of course, in a very large installation or system, one might use multiple servers in different geographic locations, server-farms, distributed-computing, a cloud-based system, or other such systems which become available over time.

The description of the invention is set out in six Parts as follows:

PART I: Big Data-Driven AI-based Framework to Enable Personalization in Wireless Networks
PART II: A Synthetic User Behavior Dataset Design for Data-driven AI-based Personalized Wireless Networks
PART III: Dataset Modeling for Data-Driven AI-Based Personalized Wireless Networks
PART IV: Data-Driven User Persona Prediction Framework for Personalized Wireless Networks
PART V: Deep Neural Network to Predict User Satisfaction in Personalized Wireless Networks
PART VI: Personalized Resource Allocation in Wireless Networks: An AI-Enabled and Big Data-Driven Multi-Objective Optimization Part I provides an overview of process shown in FIG. 3. Parts II and III describe the data collection process identified by [2] and [3] (blocks [1] and [2])) of FIG. 3. Parts IV, V, and VI describe the processes identified by [4], [5] and [6] respectively.

Part I: Big Data-Driven AI-Based Framework to Enable Personalization in Wireless Networks Abstract Current communication networks use design methodologies that prevent the realization of maximum network efficiency. In the first place, while users' perception of a satisfactory service diverges widely, current networks are designed to be a "Universal Fit," where they are generally over-engineered to deliver services appealing to all types of users. Also, current networks lack user-level data cognitive intelligence that would enable fast personalized network decisions and actions through automation. In this section, we propose the utilization of AI, big data analytics, and real-time non-intrusive user feedback in order to enable the personalization of wireless networks. Based on each user's actual Quality of Service (QoS) requirements and context, a multi-objective formulation enables the network to micro-manage and optimize the provided QoS and user satisfaction levels simultaneously. Moreover, in order to enable user feedback tracking and measurement, we propose a user satisfaction model based on a 'zone of tolerance' model. Furthermore, we propose a big data-driven AI-based personalization framework to integrate personalization into wireless networks. Finally, we implement a personalized network prototype to demonstrate the proposed personalization concept and its potential benefits through a case study. The case study shows how personalization can be realized to enable the efficient optimization of network resources such that a certain level of user satisfaction and revenue (in the form of saved resources) requirements are achieved.

I. Introduction

Continuously advancing technology has contributed to a surge in data traffic, making user satisfaction the cardinal competitive advantage for all service providers. Besides user satisfaction, service providers try to make the most of the scarce resources available. In order to meet these objectives simultaneously, more agile, intelligent, and flexible networks are required. Such networks should be capable of micro-managing resources in a way that meets each user's expectations of the network while using a minimum amount of resources. This micro-management of network resources has ushered in the concept of wireless network personalization. Personalized networks optimize two correlated and contradicting objectives in real time: user satisfaction and resource utilization. Naturally, wireless networks produce colossal amounts of data and most of this data is in real time. A system that is capable of digesting these data to create relevant and meaningful decisions in real time at the user level using machine learning (ML) and big data analytics is the ultimate solution to meeting the aforementioned objectives simultaneously. We refer to such a system as a big data-driven AI-based personalized wireless network. Enabling wireless network awareness of context data and user feedback data and, consequently, enabling wireless network personalization will bring substantial benefits to both users and service providers.

User feedback and context information awareness is needed for the personalized networks described in most embodiments of the invention. This is due to the fact that the inherent patterns and information in context and feedback data provide service providers with tangible data that can be utilized to make optimized and personalized decisions. User feedback collection can be done in real time or offline in a number of ways that can be either intrusive (e.g., surveys, feedback boxes) or non-intrusive which employ ML and artificial intelligence (AI). In wireless networks, the utilization of user feedback from intrusive methods is discussed in [1], [2]. The authors in [1] propose an approach called "user-in-the-loop" which utilizes real-time feedback to integrate spatial demand control to wireless networks where users are motivated to move to less congested areas. The authors in [2] propose a data-guided resource allocation approach where offline feedback data (e.g., network measurements and user complaints) is employed to improve the average user experience. The utilization of non-intrusive user feedback in wireless communication networks is not a common discussion topic in the literature and is limited to but a few applications [3].

The detection of non-intrusive user feedback is widely discussed in the computational intelligence literature [7]-[9]. There are several advantages to employing non-intrusive feedback collection methods, over intrusive methods, in wireless networks. Generally, the intrusive feedback collection methods do not represent all users because the majority of users do not complain, they just change their provider. Furthermore, while users' needs and expectations change rapidly in wireless networks, non-intrusive feedback collection methods enable more frequent feedback data collection which, consequently, increases the accuracy and relevance of networks decisions.

This article proposes the utilization of context data along with non-intrusive user feedback data to personalize wireless networks. While the proposed personalization concept could potentially be applied to all wireless networks, we focus in this article specifically on wireless cellular networks as a use case. We introduce the concept of wireless network personalization through addressing the following four important questions:

Q1: Why personalization matters?
Q2: How to measure user satisfaction in wireless networks?
Q3: What is the difference between personalization and network slicing?
Q4: How to integrate personalization into wireless networks?

First, to answer Q1, we start by discussing the benefits of personalized wireless networks. For Q2, we introduce the zone of tolerance model, which we use to quantify and manage user satisfaction in wireless networks. Then, we illustrate how the proposed user satisfaction model can be used in the context of personalized wireless networks. For Q3, we narrow down our discussion to address personalization for cellular networks and how it differs from 5G network slicing. To answer Q4, we propose a big data-driven AI framework to enable personalization in wireless networks. Finally, we illustrate the proposed wireless network personalization concept and the associated benefits through a prototyped case study.

Why Personalization Matters

Most service providers are scrambling to increase the average revenue per user and to reduce subscriber churn. Therefore, there is a tremendous need to efficiently utilize scarce resources in order to achieve the ultimate balance between user satisfaction and profit. Personalization is key to achieving this balance and to delivering services profitably to users in a win-win setting. In addition, there are several other benefits of integrating personalization into wireless networks, including the following:

Not Everyone Fits the Mold

Typically, service providers invest in their networks to acquire more subscribers and increase their revenue. Therefore, they always seek to provide their subscribers with the best service quality. Service quality is defined as a comparison between subscribers' expectations and service performance [10]. Current networks are designed mostly to be a "Universal Fit," where service providers deliver services with a quality appeal to all types of users. However, user expectations of service quality are not "One Size Fits All." In practical terms, it is difficult to measure user expectations of service quality for current networks as this depends on numerous dynamic and difficult-to-measure variables. For this reason, service providers over-engineer the delivery of services and, as a result, many users end up getting more resources than what would actually satisfy them, while others end up getting less than they expect. The way around this inefficiency is to tailor the network for each user's dynamic and context-dependent needs and expectations. This level of fine-grained network decision optimization will enable service providers to provide personalized, satisfactory services for the majority of users at a minimum cost.

Act at the Speed of Users

User expectations and behaviors change continuously. In order to make personalized decisions and actions dynamically, networks need to decide and act at the speed of users. Personalized networks employ ML and big data analytics, which make real-time network decisions and actions possible through automation. Automation can be achieved by analyzing the enormous amounts of data produced by networks to identify relevant patterns and thereby predict context-dependent user needs and expectations.

Pricing Paradigms

Currently, tariffs are differentiated based on usage. Wireless network personalization will fit well with the pricing paradigms differentiated according to QoS and user satisfaction levels. In addition, not only are QoS and user satisfaction-based pricing paradigms fairer and more attractive to users, but they will also create new business models and revenue opportunities for service providers.

Personalization vs. Network Slicing in Wireless Cellular Networks

Network function virtualization (NFV) technology is proposed for 5G to isolate the software and hardware aspects of networks in order to transform network functions from dedicated hardware appliances into software-based applications. Along with NFV, software-defined networks (SDN) are considered to be enablers for network slicing (NS) in 5G [11]. The concept of NS is proposed to allow operators to provide customized, reliable services with increased efficiency while reducing capital expenditure and operating expenses of wireless networks. Each slice is associated with a set of resources, including bandwidth and network topology. What distinguishes 5G NS from current QoS-based solutions is its ability to provide an end-to-end virtual network tailored to application requirements. This will enable service providers to deploy only the functions necessary to support a certain application. As a result, service providers are not required to deploy full functionalities to support applications that utilize a small part of those deployed functionalities. In contrast, personalized networks are tailored to application requirements along with the dynamic user demands and expectations of the network. This enables service providers to provide the necessary service quality required to achieve the targeted user satisfaction level for each user. In other words, network personalization provides an end-to-end virtual network tailored to each user-specific needs and expectations.

Modeling User Satisfaction in Wireless Net Works

User Zone of Tolerance Model

Due to the intense competition in the telecommunication industry, user satisfaction is crucial to sustaining a profitable business for any service provider. Over the long run, service providers that can maintain user satisfaction will obtain and retain more subscribers and increase business growth. In order to understand customer/user satisfaction, business and marketing studies proposed the model of service quality. This model utilizes the Zone of Tolerance (ZoT) notion, which is defined as "the range of service performance a customer would consider satisfactory." The model of service quality depicts the ZoT as the service range bounded by desired and adequate levels of service. The desired level of service is defined as "the level of service representing a blend of what customers believe can be and should be provided," whereas the adequate level of service is defined as "the minimum level of service customers are willing to accept."

Figure 2:
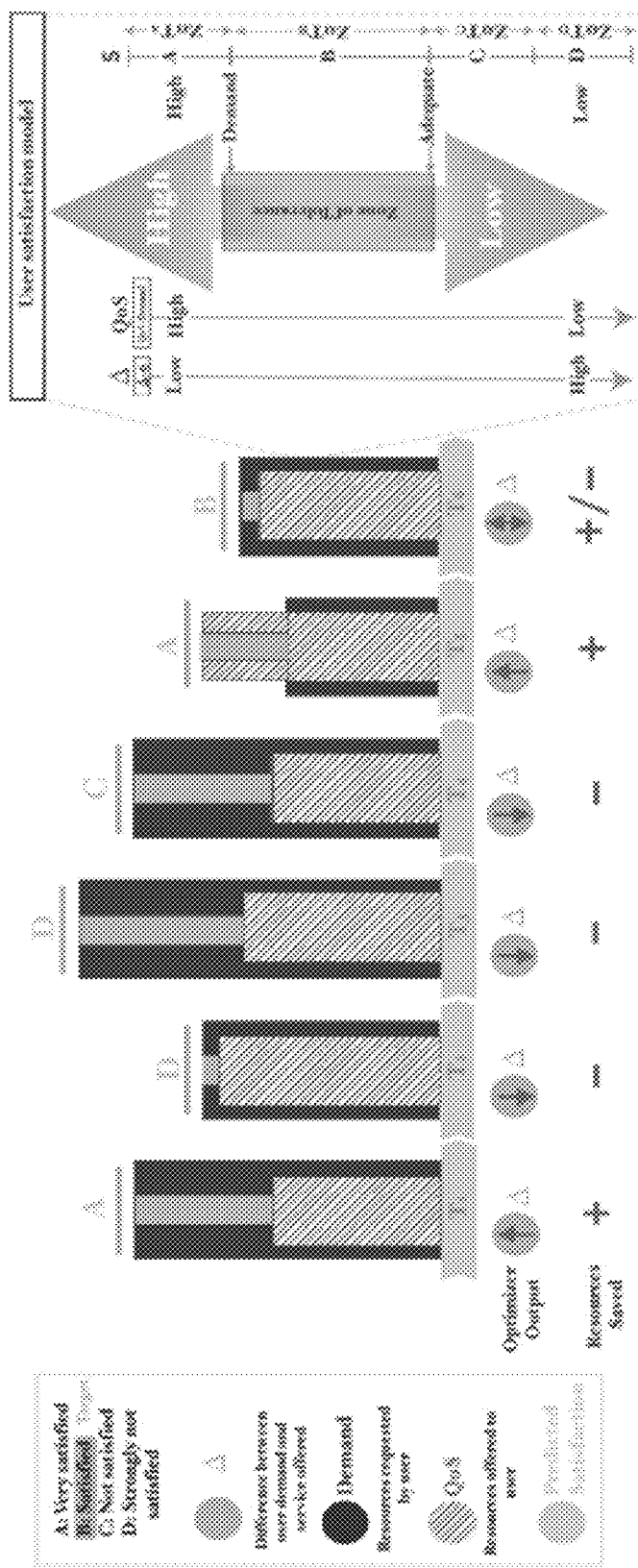
FIG. 2 presents a schematic diagram of a user satisfaction model and a visualization of an example illustrating the relationship between the zone of tolerance, Δ, user satisfaction and personalized network decisions.

Building on this concept, our model of user satisfaction (S) in wireless networks is shown in FIG. 2. We propose dividing user satisfaction into levels where each level is associated with a certain range of QoS. In FIG. 2, satisfaction is divided into four levels: A, B, C, and D. The division and number of satisfaction levels could vary depending on service providers' preferences. Before proceeding to the detailed discussion of the user satisfaction model, it is worth mentioning that QoS can be a vector with several elements, such as rate, reliability, latency, and jitter. Nonetheless, for simplicity, we assume that QoS is solely defined by data rate.

Our proposed user satisfaction model encompasses the following five main notions:

- QoSd: the demanded QoS by the user, which represents the maximum QoS associated with the requested service.
- QoSp: the provided QoS by the network.
- QoSai: the adequate (minimum) QoS required to achieve a satisfaction level of i.
- ZoTi: the QoS range that satisfies the user with a satisfaction level of i. For i<5, ZoTi ranges between $QoS_{a(i+1)}$ and $QoS_{ai}$, whereas for l=5, $ZoT_5$ ranges between QoSd and $QoS_{a5}$.
- Δ: the difference between the QoS demanded by the user and the QoS provided by the network (QoSd−QoSp).

As shown in FIG. 2, as QoSp decreases, Δ increases and, consequently, satisfaction decreases. To keep user satisfaction at a certain level, QoSp should be within the ZoT associated with the targeted satisfaction level. It is important to note that $QoS_{ai}$ is what changes from one user to another, which consequently changes the width of the $ZoT_i$. Moreover, demand is assumed to be dependent on the application and service type; hence, it is constant for all users requesting service of the same application.

Zone of Tolerance in the Context of Personalized Networks

Understanding and characterizing ZoT will open the door to micro-managing wireless networks, which will allow operators to personalize their services and design new business models to generate new revenue streams while maintaining user satisfaction. In FIG. 2, we present a simple example to illustrate how ZoT, Δ, and user satisfaction are related. Assume that a service provider is trying to optimize the network such that a certain user in the network has a satisfaction level of B. Furthermore, assume the service provider is utilizing a big data-driven AI personalized network to predict $ZoT_B$ at different time slots (T1 to T6). Based on the predicted $ZoT_B$, the personalized network optimizes Δ during each time slot. As shown in FIG. 2, at T1, based on the provided Δ, the predicted user satisfaction level is A. In order to reduce satisfaction and consequently save resources, the optimizer, which is part of the personalized network, suggests increasing Δ⇧ to save resources (+). At T2, since $ZoT_B$ is continuously changing over time, although the provided Δ is lower than Δ at T1, user satisfaction drops to level D. This indicates that this user has a very tight $ZoT_B$ at T2, and consequently the optimizer suggests decreasing Δ⇩ further by allocating more resources (−). At T6, the predicted user satisfaction for the provided Δ is level B, which is the targeted user satisfaction. Therefore, the optimizer suggests keeping Δ as is ⇕ (+/−).

Wireless Network Personalization: Big Data-Driven AI-Based Framework

Data collected from communication networks are massive, complex, unstructured, and increase in three dimensions: volume, velocity, and veracity. The problem of extracting knowledge from this huge amount of data presents two subproblems: a big data problem and an AI problem. AI is defined as any process that senses the environment and takes actions to maximize the success probability of the targeted goal. Until recently, it has not been feasible to solve such a problem in real-time. However, supercomputers and distributed computing technologies are improving rapidly to the point that the use of big data analytics and prediction techniques for practical near real-time applications are currently possible.

Figure 3:
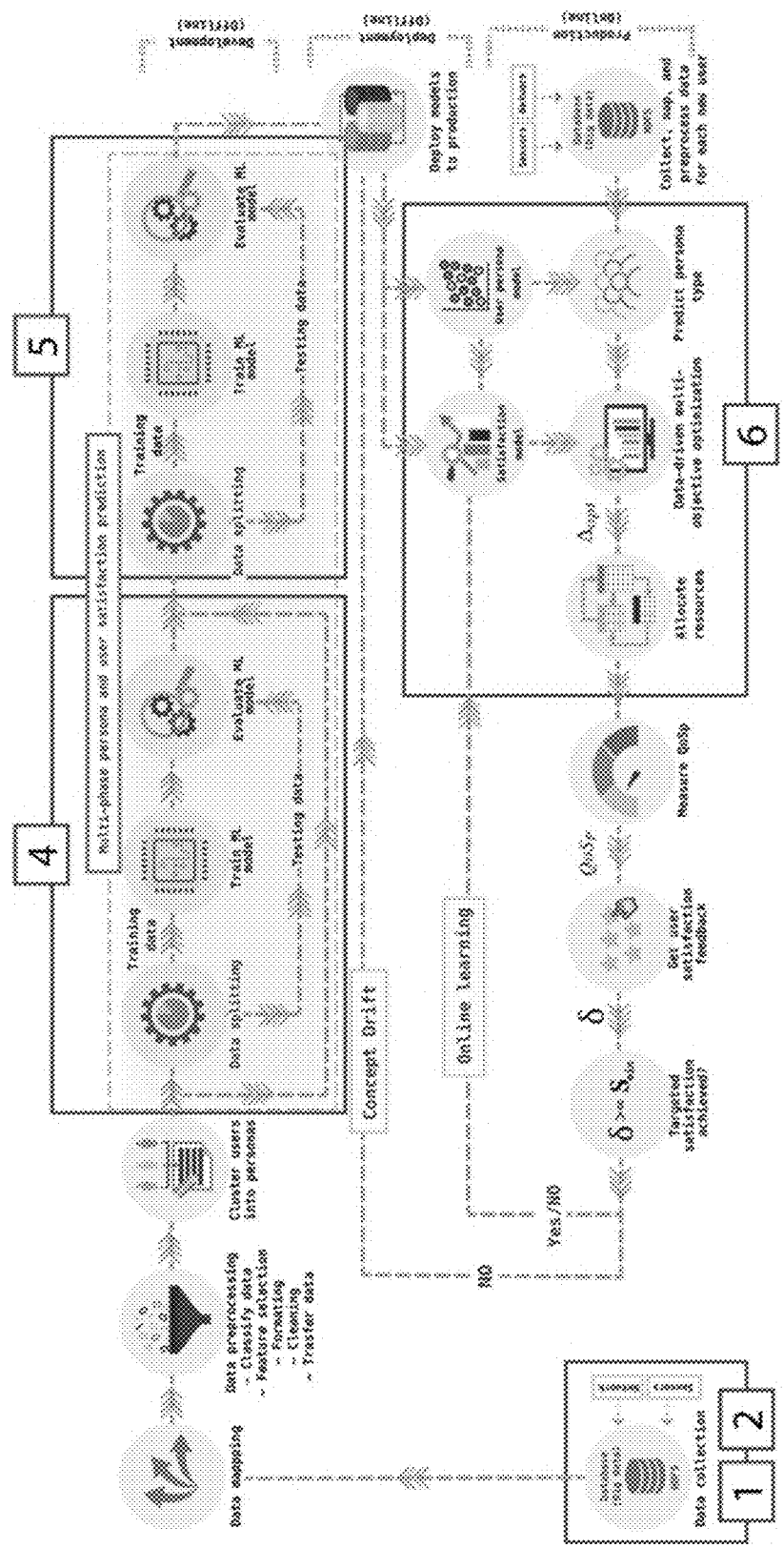
FIG. 3 presents a process flow diagram for a big data-driven AI-based network personalization framework in an embodiment of the invention.

As shown in FIG. 3, the proposed personalization framework collects information from the user environment and the network, predicts user needs and tolerance to service quality, and optimizes resource allocation to minimize cost and maintain certain user satisfaction levels. The proposed framework consists of three stages:

1) Development

The development stage is composed of the following modules all of which are implemented offline:

Data mapping—Data from different users are mapped to shared space. Mapping user data enables ML models to capture correlations and inherent patterns. For instance, user location is recorded as GPS coordinates. However, generally, user satisfaction behavior is actually correlated to a particular type of location (e.g., home) rather than GPS coordinates.

Data preprocessing—Retransform the dataset and extract useful features. This step is important because it contributes to the reduction of noise and irrelevant data, which can degrade the predictive model's performance.

Cluster users into personas—A group of users who share similar user behavior and satisfaction patterns is referred to as a persona (see Part II). Associating users with pre-existing user personas will enable networks to provide highly personalized service with a minimal amount of data, thereby improving the efficiency of personalized networks. Nonetheless, at this stage, the network has no prior information on the number and types of unique personas implicitly available within the collected data. For this reason, at this early stage, unsupervised learning is used to cluster users into unique personas.

Multi-phase persona and user satisfaction prediction—At this point, the network has access to labeled context data with user persona and satisfaction levels. The processed data is used to build an ML model to predict user satisfaction levels for each user. As shown in FIG. 3, we approached the user satisfaction prediction problem using a two-phase ML model. The first phase is designed to output the personas probability vector. In Part IV, we proposed a workflow to implement the persona prediction phase. The second phase digest the personas probability vector along with the preprocessed labeled data in order to build a model capable of predicting the user satisfaction levels, for new and existing users, using a minimum amount of data. In Part II, we illustrate a satisfaction prediction example using different ML algorithms.

2) Deployment

At the deployment stage, the output ML model from the previous stage is integrated into the production environment to start making practical decisions based on new data. There are several methods used to deploy ML models. In our framework, to automate the prediction process, the ML model is deployed as an online ML model. Online ML models continue to update and train as more data becomes available to the network.

3) Production

The production stage is where the network utilizes the trained ML models to achieve network personalization in real-time. The production stage is composed of the following modules:

Data collection and preprocessing—The first step is to continuously collect context information from users to predict personalized user satisfaction behavior. Data are collected from different sources, such as sensors and network data, and stored in a big data database (e.g. Hadoop distributed file system (HDFS)). Then, data are preprocessed using the same workflow used in the development stage.

Data-driven multi-objective optimization—The next step is to use the multi-phase ML model trained in the development stage as an input to a multi-objective optimization problem.

The optimization problem is formulated to micro-manage and optimize resources, and users' satisfaction simultaneously based on each user's QoS requirement and user satisfaction behavior. This optimization problem utilizes the ML model as its fitness function. Moreover, the targeted satisfaction level for each user is decided by the network service provider and is fed as an input to the multi-objective optimization problem. The optimization problem outputs the optimum choice of $\Delta$ ($\Delta_{opt}$) which achieves the required satisfaction level using the minimum amount of resources.

Resource allocation—The network utilizes $\Delta_{opt}$ and other network parameters to allocate the best resource blocks (RB) that achieve the targeted user satisfaction level.

Measure QoSp and get user satisfaction feedback—After allocating resources to each user, the network records the QoSp along with user feedback (i.e., satisfaction).

Tuning—The measured user satisfaction is used to validate the predicted satisfaction levels. If user satisfaction was predicted correctly, the instance is fed to the database. Otherwise, the error is fed to the predictive model to relearn (i.e., concept drift). Relearning is used to improve the predictive model performance and to update the model with user behavioral changes that could occur over time.

Online learning—Online learning is used to improve the predictive model proactively. Since network data become available in sequential order, batch learning techniques are not practical for real-time implementation. Instead, online learning techniques can dynamically adapt to new changes or patterns in user behavior and its relation to satisfaction.

In order to assess the practicality of the proposed framework, the steps that need to be performed during the communication session (i.e., online) should be assessed. As shown in FIG. 3, the production process involves relatively fast operations such as data collection and using the ML models to performance predictions. Additionally, the optimization of the resources should be done in near real-time. Although optimization could potentially require more time, meta-heuristic optimization provides a sufficiently good solution in a relatively short time. In contrast, the development and deployment stages involve training, validating, and implementing the ML models. These are cumbersome, time-consuming, and involve heavy computation and processing. Nonetheless, since they are implemented offline, they should not affect the network proactivity.

How can Personalization Potentially Save Resources and Increase User Satisfaction?

Figure 4:
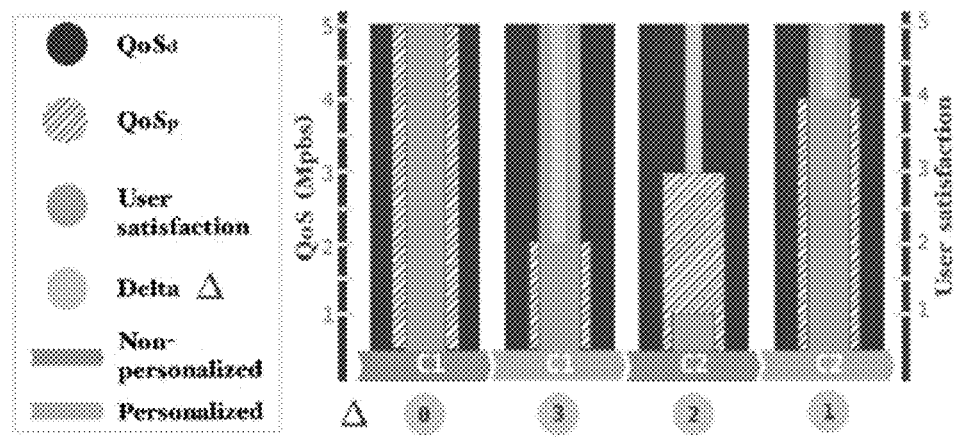
FIG. 4 presents a schematic diagram showing QoSd, QoSp, Δ, and the corresponding user satisfaction for the two contexts (C1 and C2) associated with both personalized and non-personalized networks.

In this section, we shall consider a few exemplary instances in order to illustrate how personalization can potentially save resources and improve satisfaction at the minimum cost. FIG. 4 illustrates two different contexts, C1 and C2. The value of $\Delta$ is illustrated by the length of the yellow bar and is depicted, for each context, in the yellow circles. The targeted user satisfaction for the considered user is assumed to be 5 and the QoSd is 5 M bits per second (bps).

To begin with, we analyze the data associated with C1. As for the non-personalized network, the allocated QoSp was 5 Mbps, and consequently, $\Delta$ will sum up to zero Mbps. On the other hand, the personalized network allocated only 2 Mbps, causing $\Delta$ to rise to 3 Mbps. The personalized network was able to predict that this user, during C1, would have a relatively large ZoT5 and, hence reduce the amount of resources allocated by 3 Mbps without sacrificing user satisfaction. Accordingly, we can conclude the following: personalization can potentially save resources during contexts with larger ZoT without sacrificing user satisfaction.

On the contrary, during C2, the non-personalized network allocated 3 Mbps, whereas the personalized network allocated 4 Mbps to reduce $\Delta$ from 2 to 1 Mbps. As a result, user satisfaction climbed from 1 for the non-personalized network to 5 for the personalized network. Personalization enabled the network to predict that this user, during C2, would have a smaller ZoT5, and hence the minimum required QoSp is 4 Mbps. Accordingly, we can conclude the following: personalization can potentially increase user satisfaction to the desired level using a minimum amount of resources.

Prototyping a Personalized Wireless Network

In order to verify the benefits of personalized networks, we implemented the proposed framework as a proof-of-concept case study, which resembles a simplified, yet realistic network scenario. The prototype was implemented in python where TensorFlow library was used to build the ML capabilities required for the framework. The details of implementing the development stage, which consists of preprocessing and building the predictive model, are presented in Part IV and V. In this section, we utilized the implemented prototype to study the benefits of integrating personalization into wireless networks. For the purpose of comparison, we implemented two networks, a personalized and a non-personalized network. The personalized network utilizes the proposed framework to minimize the allocated resources (i.e., maximize $\Delta$) while maintaining user satisfaction levels higher than the targeted minimum satisfaction. On the other hand, since the current cellular networks are designed to maximize QoSp, the implemented non-personalized network optimizes the allocated resources to provide services with QoSp as close as possible to QoSd (i.e., minimize $\Delta$).

Experimental Setup

Cellular network environment—Consider a cell within a cellular network that covers Ottawa, Canada. The cell has one eNB and it is connected to three active users moving within its coverage area. The area of the cell is divided into a k*k grid. The cellular network environment is simulated using the parameters listed in Table I below. The cellular network operator collects data about the users and stores it in a database. The collected data are of two types, real-time user satisfaction levels as well as context values, such as time, location, and application. Measurements are recorded at each measuring instant. The period between two measuring instances is referred to as a time slot (TS). The operator collects data from the considered users with TS length of one second. Besides, the amount of resources used for each TS is recorded. Based on the type of service plan provided for the three users, the network operator targets a satisfaction level of 4 ($S_{min}=4$).

TABLE I

Simulation parameters

| PARAMETER NAME | PARAMETER VALUE |
|---|---|
| Number of eNBs | 1 |
| Number of users | 3 |
| Number of available RBs | 9 |
| Number of subcarriers per RB | 12 |
| Resource block bandwidth | 180 kHz |
| Carrier frequency | 2 GHz |
| Flat fading | Rayleigh |
| Log normal shadowing | 8 dB standard deviation |
| Distance attenuation | L = 35.3 + 37.6 × log(d) |
| UE thermal noise figure | 9 dB |
| UE thermal noise density | −174 dBm/Hz |
| Grid size (k) | 100 |
| $S_{min}$ | 4 |

Dataset description—As shown in FIG. 3, user and network data are important requirements for personalized networks. Unfortunately, companies and institutions capable of collecting such data, particularly user data, do not publish them for privacy and confidentiality reasons. The way around this issue is to design and generate synthetic data that is flexible and has realistic characteristics. In Parts II and III, we proposed a synthetic dataset design to enable big data-driven wireless network personalization. The dataset is designed with four distinct user personas and it can be found in a publicly available GitHub repository [14]. The dataset is composed of context features along with their associated satisfaction values. The dataset in [14] is utilized to build the prototype for the proposed personalized network.

Experimental Results

Figure 5:
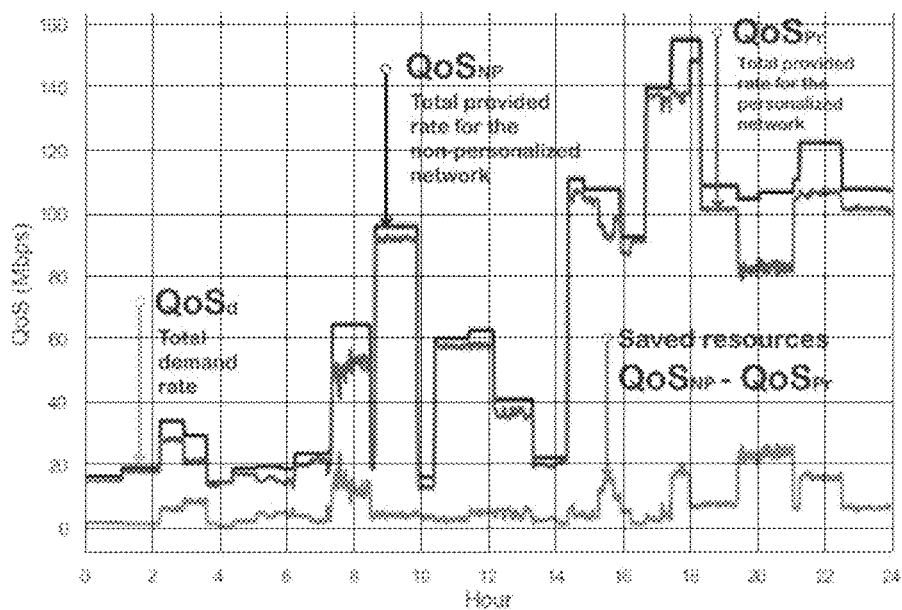
FIG. 5 presents a graph of Total QoSN P, QoSPr, QoSd, and QoSN-P-QoSPr for three users vs. time in hours.

In this section, for the purpose of comparison, we simulate both personalized and non-personalized networks. The first premise of personalized networks is their ability to minimize the overall utilized resources at each instant. While resources in wireless networks are miscellaneous, in this section, we confine resources to Bandwidth, which is proportional to QoSp in Mbps. The amount of saved resources is measured by calculating the difference between the QoSp provided by the non-personalized network (QoSNP) and QoSp provided by the personalized network (QoSPr) (i.e., QoSN P−QoSPr). In FIG. 5, we plot the total QoSNP, QoSPr, QoSd, and QoSNP−QoSPr for the three users vs. time in hours. As FIG. 5 shows, the total amount of saved resources (QoSN P−QoSPr) fluctuates with time. Essentially, the network achieves the highest resources saving when the network attempts to maximize QoSp while the user has more tolerance to lower QoS. In this particular scenario, as shown in FIG. 5, the amount of saved resources was always greater than zero indicating that the personalized network was able to provide service with QoSPr≤QoSNP; hence, it was able to save more resources (9703.8 Mbps over 24 hours) compared to the non-personalized network. However, depending on Smin and the amount of resources provided to each user, the personalized network might suggest an increase in the provided resources to certain users (i.e., QoSPr>QoSNP) to push their satisfaction levels above the targeted minimum. Usually, this increase in the provided resources for low tolerance users is offset by the reduced amount of provided resources for high tolerance users. In addition, the extra amount of resources suggested to low tolerance users is the optimized minimum required to achieve targeted satisfaction.

Figure 6:
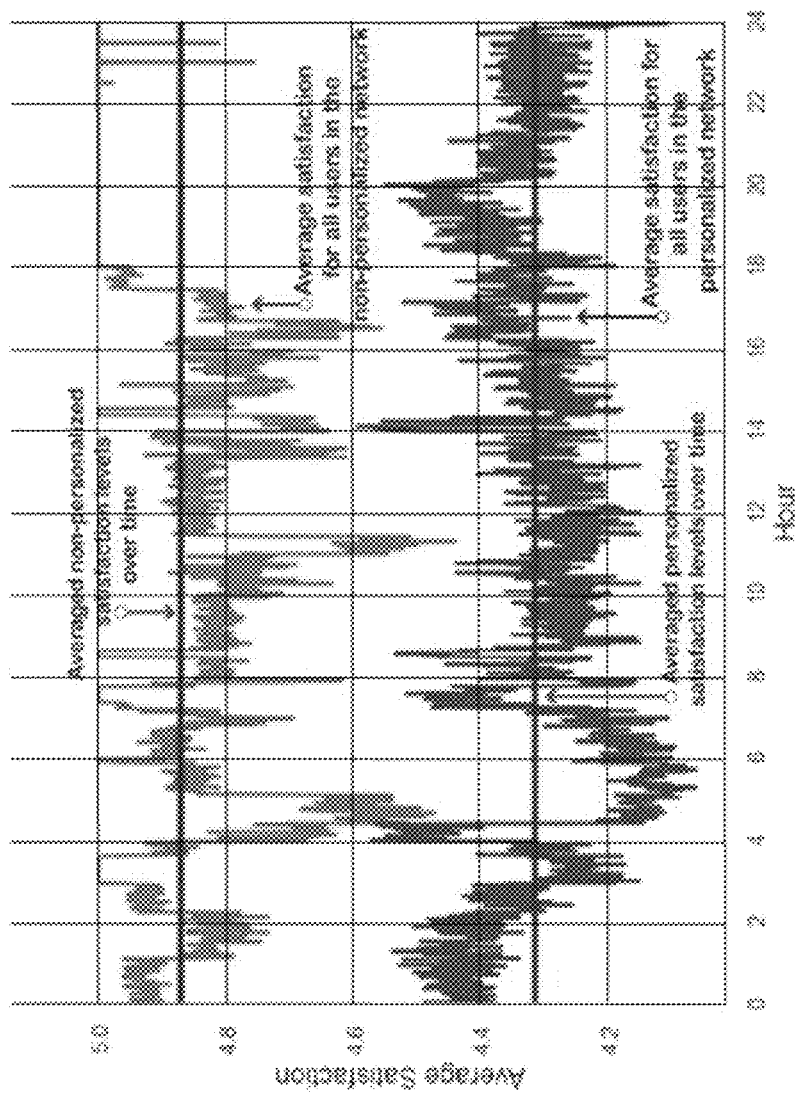
FIG. 6 presents a graph of Average user satisfaction for the three users vs. time in hours for the personalized and non-personalized networks.

The second premise of personalized networks is their ability to maintain targeted satisfaction levels. To substantiate this claim, we compare the satisfaction levels of the personalized and non-personalized networks. In FIG. 6, we plot the average user satisfaction for the three users vs. time in hours for both networks. As shown in FIG. 6, although on average the non-personalized network achieved higher satisfaction levels (an average of 4.87), the personalized network was able to maintain user satisfaction above the targeted level of 4 (an average of 4.31) and save resources, simultaneously.

Conclusions

This section has proposed wireless network personalization as an enabler for resource micro-management based on users' actual demands and needs. Along with AI and big data analytics, personalized networks utilize real-time non-intrusive user feedback coupled with context information to make fine-grained decisions that achieve higher user satisfaction levels using minimum resources. Besides, since measuring, tracking, and analyzing user satisfaction is needed for personalized networks, we proposed the user satisfaction model, which is based on the notion of ZoT. Although this section focused on resource allocation, personalization can be employed to optimize various decisions in wireless networks, such as network failure detection and network security decisions. Furthermore, the technology and framework proposed for wireless networks can be applied to any network with users (e.g., wired networks) as well as other businesses and applications that require user feedback to improve service.

Part II: A Synthetic User Behavior Dataset Design for Data-Driven AI-Based Personalized Wireless Networks Abstract It is envisioned that wireless networks of the future will support personalized, fine-grained services and decisions by predicting user satisfaction in real-time using machine learning and big data analytics. Data-driven personalization will empower wireless networks to further optimize resources while maintaining user expectations of networks. In order to design, test, and validate research ideas related to wireless network personalization, acquiring data is necessary. However, datasets that comprise user behavior and corresponding user satisfaction information are generally not published due to privacy and confidentiality concerns. To account for this, in this section, we propose a synthetic dataset design methodology to generate labeled user behavior data with ground truth satisfaction values which mimic the real characteristics of real datasets. Finally, we conduct sample user satisfaction prediction experiments using several machine learning algorithms.

I. Introduction

There is a consensus that trends in emerging wireless technologies, such as explosive data requirements and proliferating services and applications, are creating serious issues for the management of user experience. This is due to the fact that, unlike quality of service (QoS), where technical metrics are available, it is difficult to analytically model user experience in wireless networks. User experience is directly related to users' subjective expectations of networks which dynamically change with varying scenarios and contexts. Therefore, in comparison to mathematical modeling, data-driven user experience modeling is more relevant. Enabling wireless networks to capture user satisfaction levels (i.e., user experience) and the inherent relationship between user satisfaction and QoS will allow networks to make more personalized decisions. Personalizing wireless networks is key for optimizing resources and meeting dynamically changing user needs and expectations. In Part I, we proposed a data-driven AI-based wireless network personalization framework. The proposed framework enables wireless networks to micro-manage resources and make fine-grained personalized decisions based on user needs and expectations.

One of the principal requirements of our proposed framework in Part I (and of any other personalization solution, for that matter) is to make wireless networks aware of the personalized experience of users and their satisfaction levels in real time. In order to enable personalized wireless networks to measure, track, and predict user satisfaction in real-time, we proposed the Zone of Tolerance (ZoT) model (see Parts I and III).

The second key enabler for wireless network personalization is the availability of relevant datasets. A lack of published user behavior data labeled with ground truth user satisfaction information is holding back innovation into new approaches for personalizing wireless networks. Companies and institutions capable of collecting such data do not publish them for privacy and confidentiality reasons. The way around this issue is to design and generate synthetic data that is flexible and has realistic characteristics.

There are several advantages of employing synthetic data as opposed to real-world data. First and foremost, synthetic data removes privacy and confidentiality concerns; therefore, it can be made publicly available for researchers. Also, synthetic data can be generated in large volumes and with complex well-understood characteristics. Another fundamental advantage of synthetic datasets is the ability to redesign and change data structures as needed by varying certain input parameters. So instead of relying solely on real data over which we have little or no control, synthetic data provide us with great flexibility. Along with design flexibility, synthetic data generation methods enable the generated datasets to cover most of the data space needed to generate meaningful results, and hence, provide us with deeper insight and stronger conclusions. Moreover, the quality of the generated data can be controlled using various design techniques [13]. For all its benefits, the advantages of synthetic data come at a price. Real data are usually dirty and contain various types of errors; hence, it can be foreseen that the creation of data with characteristics similar to real-world data is not straightforward. Synthetic data also needs to reflect errors, distributions, and patterns that exist in real data. Finally, an additional validation step might be necessary to ensure that the conclusions drawn from synthetic data extend to real-world applications.

In this section, we start by discussing the ZoT model and the associated nonlinear mapper that we developed to model user satisfaction in wireless networks. Then, based on the ZoT model, we propose a synthetic dataset design methodology to generate labeled user context data. In order to address the aforementioned issues with synthetic dataset design, we adopt four strategies. First, we introduce the tree data generator, which we use to integrate the data distributions and patterns that can be found in real user context datasets. In addition, in order to expand the span of our designed datasets, and in order to produce data for different users with various behavioral patterns and expectations, we introduce the notion of a 'user persona'. Afterward, in order to incorporate real errors into the generated dataset, we propose a method of integrating real activity sensor measurements to the proposed synthetic dataset. Then, in order to model the errors resulting from insufficient context information required to anticipate user satisfaction levels, we integrate statistical errors into the proposed user satisfaction mapper. Finally, exemplary user satisfaction prediction experiments are conducted on a generated dataset using several ML algorithms.

II. User Satisfaction Model

The dataset generation model proposed in this section is based on the user satisfaction model originally presented in Part III. Due to the importance of the user satisfaction model, we present it once again in this section for the sake of completeness.

A. User Satisfaction Modeling Using ZoT

Figure 7:
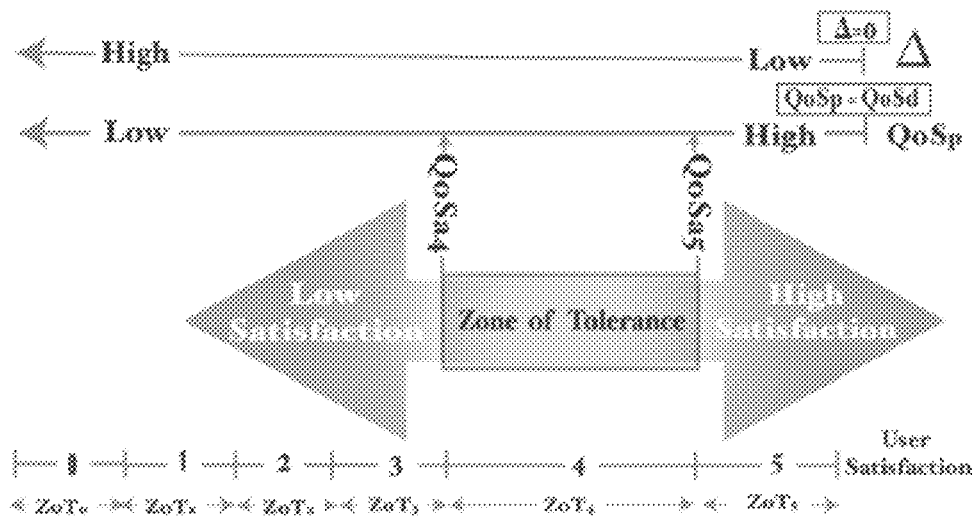
FIG. 7 presents a second schematic diagram of a User Zone of Tolerance (ZoT) model.

A schematic representation of our model of user satisfaction in wireless networks is shown in FIG. 7 (note that FIG. 7 is much the same as FIG. 2, except that FIG. 2 uses a model satisfaction with levels A, B, C and D). We propose dividing user satisfaction into levels where each level is associated with a certain range of QoS. In FIG. 7, satisfaction is divided into six discrete levels: 0, 1, 2, 3, 4, 5. Our proposed user satisfaction model encompasses the following five main notions:

QoSd: the demanded QoS by the user, which represents the maximum QoS associated with the requested service.

QoSp: the provided QoS by the network.

QoSai: the adequate (minimum) QoS required to achieve a satisfaction level of i.

ZoTi: the QoS range that satisfies the user with a satisfaction level of i. For i<5, ZoTi ranges between $QoS_{a(i+1)}$ and $QoS_{ai}$, whereas for l=5, $ZoT_5$ ranges between QoSd and $QoS_{a5}$.

Δ: the difference between the QoS demanded by the user and the QoS provided by the network (QoSd−QoSp).

As shown in FIG. 7, as QoSp decreases, Δ increases and, consequently, satisfaction decreases. To keep user satisfaction at a certain level, QoSp should be within the ZoT associated with the targeted satisfaction level. It is important to note that $QoS_{ai}$ is what changes from one user to another, which consequently changes the width of the $ZoT_i$. Moreover, QoSd is assumed to be dependent on the application and service type; hence, it is constant for all users requesting service of the same application.

B. Mathematical Modeling of ZoT

Figure 8:
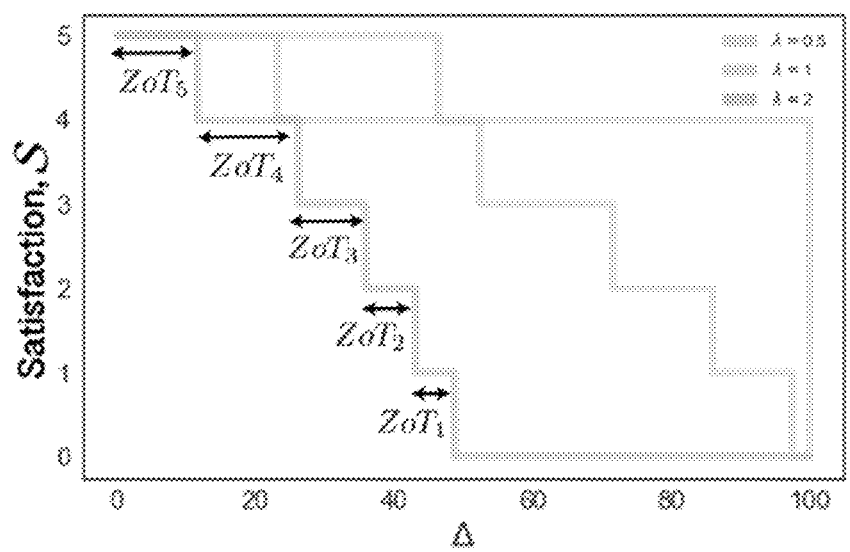
FIG. 8 presents a graphic representation of a Satisfaction mapper for different values of $\lambda$ and for $\psi=h$ in an embodiment of the invention.

User satisfaction is correlated with Δ and context. Context is a combination of several variables that influence user satisfaction, such as time, location, speed, and activity, or otherwise contribute to or shape user satisfaction. Context variable modeling is addressed in Section III. Typically, for a specific context, users will have a consistent satisfaction behavior which depends solely on Δ. The following equation models user satisfaction (S) vs. Δ at a certain context:

$$S(\psi, \Delta, \Delta_{max_0}, \lambda) = \begin{cases} \alpha_h \cdot \beta_h^{\left(\frac{\Delta \zeta \lambda}{\Delta_{max_0}}\right)} + 6 & , \text{for } \psi = h, \Delta \leq \Delta_{max_0} \\ \alpha_l \cdot \beta_l^{\left(\frac{\Delta \zeta \lambda}{\Delta_{max_0}}\right)} & , \text{for } \psi = l, \Delta \leq \Delta_{max_0} \\ 5 & , \text{for } S > 5 \\ 0 & , \text{for } \Delta \geq \Delta_{max_0} \| S < 0 \end{cases} \quad (1)$$

where $\alpha_h=-1$, $\alpha_l=5$, $\beta h=1.001$, $\beta l=0.999$, and $\zeta=1750$. Since the minimum rate a user could receive is zero, $\Delta_{max}$ is equal to user demand (i.e., $\Delta_{max}=D-0$). User satisfaction behavior at a specific context is modeled using two variables, λ and ψ. As λ decreases, ZoT and satisfaction increase, and vice versa. Also, a satisfaction mapper with ψ=l indicates tighter $ZoT_S$ for higher satisfaction values compared to lower ones. Similarly, ψ=h indicates a more relaxed $ZoT_S$ around higher satisfaction values compared to lower ones. Notably, at a certain context, λ and ψ have fixed values and user satisfaction model is a function of Δ. FIG. 8 visualizes the S mapper in (1) for different values of λ and for ψ=h. As shown in FIG. 8, for a certain context (i.e., certain λ and ψ), S depends on the value of Δ. Moreover, FIG. 8 shows that when ψ=h and for a fixed λ, $ZoT_5$ and $ZoT_4$ are greater than the $ZoT_3$, $ZoT_2$ and $ZoT_1$. In addition, FIG. 8 illustrates that $ZoT_S$ for all satisfaction values increase with the decrease of λ.

III. Dataset Generation Model

As mentioned above, user satisfaction depends on both context data and values. Despite the possibility of measuring context variables, satisfaction, and values, a dataset that has the three elements does not exist in published literature. Therefore, we designed a process to synthesize a dataset based on the proposed user satisfaction model. All datasets generated in this document are generated for one year. Theoretically, there is a relatively large number of context variables of which each has a different effect on the satisfaction behavior of users. However, as an example, we consider the following context variables: time, day, location, speed, activity, service request arrival, application choice, application service choice, request rate demand, given rate, and A. In Part III, we discuss the details of generating a dataset for one user which comprises the aforementioned context variables along with the corresponding satisfaction values. The dataset generated in Part III is publicly available in a GitHub repository [14].

One of the main design requirements of synthetic datasets is that they need to be similar to real-world data. However, designing a dataset with realistic characteristics is not a straightforward task. Real-world data are complicated and data attributes have internal patterns, errors, and dependencies most of which are nonlinear and difficult to model. In addition, the generated dataset should span a wide range of data space. In order to integrate the aforementioned design aspects into our proposed dataset in Part III, we use four strategies. First, in Section III-A, to generate context variables with the proper data correlation, we propose a methodology that we call the tree data generator. Second, in Section III-B, we introduce the notion of a user persona model in order to create data for different users with different behavioral patterns and lifestyles. Third, in Section III-C, we integrate real-world sensor measurements in order to add real noise and errors to the generated data. Finally, in Section III-D, we artificially integrate noise into user satisfaction values using a Gaussian random variable.

A. Tree Data Generator

Figure 9:
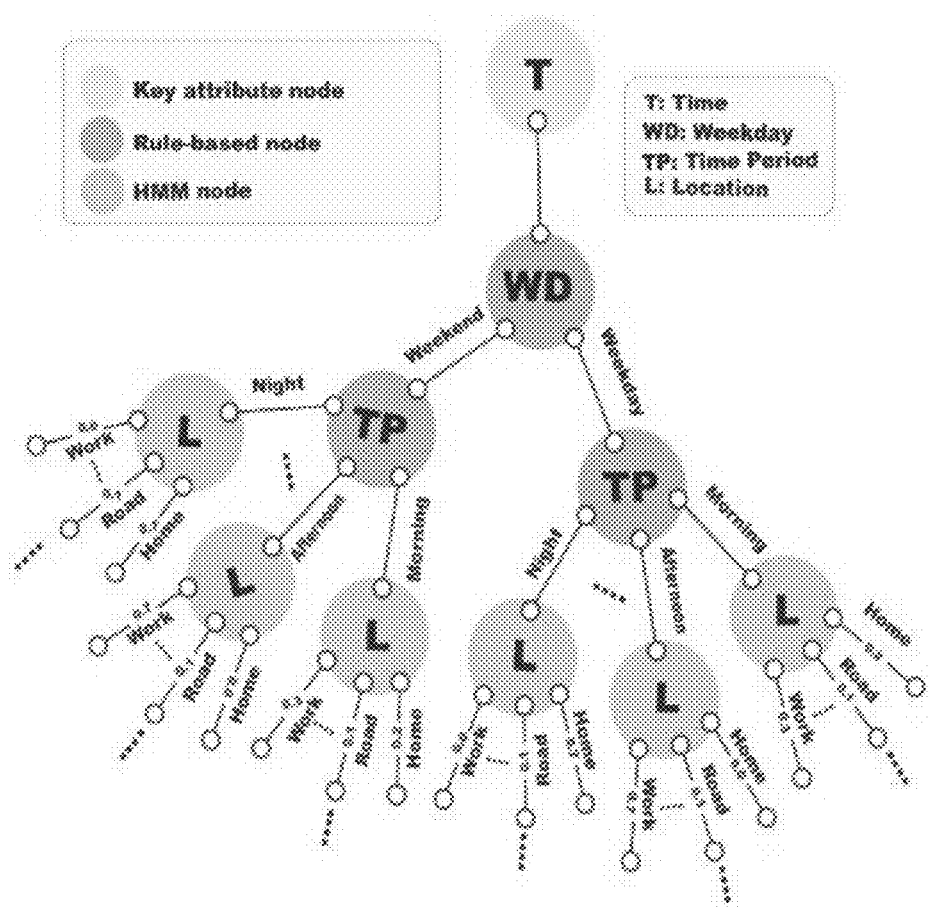
FIG. 9 presents a Tree Data Generator (TG) model for a working professional persona in an embodiment of the invention.
Figure 10:
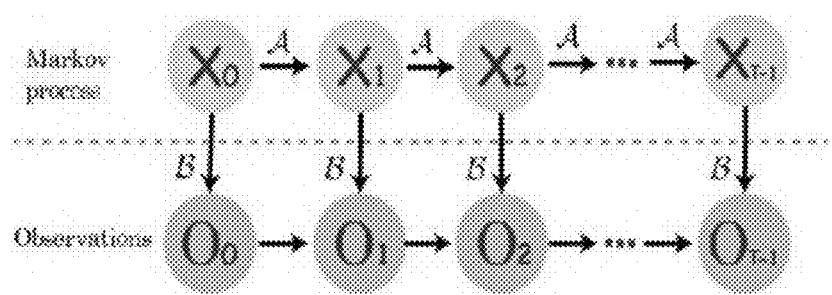
FIG. 10 presents a Hidden Markov model in an embodiment of the invention.

The tree data generator (TG) is a structure that specifies the relationships and correlation between context variables in user behavior generated datasets. This structure defines the rules, patterns, and dependencies that the generated data need to follow. In FIG. 9, we illustrate a sample TG structure. Each TG is a collection of several nodes, where each node has a value and could have a child node. Nodes that do not have child nodes are called leaf nodes, whereas nodes with child nodes are called parent nodes. The first node in TGs is called the key attribute node (see FIG. 9). Since context information datasets are collected over time, the key attribute node will always be time. One of the main advantages of using TG to generate context data is its ability to exclude impossible or unwanted variable combinations. In other words, all paths in a TG will produce relevant data records. For instance, TG will eliminate speed values of zero when the recorded activity is running. TG nodes are of two types: rule-based nodes and Hidden Markov Model-based (HMM) nodes. The values of rule-based nodes are generated on the basis of rules specified by TG inputs. For example, the TG in FIG. 9 has a rule-based node called weekdays (WD). WD node has two possible values: weekday and weekend. In order to determine whether a day is a weekday (working day) or a weekend day, a rule is integrated into this node. HMM nodes, by contrast, compute the state sequence conditional probabilities and perform a weighted random choice based on the computed probabilities. FIG. 10 illustrates the decision process of HMM nodes, where Xi represents a hidden state sequence, A is the state transition probabilities, and B is the observation probability matrix. The matrix $A=\{a_{ij}\}$ is N×N with $$a_{ij}=P(\text{state } q_j \text{ at } t+1 | \text{state } q_i \text{ at } t), \quad (2)$$

where t is the current time, N is the number of states in the model, and $Q=q_0, q_1, \ldots, q_{N-1}$ are the distinct states of the Markov process. States of a TG's HMM node are the set of all possible values of the variable associated with the node. The matrix $B=\{b_{ij}\}$ is N×M with $$b_{ij}=P(\text{observation } k \text{ at } t | \text{state } q_i \text{ at } t), \quad (3)$$

where an observation $(O_t)$ of an HMM node at time t is the sequence of values recorded at the predecessor parent nodes and M is the number of observation symbols.

B. User Persona

Although the tree data generator proposed in this section could be used to create almost an infinite number of datasets with unique and different behavioral patterns, in the real world, people share certain similarities. For example, students tend to be in school during daytime hours on weekdays; likewise, professionals generally work during the same hours. Therefore, it should not be assumed that all people have fundamentally different behavioral patterns. Grouping people with similar behavioral patterns can also make processing their data more efficient, and it can improve the accuracy of predicting future user satisfaction levels. In this paper, we refer to the TG structure of users with similar behavioral patterns as a 'user persona'. A persona-specific dataset is created by feeding the persona's parameters as input into the TG generator TG generator. Identical TG input parameters mean that people belonging to the same persona have identical A and B matrices, which indicates that they will have similar distributions and patterns within their data. In this paper, we propose four distinct user personas: 1) a working professional, 2) a high school student, 3) a university student, and 4) a homemaker. Not only do people with similar personas share similar behavior patterns, but the correlation between their context and satisfaction data is similar as well. Table II lists the four personas and their corresponding ring of locations for both weekdays and weekends. Locations grouped in one bracket indicate that the user can go to either one with a certain probability. The four datasets generated for the four personas are available in [14].

TABLE II

Weekdays and weekends location rings for the four user personas.

| Persona | Weekday Ring of Locations | Weekend Ring of Locations |
| --- | --- | --- |
| Working Professional | Home⇒ $R_{hc}$⇒ Coffee Shop⇒ $R_{cs}$⇒ School (drop kids)⇒ $R_{sw}$⇒ Work⇒ $R_{wr}$⇒ Restaurant⇒ $R_{rh}$⇒ Home | Home⇒ $R_{hs}$⇒ Shopping mall⇒ $R_{sp}$⇒ Park⇒ $R_{ph}$⇒ Home |
| High School Student | Home⇒ $R_{hs}$⇒ School⇒ $R_{sh}$ ⇒ Home | Home⇒ $R_{h\text{-}pm}$⇒ {Park, Movie}⇒ $R_{pm\text{-}h}$⇒ Home |
| University Student | Home⇒ $R_{hc}$⇒ Coffee Shop⇒ $R_{cu}$⇒ University⇒ $R_{u\text{-}lg}$⇒ {Library, Gym}⇒ $R_{lg\text{-}h}$⇒ Home | Home⇒ $R_{hg}$⇒ Gym⇒ $R_{g\text{-}pf}$⇒ {Park, Friends House}⇒ $R_{pf\text{-}h}$⇒ Home |

TABLE II-continued

Weekdays and weekends location rings for the four user personas.

| Persona | Weekday Ring of Locations | Weekend Ring of Locations |
|---|---|---|
| Homemaker | Home⇒ $R_{hs}$ ⇒ School (drop kids)⇒ $R_{sc}$ ⇒ Coffee Shop (meet friends)⇒ $R_{cs}$ ⇒ School (pick up kids)⇒ $R_{sh}$ ⇒ Home | Home⇒ $R_{hs}$ ⇒ Shopping Mall⇒ $R_{sp}$ ⇒ Park⇒ $R_{ph}$ ⇒ Home |

C. Integrating Real Sensor Data

Integrating errors into synthetic datasets is a fundamental requirement for creating datasets with realistic characteristics. Different datasets have different types of errors depending on several factors, such as the utilized data collection method and data type. One strategy that can be used to add errors to datasets is the integration of real data measurements with inherent errors and noise. In this paper, we integrate real data from the sensor measurements dataset available in [15]. The authors in [15] carried out an experiment to collect data for a group of 30 volunteers with ages ranging from 19 to 48 years in order to obtain a dataset of phone sensor data labeled with ground truth activity labels. The activity labels were the following: standing, sitting, laying down, walking, walking downstairs, and walking upstairs. Sensor data are collected from sensors, such as body acceleration, gravity acceleration, and body angular speed sensors. Data pre-processing, including filtering, sampling, and normalization, has been already applied to the raw sensor data. The authors in [15] also engineered the sensor data features to create more relevant and meaningful features. In this paper, we refer to the context-activity dataset in [15] as the human activity (HA) dataset, whereas the datasets proposed in this paper are referred to as the user context (UC) datasets. The process of integrating HA into UC involves the following steps (note that bold variables represent tables or datasets, while italic variables represent arrays; thus HA[Activity][i] represents the value in dataset HA, at column Activity and record number i):

- Create a lookup table for HA dataset called HAL. HAL has three columns: Activity, Indexes, and Number of Records (NoR). Each row is called a record. One record is created for each consecutive set of HA records that have the same activity label. The indexes (i.e., row numbers) of those records are recorded under the Indexes column and the number of HA records in each set is recorded under the NoR column. Algorithm 1 describes the process of creating the lookup table HAL.
- Similar to HAL, create a lookup table for UC dataset called UCL. This lookup table is created using Algorithm 1 as well and it has three columns: Activity, Indexes, and NoR.
- Augment sensors data in UC dataset by data in HA dataset using Algorithm 2.

---

Algorithm 1: Dataset lookup table generation

Input: IN dataset
Output: Out table (columns:Activity,Indexes,NoR)
1  Intialize: TR⇐ The IN's total number of records,
2  Labels⇐ IN[labels], /* input dataset labels */
3  ActList⇐ 0,
4  count⇐ 0,
5  for i = 1 to TR do
6    if i=TR then
7      ActList.insert(i)

---

Algorithm 1: Dataset lookup table generation

8      Activity.insert(Labels[i])
9      Indexes.insert(ActList)
10     NoR.insert(count)
11   else if Labels[i]= Labels [i + 1] then
12     ActList. insert(i)
13     count⇐ count +1
14   else
15     ActList.insert(i)
16     Activity.insert(Labels[i])
17     Indexes.insert(ActList)
18     NoR.insert(count)
19     count⇐ 0
20     ActList⇐ 0

---

Algorithm 2: Real sensor data augmentation

Input: HAL, UCL, UC
Output: UC with augmented sensor measurements
1  Initialize: TR⇐ The UCL's total number of records.
2  features⇐ Column names of HA dataset (Features names)
3  for i = 1 to TR do
4    Act⇐ UCL[Activity][i]
5    If Act=Driving then
6      Act⇐ Sitting
7    FA⇐ HAL[UCL[Activity] = Act] /* Filter HAL records with the targeted activity (filtered activities) */
8    rand⇐ random number between 1 and the length of AF
9    diff⇐ UCL[NoR][i] − FA[NoR][rand]
10   if diff > 0 then
11     Loops⇐ UCL[NoR][i]/FA[NoR][rand]
12     Mlist⇐ FA[Indexes][rand]
13     if Loops is integer then
14       ActivityInd⇐ MList
15       count=0
16       repeat
17         ActivityInd.insert(Mlist)
18         count=count+1
19       until count=Loops-1
20   else if diff = 0 then
21     AcitvityInd⇐ Mlist
22   else
23     ActivityInd = Mlist[0 : UCL[NoR][i]]
24   for k = 1 to features.length( ) do
25     UC[features[k]].insert[HAL[features[k]]]

---

D. User Satisfaction Uncertainty Modeling

Figure 11:
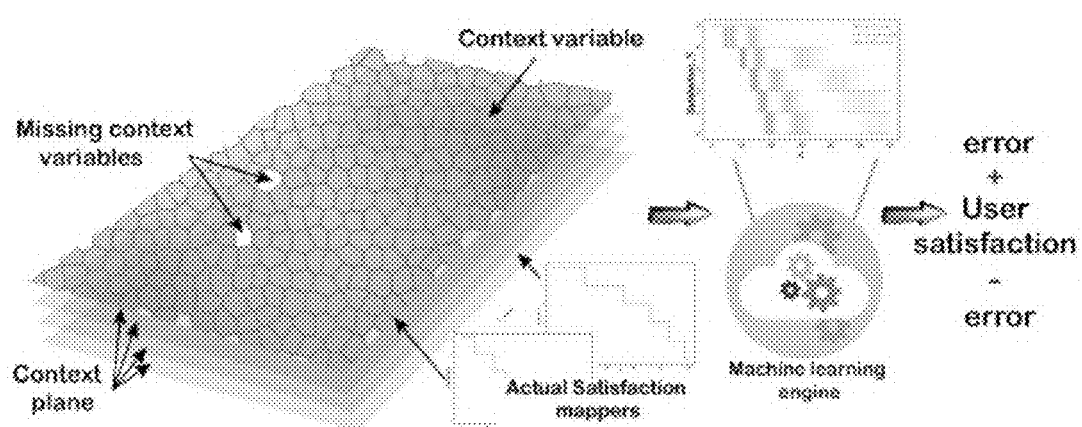
FIG. 11 presents a graphic visualization of the problem of user satisfaction prediction from user context data.

User satisfaction depends on many variables some of which are difficult to track and measure. In FIG. 11, we visualize the problem of user satisfaction prediction from user context data. As shown in FIG. 11, all the variables affecting user satisfaction prediction accuracy at a certain context are visualized as a plane. Each plane is associated with a certain context and user satisfaction behavior (i.e., mapper). User satisfaction behavior in each context is dependent on all context variables in the context plane.

Missing variables in the context plane will create gaps, which will add noise to the associated user satisfaction mapper as a result and therefore hinder the accurate prediction of user satisfaction. It is worth noting that the accuracy of user satisfaction prediction is highly correlated with the number of missing variables and the amount of missing information. In order to integrate the resulting error from missing user context information, we incorporate uncertainty into the user satisfaction mapper. Satisfaction uncertainty implies that for the same context and value of $\Delta$, satisfaction might slightly vary due to a shift in the predicted ZoT behavior compared to the original behavior. In this paper, we assume that the changes in $ZoT_s$ for the same context and is due to a shift in $\lambda$ value of the predicted satisfaction behavior. The value of $\psi$ is assumed to be fixed for specific context values. The change in $\lambda$ is modeled by an additional error $\delta$ added to the original $\lambda$ value associated with the considered context. For the purpose of this paper, we assume that the error $\delta$ has a normal probability distribution as follows:

$$P(\delta) = \frac{1}{\sqrt{2\pi\sigma^2}} e^{-\frac{\delta^2}{2\sigma^2}}. \tag{4}$$

Hence, the final $\lambda$ with added error ($\lambda_e$) is given by $$\lambda_e = \lambda + \delta. \tag{5}$$

Figure 12:
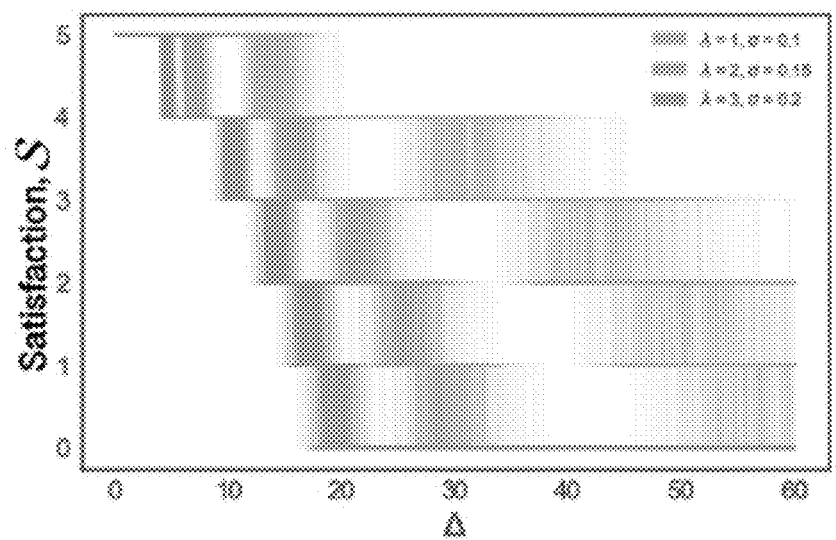
FIG. 12 presents an exemplary Satisfaction mapper with added uncertainty for $\psi=h$; $\sigma=0.1$, 0.15, and 0.2; and $\lambda=1$, 2, and 3.

The values of $\lambda$ and $\sigma$ are considered as inputs to the TG generator. This will enable the TG generator to associate a certain satisfaction behavior and error level with each context. In FIG. 12, we visualize the satisfaction mapper in (1) with added uncertainty error. It can be seen that as $\sigma$ increases, the amount of error added to user satisfaction decreases.

IV. User Satisfaction Prediction

As mentioned above, the relationship between satisfaction and $\Delta$ is not available to the network. Besides, user satisfaction is dependent on a complex set of factors, variables, noise, and other uncertainties. In order to capture the inherent patterns and anticipate future user satisfaction values from the available context data, the use of machine learning and big data analytics is highly advantageous. In order to investigate the effect of augmenting real sensor data into the dataset and the effect of incorporating statistical noise in the satisfaction mappers, we perform four classification experiments to predict user satisfaction using the following datasets:

A dataset with noise free satisfaction and without real sensor measurements augmentation. The accuracies for the three algorithms are labeled DT, Knn, and RF.

A dataset with noisy satisfaction and without real sensor measurements augmentation. The accuracies for the three algorithms are labeled DT-n, Knn-n, and RF-n.

A dataset with noise free satisfaction and real sensor measurements augmentation. The accuracies for the three algorithms are labeled DT-a, Knn-a, and RF-a.

A dataset with noisy satisfaction and real sensor measurements augmentation. The accuracies for the three algorithms are labeled DT-na, Knn-na, and RF-na.

All the aforementioned experiments are performed on the working professional persona dataset using the following set of ML algorithms: Decision Tree (DT), K-nearest neighbor (Knn), and Random Forest (RF). Data preprocessing, such as filtering, scaling, feature selection, and addressing class imbalance is considered. Moreover, hyperparameter tuning is conducted using grid-search.

Figure 13:
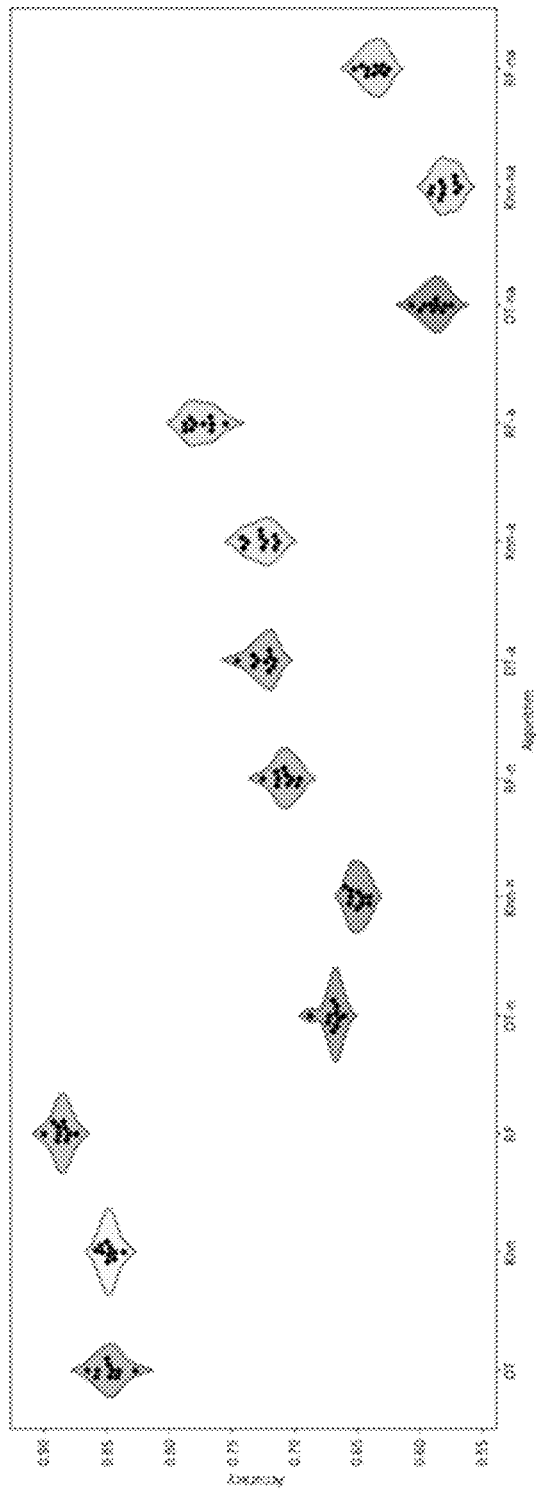
FIG. 13 presents an accuracy swarm plot for 10-folds cross-validation using DT, Knn, and RF algorithms.

FIG. 13 depicts the 10-folds cross-validation prediction accuracies for the four experiments and for each ML algorithm. Since there are six satisfaction levels, the random choice accuracy level is 0.166. It can be seen that the best accuracies were achieved by the first experiment, which is expected since this experiment was performed on error-free data. By contrast, the fourth experiment had the worst accuracies of all experiments due to the errors of the added satisfaction uncertainty and the real sensor measurements. It is worth noting that the predictors' performance in experiments three and four rely on the amount of noise added to the satisfaction mappers (i.e., the value of $\sigma$).

V. Conclusion

Wireless network personalization by means of machine learning and big data analytics is a tremendously promising research area. However, new research has been limited by a lack of published user behavior data with ground truth satisfaction labels due to privacy concerns and other technical limitations. To address this, we proposed a design methodology in this section to synthesize a user behavior (or context) dataset along with corresponding satisfaction information. In order to create synthetic datasets with characteristics similar to real-world datasets, error generation and augmentation strategies have been discussed. Finally, sample user satisfaction prediction experiments have been conducted and the effect of error integration on the prediction accuracies has been discussed.

Part III: Dataset Modeling for Data-Driven AI-Based Personalized Wireless Networks Abstract Current wireless networks are over-provisioned in order to maintain an average acceptable user experience for most users on the network. Over-provisioned networks suffer from several issues, however, including network inefficiency and the inability to maintain a certain user satisfaction level for all users. Data-driven wireless network personalization is proposed as a dynamic context-aware approach to maintaining the targeted personalized satisfaction levels with minimum resources. Wireless network personalization has two key enablers: measuring and predicting user satisfaction in real-time, and datasets that have both context and user satisfaction information. In this section, we first present the Zone of Tolerance (ZoT) concept, which is proposed for modeling the relationship between context, service performance, and user satisfaction. Then, since datasets for user behavior and their corresponding satisfaction levels do not exist due to privacy and confidentiality concerns, we propose a process based on the ZoT model for synthesizing a context-based dataset along with its corresponding user satisfaction values. Finally, an exemplary user satisfaction prediction experiment is conducted with the generated dataset using several Machine Learning (ML) algorithms.

I. Introduction

The explosive growth in wireless data traffic in recent years poses a challenge for the capacity limit of existing networks. Current wireless networks are typically over-engineered to achieve a minimum Quality of Service (QoS) requirement for all users [16]. As long as networks are over-provisioned, not even 5G networks and beyond will be able to keep up with emerging demand trends. In addition, over-provisioning decreases network efficiency and does not necessarily achieve the required user satisfaction levels.

As explained above, we see wireless network personalization as a way of improving existing networks. The proposed system utilizes non-intrusive real-time user satisfaction feedback to personalize wireless network decisions and thereby micromanage resources so that the required user satisfaction levels are achieved with a minimum allocation of resources.

The latest improvements in storage capacity and computational power, and the continuous growth of the amount of data paved the path for a more accurate analysis and prediction of user satisfaction by means of Artificial Intelligence (AI) and big data analytics. Nonetheless, wireless network personalization is still under-researched due to the lack of tangible ways to measure and model the non-intrusive real-time user satisfaction feedback.

Another barrier holding back innovation into new approaches for personalizing wireless networks is a lack of published user's behavior data along with the corresponding user satisfaction information. Companies and institutions who are capable of collecting such data on a huge scale do not publish it due to privacy and confidentiality concerns. Therefore, generating synthetic data that is flexible and has realistic characteristics is needed. In this section, we introduce a process for synthesizing a dataset based on the ZoT model. The proposed dataset can be used to predict future personalized user satisfaction values. In addition, user satisfaction prediction is conducted on the proposed dataset using an exemplary set of Machine Learning (ML) algorithms.

II. User Satisfaction Model

We note again that a schematic representation of our model of user satisfaction in wireless networks is shown in FIG. 7. We propose dividing user satisfaction into levels where each level is associated with a certain range of QoS. In FIG. 7, satisfaction is divided into 6 discrete levels: 0, 1, 2, 3, 4, 5. The number of satisfaction levels and how these are divided could vary depending on service provider preferences. Before proceeding to the detailed discussion of the user satisfaction model, it is worth mentioning that QoS can be a vector with several elements, such as rate, reliability, latency, and jitter. For simplicity's sake, however, we assume here that QoS is solely defined by rate. Our proposed user satisfaction model, as noted above, encompasses the following five main notions:

$QoS_d$: the demanded QoS by the user, which represents the maximum QoS associated with the requested service.

$QoS_p$: the provided QoS by the network.

$QoSa_i$: the adequate (minimum) QoS required to achieve a satisfaction level of i.

$ZoT_i$: the QoS range that satisfies the user with a satisfaction level of i. For i<5, $ZoT_i$ ranges between $QoSa_{(i+1)}$ and $QoSa_i$, whereas for i=5, $ZoT_5$ ranges between $QoS_d$ and $QoSa_5$.

$\Delta$: the difference between the QoS demanded by the user and the QoS provided by the network ($QoS_d - QoS_p$).

As shown in FIG. 7, as $QoS_p$ decreases, $\Delta$ increases and, as a result, satisfaction decreases. To keep user satisfaction at a certain level, $QoS_p$ should be within the ZoT associated with the targeted satisfaction level. It is important to note that $QoSa_i$ is what changes from one user to another, which consequently changes the width of the $ZoT_i$. Moreover, $QoS_d$ is assumed to be dependent on the application and service type; hence, it is constant for all users requesting service of the same application. Also, $QoS_d \geq QoS_p$; therefore, $\Delta \geq 0$.

III. Dataset Generation Model

It is common these days for users to carry or wear electronic devices (e.g., smartphones, smartwatches) that have built-in sensors, such as microphones, dual cameras, accelerometers, gyroscopes, and more. Users can therefore be considered a rich source of context data. An example of a user context information dataset can be found in [15], [18]. The availability of such context data presents new opportunities to develop new technologies that enable user-aware decisions in many applications.

Wireless network personalization is an application that utilizes context data along with user satisfaction data to predict the real-time user satisfaction level in a non-intrusive manner, using it to make personalized network decisions (see Part I). Although some context information datasets exist, large scale context information datasets, as well as datasets that have both context data and the corresponding satisfaction values, are not publicly available.

Figure 14:
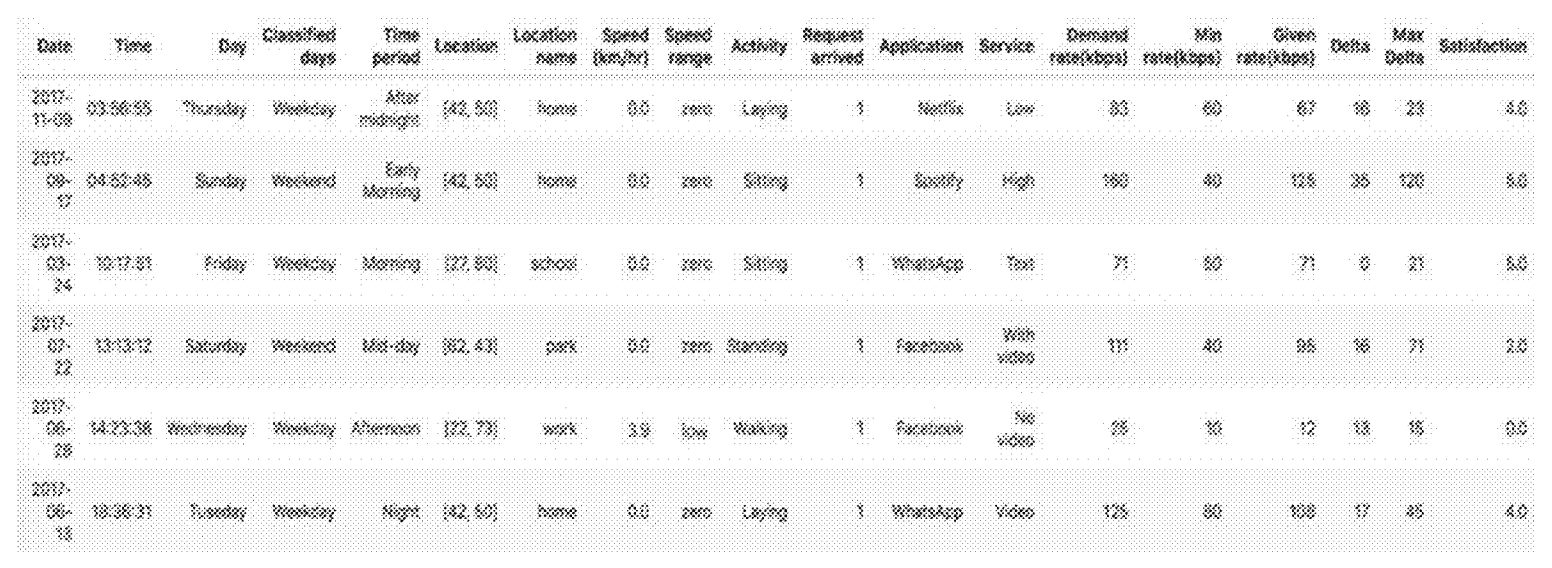

In this section, we present a process for synthesizing a dataset based on the proposed ZoT model. The proposed dataset structure consists of user context data and the corresponding satisfaction values. Context data are composed of a set of context variables, such as time and location. The measurements recorded in the proposed dataset are generated for one user over one year. The model used to design each context variable is also presented. In this dataset, a context variable could be a measured or engineered feature. Measured features, such as time, day, location, and speed are directly obtained from sensors. By contrast, engineered features, such as activity, are created on the basis of the measured features. Measured and engineered features are recorded at each measuring instant. The period between two measuring instants is referred to as a Time Slot (TS). For the purpose of this dataset, the TS length is assumed to be 1 second. The dataset can be found in a publicly available GitHub repository [14]. FIG. 14 illustrates sample instances from the proposed synthetic dataset. In order to model a realistic synthesis of user context with the proper correlation, we introduce rule-based and Markov chain-based relations between features (i.e., context variables). FIG. 15 illustrates these relations between four examples of features. Nodes represent features and links represent relations between features.

A. Date, Time, and Day

Date, Time of the day, and Day of the week are among the measured features added to the dataset. In addition, days of the week are classified into weekdays and weekends to create the Classified days engineered feature. Moreover, the time of the day is classified into 7 periods to create the Time period engineered feature. Time periods are assigned as follows: Early Morning: 04:00 AM-05:59 AM, Morning: 06:00 AM-10:59 AM, Mid-day: 11:00 AM-13:59 PM, Afternoon: 14:00 PM-17:59 PM, Night: 18:00 PM-23:59 PM, After midnight: 00:00 AM-03:59 AM.

B. User location

The user considered for this dataset is assumed to live in Ottawa, Canada. Instead of recording the user's GPS location, we engineer the user Location feature, which is created by dividing the Ottawa area into a 100*100 grid with a distinct ID for each square. The area covered by each square is $91 \times 10^{-5}$ km$^2$ and the distinct location ID is recorded to the dataset under the Location feature. Usually, most people follow location patterns in their daily life. Although these patterns do not occur with 100% probability, for the purpose of this dataset, we assume that the user has a certain and distinct location pattern for weekdays and weekends. In this paper, the set of roads and destinations that constitute a location pattern is called the ring of locations. Roads and destinations are added to the dataset under the Location name feature. Roads are named Rij, where i is the initial of the starting location and j is the initial of the destination. For example, Rhp refers to the road from home to the park. FIG. 16a and FIG. 16b depict the weekday and weekend rings of locations for the considered user, respectively.

Figure 17:
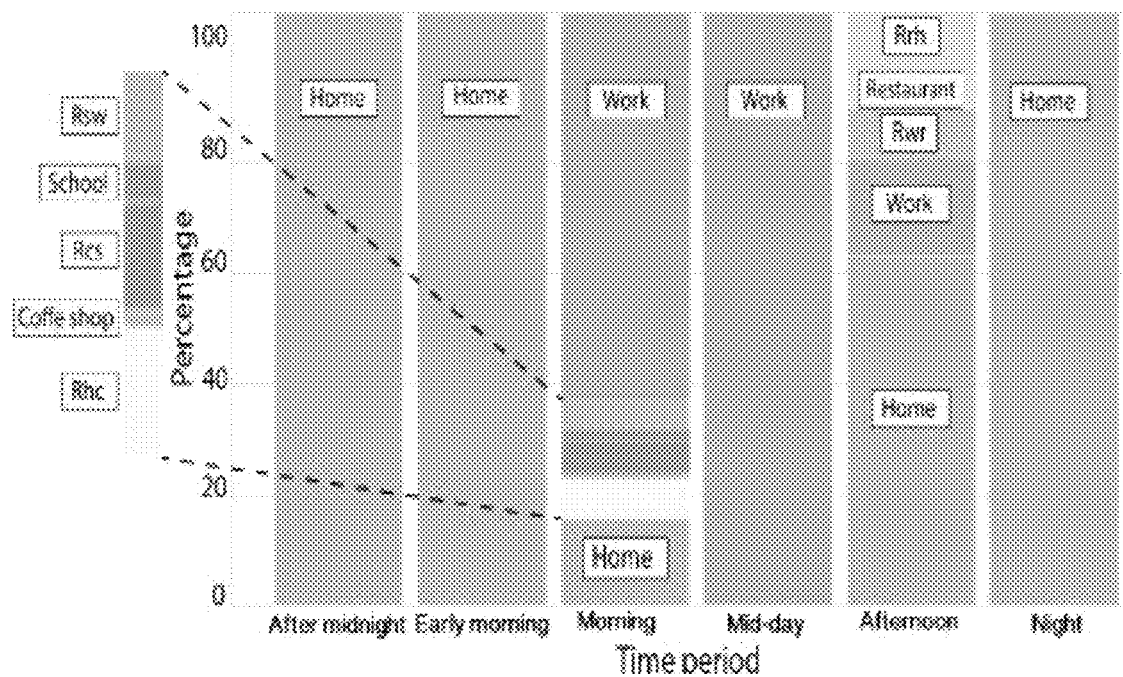
FIG. 17 presents a graphic representation setting out the percentage of time the user spent at each location over each time period on a weekday.

The dependency of location on time is modeled using Markov chain probability with transition probabilities dependent on the next destination, time period, and current location. In FIG. 17, in order to illustrate the correlation between the time period and location features, we plot the percentage of time the user spent at each location over each time period on a weekday. From FIG. 17, it can be deduced that the user spends most of his\her time on weekdays at work and at home.

C. User Speed

User speed is a measured feature that we model as a uniform random variable with a defined average speed. FIG. 16a and FIG. 16b illustrate the speed heat map in km/hr for each location square using data generated for two days, a weekday and a weekend day, respectively. User speed in km/hr is classified into four ranges: High, Medium, Low, and Zero speed to create the Speed range engineered feature.

D. User Activity

Figure 18:
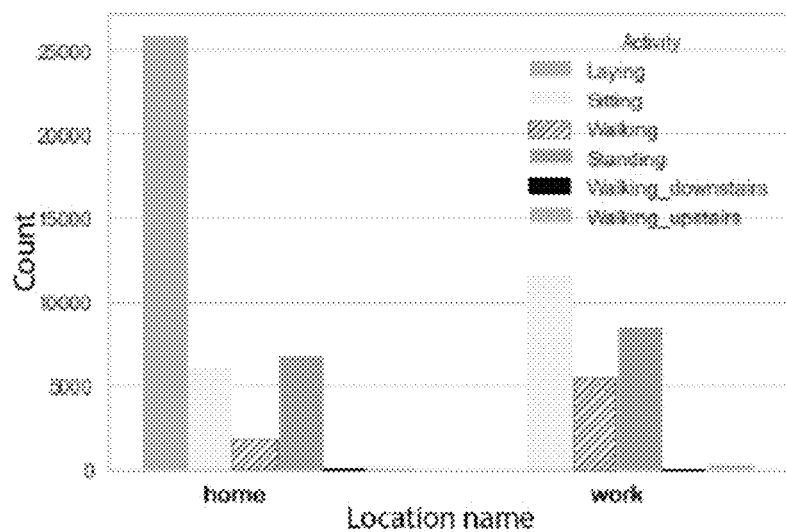
FIG. 18 presents an exemplary histogram of the recorded instances on a weekday for six activities at two locations.

Since user activity influences user satisfaction significantly, we consider it to be an important aspect of the user context and incorporate it into the proposed dataset. A large body of literature discusses activity prediction using ML from data collected using various types of sensors [15]. Accordingly, instead of adding raw sensor measurements to the proposed dataset, we incorporate Activity labels as an engineered feature. Although there exist numerous types of activities, for the purpose of this paper, we assume that the recorded user activity is one of the following: 1) walking, 2) sitting, 3) walking upstairs, 4) walking downstairs, 5) standing, and 6) laying. Similar to the aforementioned context variables, the user activity variable is designed such that it is correlated with other context variables. FIG. 18 presents the histogram of the recorded instances on a weekday for each of the six activities at two locations, home and work. It can be seen that the user's most frequent recorded activity at home is laying, whereas the user's activity at work is confined to three activities: sitting, walking, and standing.

E. Request Arrival Time

It is assumed that the user requests N service requests in a day with at most one request within a TS. The arrival of a request during a certain instant is recorded to the dataset using a binary variable called Request arrived (see FIG. 14). Request arrival is dependent on time (t) in hours, the day of the week (d), location (l), and speed (s) in km/hr. In order to model this dependency, we use a non-homogenous Poisson random process [19]. A non-homogeneous Poisson process with arrival rate $\lambda_r$ (t, d, l, s) is defined as a counting process N(t) for t>0. The probability of a request arrival in an interval $\delta$ is given by:

$$P\{N(t,t+\delta)=1\}=\delta\lambda_r(t,d,l,s)+o(\delta), \quad (1)$$

where $N(t, t+\delta)=N(t+\delta)-N(t)$ and $o(\delta)$ is a function that goes to 0 faster than $\delta$ as $\delta \Rightarrow 0$. Since we need to generate a correlation between the Request arrived variable and other context variables, $\lambda_r$ is modeled as a function of the context variables t, d, l, and s. In order to illustrate the correlation between the request arrival rate and other context variables, we choose d and t as examples of features to plot $P\{N(t, t+\delta)=1\}$. FIG. 19a and FIG. 19b demonstrate $P\{N(t, t+\delta)=1\}$ vs. t for a) a weekday and b) a weekend day. For a weekday, the user tends to issue requests with a higher probability between 5 AM and 3 PM. By contrast, for a weekend day, the user tends to issue requests with a higher probability between 11 AM and 5 PM.

F. Application Choice

We assume that the user issues service requests from a specific set of applications (see Table III below). Similar to other context variables, the application feature is also correlated with other context variables, such as time and location, and it is recorded to the dataset under the Application feature.

TABLE III

The set of services and their associated demand rate for the considered set of applications.

| APPLICATION | SERVICE | DEMAND (in Kbps) |
|---|---|---|
|  | 360p | 93.75 |
|  | 480p | 126 |
|  | 720p | 312.5 |
|  | 1089p | 562.5 |
|  | Low | 38.33 |
|  | Medium | 193.3 |
|  | High HD | 833.3 |
|  | No video | 25-41 |
|  | With video | 93.75-125 |
|  | Normal | 96 |
|  | High | 160 |
|  | Extreme | 320 |
|  | — | 25-41 |
|  | Text | 71 |
|  | Picture | 867 |
|  | Video | 125 |
|  | Call | 740 |
|  | Text | 17.3 |
|  | Picture | 86.7 |
|  | Video | 89.1 |
|  | Our story | 14.76 |
|  | Discovery | 90 |
|  | — | 16.67-166.67 |
|  | Voice | 100 |
|  | Video | 500 |
|  | Video HD | 1500 |
|  | Video-3 people | 2000 |
|  | Video-5 people | 4000 |
|  | Video-5 people | 8000 |

G. Service Type

Table I lists the set of services associated with each application. Similar to applications, the choice of the Service depends on context as well. FIG. 20 depicts the heatmap of the instance count for services requested by the user and their corresponding application over a one-week period. As shown in FIG. 20, the most popular service for this user is WhatsApp video.

H. Demand Rate, Given Rate, and $\Delta$

The Demand rate (i.e., $QoS_d$) feature represents the rate requirement associated with the service requested by the user. Table III lists the service demand rate requirement data aggregated from several sources. On the other hand, the rate assigned to the user by the network is recorded to the dataset under the Given rate (i.e., $QoS_p$) feature. Given rate is designed in such a way that it is correlated to some other context variables, such as time and location to model the effect of cell congestion. Lastly, for each service request, $\Delta$ is computed and recorded to the dataset under the Delta feature.

IV. User Satisfaction Generation Model

User satisfaction is assumed to be correlated with context and $\Delta$ (see FIG. 7). In order to generate satisfaction values (S) based on the proposed ZoT model, we propose the following non-linear mathematical formulation:

$$S(\psi, \Delta, \Delta_{max}, \lambda) = \begin{cases} \alpha_h \cdot \beta_h \cdot e^{\left(\frac{\Delta_r \zeta \lambda}{\Delta_{max}}\right)} + 6 & , \text{for } \psi = h, \Delta \leq \Delta_{max} \\ 5 \cdot \beta_l \cdot e^{\left(\frac{\Delta_r \zeta \lambda}{\Delta_{max}}\right)} & , \text{for } \psi = l, \Delta \leq \Delta_{max} \\ 5 & , \text{for } S > 5 \\ 0 & , \text{for } \Delta \geq \Delta_{max} \| S < 0 \end{cases} \quad (2)$$

where $\alpha_h=-1$, $\alpha_l=1$, $\beta_h=1.001$, $\beta_l=0.999$, $\zeta=1750$, and $\lambda \geq 0$. The values of the aforementioned variables are tuned such that the proposed nonlinear mapper in (2) reflects the proposed ZoT satisfaction model. Also, the nonlinear model in (2) is chosen to echo the jumps in satisfaction with the varying $\Delta$. Since the minimum rate a user could receive is zero, $\Delta_{max}$ is equal to user demand (i.e., $\Delta_{max}=QoS_d-0$). User satisfaction behavior at a specific context is modeled using two variables, $\lambda$ and $\psi$. As $\lambda$ decreases, ZoT and satisfaction increase, and vice versa. Also, a satisfaction mapper with $\psi=l$ indicates tighter ZoTs for higher satisfaction values compared to lower ones. Similarly, $\psi=h$ indicates a more relaxed ZoTs around higher satisfaction values compared to lower ones. Notably, at a certain context, $\lambda$ and $\psi$ have fixed values and user satisfaction model is a function of $\Delta$.

FIGS. 21a and 21b visualize the S mapper in (2) for $\psi=h$ and $\psi=l$, respectively, in conjunction with $\Delta_{max}=100$ and different values of $\lambda$. From FIGS. 21a and 21b, it can be deduced that for a certain context (i.e., fixed $\psi$, $\Delta_{max}$, and $\lambda$), S is solely a function of $\Delta$. Moreover, for the same $\lambda$ value, S with $\psi=h$ (see FIG. 21a) has greater ZoTs compared to S with $\psi=l$ (see FIG. 21b). Finally, another significant aspect of the proposed mapper in (2) is that ZoTs increase with the decrease of $\lambda$ for all satisfaction values. In this paper, each context is associated with a certain combination of $\lambda$ and $\psi$.

V. User Satisfaction Prediction

In practice, the relationship between satisfaction and $\Delta$ (e.g., FIGS. 21a and 21b) is not available to the network. Besides, user satisfaction is shaped by a complex set of factors and variables in which their interconnected effects on user satisfaction cannot be modeled using traditional mathematical equations. Therefore, ML and data analytics are important to extract patterns and knowledge from historical data and use it to predict user satisfaction behavior in the future.

For the purpose of illustrating the benefits of the proposed ZoT model and the dataset, we perform user satisfaction prediction using the following traditional set of ML algorithms: Decision Tree (DT), K-nearest neighbor (Knn), and Random Forest (RF). Data preprocessing, such as filtering, scaling, feature selection, and addressing class imbalance is considered. Moreover, hyperparameter tuning is conducted using grid-search. FIG. 22 depicts the 10-folds cross-validation prediction accuracies for each ML algorithm. Since there are six satisfaction levels, the random choice accuracy level is 0.166. FIG. 22 shows that the best performance is achieved using RF (ensemble) algorithm with an average accuracy of 0.884 compared to 0.85 for DT and Knn. It is worth mentioning that the predictors' performance should be directly related to the number of relevant context variables available to the ML algorithms.

VI. Conclusion

Wireless networks are designed to satisfy a minimum QoS requirement in order to assure that users receive a satisfactory service at any network condition. Integrating personalization into wireless networks will enable further optimization of the available resources such that actual user demand can be matched with a personalized QoS offered by the network. This level of micro-management can be achieved through the utilization of AI and big data analytics to predict and thereby optimize user satisfaction in different contexts. User satisfaction prediction necessitates the continuous measurement and tracking of user satisfaction in wireless networks, which is why the ZoT model was proposed. Based on the ZoT model, a synthesized context-based dataset was modeled along with the corresponding user satisfaction values. Eventually, an exemplary user satisfaction prediction experiment conducted on the proposed synthetic dataset showed that RF has a superior performance compared to DT and Knn.

Part IV: Data-Driven User Persona Prediction Framework for Personalized Wireless Networks Abstract Wireless network personalization is an emerging technology that has considerable potential to achieve the ultimate balance between resource allocation and user satisfaction. One of the main enablers of personalized networks is the continuous monitoring and prediction of dynamic user satisfaction levels in various contexts. Accurate satisfaction prediction requires a lot of data, and unfortunately, data and the process of acquiring it are expensive. A closer look at user behavior and satisfaction levels reveal that certain users share certain similarities. A group of users who share similar user behavior and satisfaction patterns is referred to as a persona. Associating users with pre-existing user personas will enable networks to provide highly personalized service with a minimal amount of data, thereby improving the efficiency of personalized networks. In this paper, we propose a novel data-driven framework to predict user personas in personalized wireless networks. The proposed framework is supported with a confidence assessment step to ensure the association of the correct persona type with each user. Finally, we conducted a comprehensive study to investigate the effects of different amounts of data and confidence levels on the performance of the overall framework.

I. Introduction

As explained above, new advancements in technology with their diverse performance requirements are creating a surge of data traffic, which creates several issues in effectively managing user experience in wireless networks. In order to make the process of big data collection and storage beneficial and to solve the issues resulting from the diversification in applications and performance requirements, we proposed an AI-based data-driven wireless personalization framework [20]. This framework requires monitoring, capturing, and predicting future user satisfaction values in real-time in order to enable wireless networks to support personalized, fine-grained services and decisions based on user's needs and expectations. To track, measure, and analyze user satisfaction in wireless networks, we proposed the concept of Zone of Tolerance (ZoT) (see Parts II and III). ZoT is a non-linear model that captures the relationship between the performance of the provided service and satisfaction levels of each user. In addition, it dynamically reflects the changing user satisfaction behavior and expectations for different context values. In Part V, we proposed a data-driven framework to measure and predict user satisfaction values in wireless networks. This framework describes the process of acquiring, analyzing, and modeling user satisfaction information using machine learning (ML), particularly deep learning techniques. Another step that supports the proposed framework in Part V and makes it more efficient and robust is the concept of user personas (see Part II). A persona in a personalized wireless network is a set of user context patterns and associated user satisfaction behavior characteristics that are shared by a group of people.

There are several benefits to integrating persona modeling in the prediction of user satisfaction values. First of all, in the real world, people share certain similarities. Therefore, predicting user satisfaction based on the assumption that all users in the network are drastically different is not an efficient or practical design. Grouping users with similar contextual and user satisfaction behavioral characteristics reduces the need for collecting and storing huge amounts of data; it also reduces the computational complexity and processing power required. Another notable advantage of integrating user persona modeling is that it enables personalized wireless networks to provide personalized services to new users joining the network about whom there is not yet enough information concerning their preferences or behavior in the network. This can be done by simply associating the new user with a pre-existing user persona.

In order to build the aforementioned capabilities, and to integrate the benefits of user persona design into personalized wireless networks, we propose an innovative data-driven framework which employs real-time data analytics and machine learning capabilities to learn and predict user personas in real time, which subsequently improves user satisfaction monitoring and prediction in personalized wireless networks. In this paper, we begin by presenting background on the design and utilization of user personas in various applications. Then, we propose and discuss our data-driven user persona prediction framework for personalized wireless networks. Next, we implement the proposed framework in order to illustrate its potential benefits. Finally, we conduct a comprehensive study to investigate the effects of different data amounts on the performance and confidence levels of the machine learning model.

II. Background and Related Work

Studying, designing, constructing, and predicting user personas for various applications has considerable potential and benefits. In this section, we categorize the literature on user personas in terms of the types of applications utilizing user personas, user persona design, sources of data utilized to create user personas, and methodologies used to classify users/people into personas.

A. Types of Applications Utilizing User Personas

The concept of user personas features prominently in business, advertising, and marketing studies for the purpose of abstract user representations [21]. Advertisements and marketing strategies based on user personas are very popular in the literature, and many proposals have been made to actualize this approach [22], [23]. In addition, personas have been utilized to capture the individual characteristics of speech and background [25].

B. User Persona Design

The user persona designs proposed in the literature can be categorized into two main categories. The first design category involves personas with fixed characteristics designed by domain experts.

For instance, the author in [28] proposed a statistical technique to create user personas based on user needs and preferences. The second category involves flexible personas with dynamic characteristics created using data-driven real-time analytics, such as the solutions proposed in [29] and [30].

C. Sources of Data

Depending on the purpose of the persona design and the targeted application, several sources of data have been utilized to collect the information required to group and categorize users/people. We chose to categorize them as offline and online data sources. Offline data are manually collected using studies and questionnaires (e.g., market segmentation studies, field studies, and focus group) [28]. By contrast, online data are collected from the activities of users on the cloud. For instance, the authors in [30] utilized social media data, specifically youtube social media, to create user personas.

D. Persona Classifications/Clustering Approaches

Researchers have adopted several approaches for classifying users into different personas. One of the most popular approaches is to cluster or classify users based on behavioral data, such as physical activity and virtual activities. Another approach is to utilize information about user interests, opinions, age, and other demographic information [28]. Moreover, personas are also grouped based on user goals and decision-making preferences [31]. It is worth noting that some approaches are designed using a combination of some or all of the aforementioned approaches [29], [30].

Figure 23:
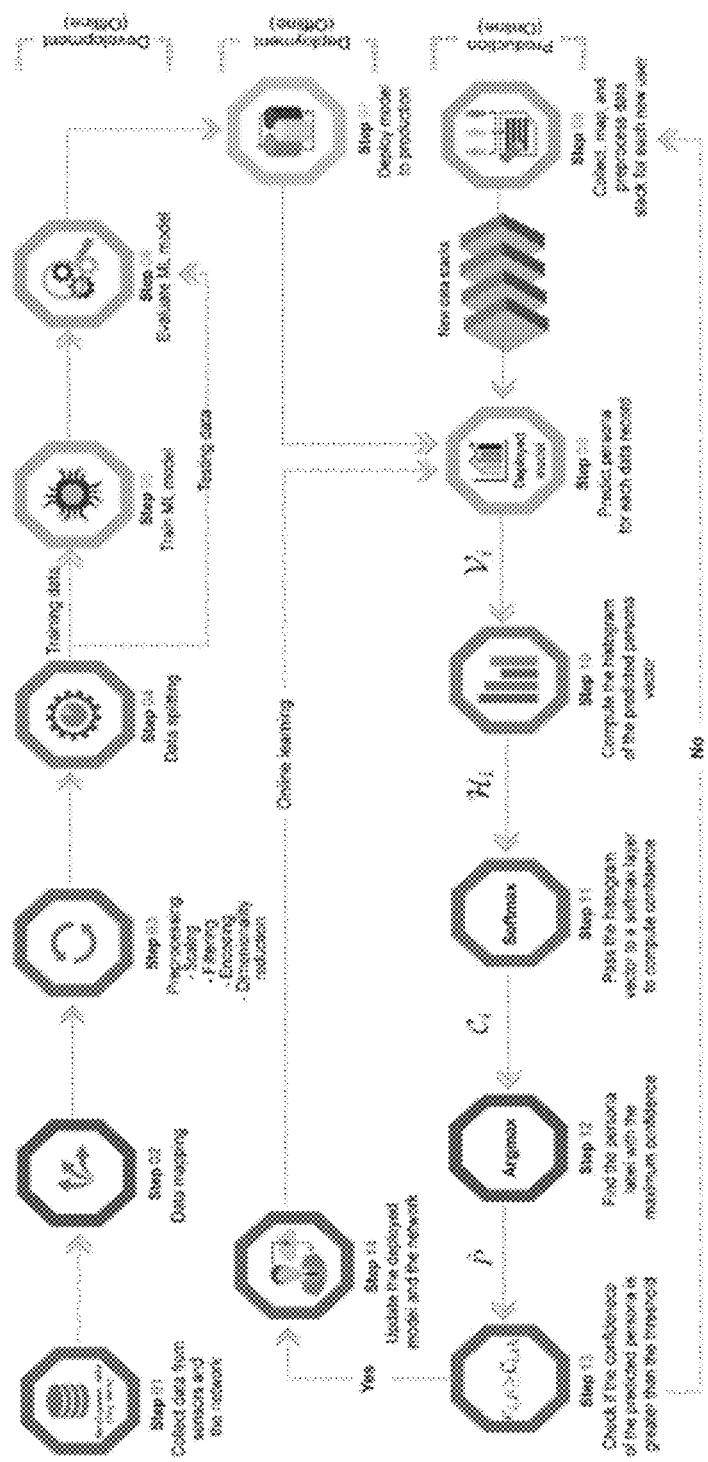
FIG. 23 presents a process flow diagram of an exemplary data-driven persona prediction framework for personalized wireless networks.

III. Data-Driven User Persona Prediction Framework for Personalized Wireless Networks In marketing and social media contexts, users are generally classified on the basis of patterns in their behavior, activities, and interests. However, in personalized wireless networks, users should also be classified based on patterns in user satisfaction behavior. A satisfaction behavior for a user represents his/her satisfaction patterns for various levels of service performance in a specific context. Integrating the capabilities of identifying these behavioral and satisfaction patterns is key for enabling personalized wireless networks. In FIG. 23, we propose a data-driven framework for implementing user persona prediction in personalized wireless networks. The proposed framework consists of three main processes: development, deployment, and production. In this section, we discuss these three processes and the steps involved in each.

A. Model Development

As shown in FIG. 23, the development process goes through multiple stages before the output model is deployed in the network. Here, we describe the steps involved in the development process.

Data collection: The first stage is to collect context data and associated user satisfaction data from the network itself or from sensors. Since such data is not publicly available due to privacy and confidentiality concerns, we proposed synthetic context-satisfaction datasets in Parts II and III that can be utilized for data-driven prediction and optimization in personalized wireless networks. The datasets are designed meticulously to reflect realistic characteristics of real user data, and they are publicly available in a GitHub repository [14]. In Part II, we proposed datasets for four distinct personas: 1) a working professional (WP), 2) a high school student (HS), 3) a university student (US), and 4) a homemaker (HM). For the purpose of this paper, we merged the four datasets, which we designated as the user context-satisfaction (CH) dataset. In addition, in order to distinguish between data associated with each persona, we incorporated a new label column called Persona. Table IV shows the features of the dataset and an example of their values (the dataset in [14] has other features, such as real sensor measurements. However, for the purpose of this paper, we consider only the features listed in Table IV).

TABLE IV

Features of the CH dataset

| No. | Feature name | Units | Example |
|---|---|---|---|
| 0 | Date | — | Jan. 10, 2018 |
| 1 | Time | — | 14:55:02 |
| 2 | Day | — | Wednesday |
| 3 | Classified days | — | Weekday |
| 4 | Time period | — | Afternoon |
| 5 | Location | — | [22, 73] |
| 6 | Location name | — | Work |
| 7 | Speed | km/hr | 5.2 |
| 8 | Speed range | — | Low |
| 9 | Activity | — | Walking |
| 10 | Request arrived | — | 1 |
| 11 | Application | — | WhatsApp |
| 12 | Service | — | Picture |
| 13 | Demand rate | kbps | 867 |
| 14 | Min rate | kbps | 600 |
| 15 | Given rate | kbps | 802 |
| 16 | Δ | — | 65 |
| 17 | Max Δ | — | 267 |
| 18 | Satisfaction | — | 4.0 |
| 19 | Persona | — | WP |

Data mapping: In order to capture correlations between users belonging to the same persona, data should be mapped to shared space. For instance, user location is recorded as GPS coordinates. However, generally, user satisfaction behavior and persona types are actually correlated to a particular type of location (e.g., home) rather than to GPS coordinates. Therefore, the features in the CH dataset are mapped to the same shared space.

Preprocessing: The next stage is to preprocess the data, which consists of the following steps.

Filtering. The CH dataset was recorded for a period of one year. Also, the resolution (i.e., the time period between two records) of the CH dataset is one second. For the purpose of this paper, we selected a part of the dataset where the filtered dataset spans a four month period. The total number of records in the dataset is 31,536,000. Naturally, users do not use the network during all measuring instances. Therefore, since user satisfaction behavior is an important part of user persona design and prediction, we filtered out records that had no service requests from the network and that did not carry any satisfaction information. The dataset was filtered on the basis of the Request arrived feature, which is set to 1 when a user requests a service from the network and, otherwise, is set to 0. The filtered number of records is 38,166.

Data re-scaling. Scaling data is a very important step especially for ML algorithms, such as support vector machine and neural networks, where the distance between the data points matters. In this paper, we perform MinMax scaling [32], which is typically done via the following equation:

$$X_{scaled} = \frac{x_i - \min(X)}{\max(X) - \min(X)}, \forall x_i \in X, \quad (1)$$

where X=[x1, x2, . . . , xm] is the input vector and m is the number of input features.

Encoding categorical values. Many ML algorithms cannot directly ingest categorical values. Hence, encoding categorical values is a necessary step that must precede the feeding of the data into the predictive model. In this paper, we encode categorical values using one-hot encoding [33].

Figure 24:
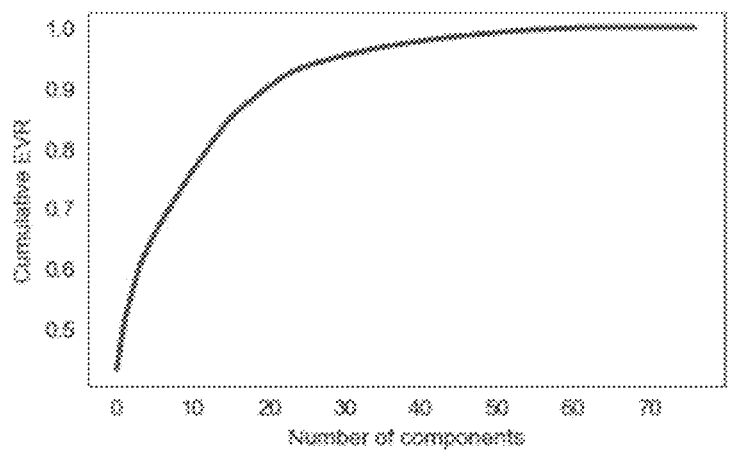
FIG. 24 presents a graph of cumulative EVR vs. the number of components.

Dimensionality reduction. User data in wireless networks are characterized by a high number of features, which also means a high number of dimensions. In addition, one-hot encoding will further increase the dimensionality of the data. High-dimensional data are at risk of being very sparse, where most instances are likely to be far away from each other. As a result, predictions using high-dimensional data are much less reliable compared to data with lower dimensions [34]. One way to solve this issue is to increase the amount of training data. However, user data is expensive, difficult to acquire, and not always available to the network. For these reasons, in order to extract relevant behavioral and satisfaction patterns in the most effective way, we propose the utilization of principal component analysis (PCA), which is the most popular dimensionality reduction algorithm [35]. PCA identifies the hyperplane that lies closest to the data and then projects the data onto it. The hyperplane is chosen such that it preserves the highest variance. The PCA algorithm needs the number of principal components to be fed as input. The number of components should be as small as possible while maintaining a reasonable variance in the data. A useful piece of information that can be used to find the optimal number of components is the explained variance ratio (EVR) of each principal component. EVR describes the percentage of the dataset's variance that lies along the axis of each component. In FIG. 24 we plot the cumulative EVR as a function of the number of components. For the purpose of our model, we aimed to preserve at least 98% variance using the minimum number of components. As shown in FIG. 24, 98% cumulative EVR was achieved using at least 50 principal components.

Train and validate the model: There are several ML algorithms that can be used to build a predictive model. From a practical point of view, the best predictor candidate for our proposed framework is a deep neural network (DNN) algorithm. This is due to the fact that data collected from wireless networks are colossal and, in contrast to other learning algorithms, DNNs learn more and get better the more data is fed into them. Moreover, as a result of recent breakthroughs, DNNs are faster and more efficient than before in handling huge amounts of data; hence they are extremely attractive for real-time applications, such as our proposed framework. In this paper, for the purpose of comparison, we implement support vector machine (SVM) as well as DNN as the predictors of the proposed framework. SVM and DNN structure design, tuning, and performance will be discussed in the following section.

B. Model Deployment and Production

Once the output model from the development process has been tested, tuned, and optimized in the development environment, the next step is to deploy the model into production. Production machines are continuously running operating systems with servers that are highly optimized to meet expected load and demand. In this section, we describe the stages of implementing the deployed model into the production process.

Collect data stack for each user: In this stage, the network collects data from new users joining the network in order to predict their persona type. As mentioned earlier, a user persona describes users with similar user behavior and satisfaction patterns over time. Therefore, in order for the predictor to achieve accurate results, it should be able to decide based on more than one data record. For this reason, the proposed predictor is designed to congest a stack of data prior to deciding on the predicted user persona. To this end, we used random statistical sampling without replacement in order to build data stacks for different users. Each stack was sampled using the entire population of the test data associated with the ground truth persona. For each persona, we sampled 500 stacks of data for 500 users. Hence, the total number of testing stacks was 2000 stacks with a stack size of B. The effect of changing B on the performance of the proposed framework will be discussed in Section IV.

Predict user persona for each data record: For new users, the network collects a stack of data from the user in question and feeds it to the ML model. As shown in FIG. 23, each stack is fed into the ML model in order to predict user personas for each data record. At this step, the output of the predictor model is the vector $V_i=[v_{i,1}, v_{i,2}, \ldots, v_{i,B}]$, where B is the stack size and i is the user number. Each $V_i$ will be used to predict the final persona label for user i.

Compute confidence: After predicting the persona label for each data record, the next stage in the proposed framework is to assess the confidence of the predictor. This step is valuable due to the significant impact of using wrong persona labels on the performance of personalized networks. The confidence is computed using two steps. The first step is to compute the histogram of the predicted labels listed in $V_i$ for each user i. The output histogram vector is denoted as $Hi=[h_{i,1}, h_{i,2}, \ldots, h_{i,N}]$, where N refers to the number of unique persona labels. The second step is to compute the confidence of the prediction by passing $H_i$ through a softmax layer defined by $$C_i = \sigma(\mathcal{V}_i)_j = \frac{e^{v_{i,j}}}{\sum_{k=1}^{\mathcal{B}} e^{v_{i,k}}}, \forall V_{i,j} \in \mathcal{V}_i. \quad (2)$$

The output of the softmax layer is the confidence vector $Ci=[c_{i,1}, c_{i,2}, \ldots, c_{i,N}]$, where $c_{i,1}$ is the confidence of persona 1 for user i.

Find the predicted persona: The next stage is to find the predicted persona label $\hat{P}i$ which has the maximum confidence as follows:

$$\hat{P}_i = \underset{y}{\text{argmax}}\, y \cdot C_i, \forall y \in \mathcal{Y}, \quad (3)$$

where y is the one-hot encoded vector associated with the persona. For instance y for persona number 2 is [0, 1, 0, 0].

Validation: The proposed persona prediction framework is supported by a validation stage. The validation stage checks whether the confidence of the predicted persona is greater than a specified threshold $C_{i,th}$. As shown in FIG. 23, if $c_{i,\hat{P}} \geq C_{i,th}$, $\hat{P}$ is passed as the final prediction result. However, if $c_{i,\hat{P}} < C_{i,th}$, the network is directed to increase stack size, and hence collect more data from the user. The validated predictions are fed back to the deployed model. The deployed model continuously learns from the arriving samples in a process known as online learning.

IV. Experimental Results

In this section, we assess the proposed persona prediction framework for personalized wireless networks. As mentioned earlier, the dataset used for our experiment is the CH dataset, which is publicly available in [14]. In assessing the framework, we focus on building, tuning, and optimizing the ML model as well as the implementation of the production process. The implementation of the experiments were done in python. The DNN model was built using the TensorFlow library. Tensor-Flow is a high-performance computational framework with a highly flexible structure. Originally developed by Google's engineers, TensorFlow comes with strong support for machine learning and especially deep learning algorithms. In addition, the Sklearn library was used for preprocessing the data, whereas seaborn and matplotlib were used for visualization purposes.

A. The ML Model Design

For the purpose of this paper, we compare the performance of the proposed framework using two different ML algorithms, SVM and DNN. SVM and DNN are well known for their ability to capture complex relations and patterns, and therefore they are great candidates for our experiment. We split the CH dataset into 60% training and 30% testing data. Then, the SVM and DNN models were tuned using grid-search to maximize performance. The tuned SVM parameters were $C=100$ and $\gamma=0.1$. By contrast, the structure of the tuned DNN model was composed of four hidden layers as follows:

First hidden layer: 1024 neurons.
Second hidden layer: 1024 neurons.
Third hidden layer: 512 neurons.
Fourth hidden layer: 512 neurons.

In addition, we integrated dropout into the DNN model with a rate of 0.15 in order to improve the model generalization and reduce overfitting.

B. Performance of ML Models vs. Stack Size

Figure 25:
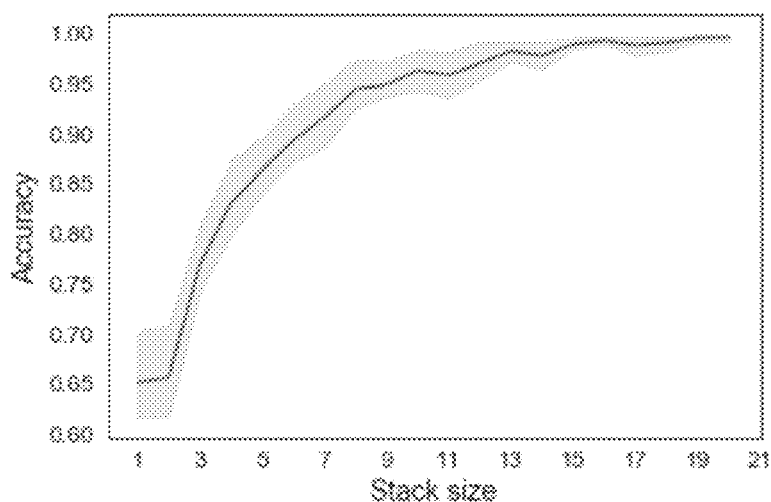
FIG. 25 presents a graph of the accuracy and accuracy variance of the proposed persona prediction framework vs. stack size using SVM.
Figure 26:
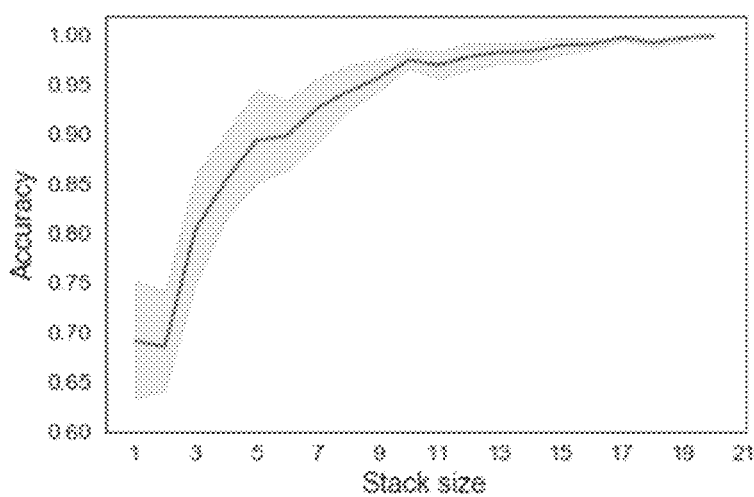
FIG. 26 presents a graph of the accuracy and accuracy variance of the proposed persona prediction framework vs. stack size using DNN.

As shown in the development process in FIG. 23, the ML models were trained using all the labeled data records available in the network. However, in the production process, prediction was performed using a stack of data for each user. This enables the ML model to ingest more data before making the final decision about the predicted persona label. One would expect that the more data collected from users, the more accurate the final decision would be. In order to investigate this assumption, we explore the effect of stack size on the performance of our predictors. In FIG. 25 and FIG. 26, we plot the average accuracy vs. stack size for the SVM and DNN predictors, respectively. In addition, we plot the prediction accuracy variance for the four personas using a shaded area around the accuracy curve. As shown in FIG. 25 and FIG. 26, DNN performed slightly better compared to SVM, especially for smaller stack sizes. Also, as expected, the performance of both predictors increased as stack size increased. Moreover, the variance of predictor accuracy decreased significantly as stack size decreased.

Although higher amounts of data increase predictor performance, acquiring data is expensive for the network. Therefore, one should choose an optimal stack size that will reduce the amount of data required without sacrificing a significant portion of accuracy. As shown in FIG. 25 and FIG. 26, the rate of improvement in the predictor's accuracy decreased as stack size increased, almost plateauing at a stack size of 12. The optimal stack size depends on service provider preferences and the amount and quality of the data available. Service providers demanding higher prediction accuracies should allocate more resources to acquiring more data, which means using a higher stack size. It is also worth noting that the number of persona labels will also affect the performance of the predictors and the required stack size to achieve a certain accuracy. The higher the number of unique persona labels, the higher the amount of data required to differentiate between the users belonging to different personas.

C. Confidence vs. Stack Size

Figure 27:
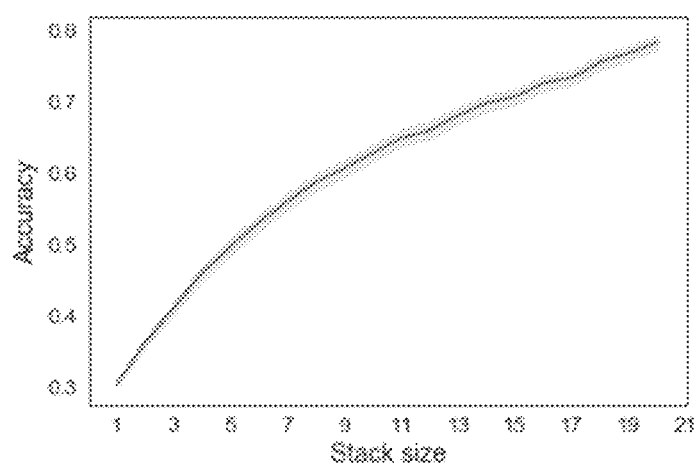
FIG. 27 presents a graph of the confidence and confidence variance of the persona prediction framework vs. stack size using DNN.

As shown in FIG. 23, prediction confidence plays a vital role in our proposed framework. Instructing the network to act on the basis of a falsely predicted persona will dramatically affect user experience and satisfaction levels. Since the network has no prior definite knowledge of the persona of new users, the framework is designed to assess the confidence levels of the predictions and consider them only if they pass a certain threshold. In FIG. 27, we plot the DNN predictor confidence vs. stack size. It can be seen that, similar to the ML model accuracy, the confidence levels increase with the increase in stack size. Besides, the choice of optimum confidence threshold comes with a tradeoff. The higher the threshold, the greater the amount of data required for the predictions to pass. Interestingly, although the variance of the predictors' accuracy is highly dependent on stack size, the variance in confidence levels for the four personas does not significantly change with the increase in stack size.

V. Conclusion

In this paper, we proposed a data-driven framework to enable user persona monitoring and prediction in personalized wireless networks. Instead of predicting user personas using single data records, the proposed framework is designed to ingest stacks of data prior to deciding on the persona label for each user. In addition, due to the considerable effects of assigning false persona labels for users in personalized networks, the proposed framework is supported with a confidence assessment scheme in order to ensure that the network is attempting to personalize the provided services only when it has a certain confidence level for the predicted persona label. In order to illustrate the benefits of the proposed framework, we implemented it using TensorFlow and Sklearn. Finally, we conducted several experiments using the implemented framework in order to study the effect of stack size (i.e., amount of available user information) on the performance and confidence of the ML predictors.

Part V: Deep Neural Network to Predict User Satisfaction in Personalized Wireless Networks Abstract New data applications, smart devices, and technologies are emerging every year. Future wireless networks will be expected to maintain user expectations in spite of the difficulty of managing explosive increases in network data traffic. Yet user experience is highly subjective and depends on the highly dynamic user satisfaction behavior in the network. For this reason, data-driven user experience modeling and prediction is more relevant than mathematical modeling. Modeling and predicting user satisfaction in real-time will enable wireless networks to make more personalized decisions, which can increase efficiency and user satisfaction. As set out above, we propose a framework for building a big data-driven satisfaction monitoring and prediction system. This framework consists of four processes: 1) acquiring context and KPI (key performance indicator) data, 2) capturing actual user satisfaction levels, 3) building the predictive model, and 4) predicting future user satisfaction. In this section, we focus on the third and fourth processes in this framework. Inspired by the success of neural networks and deep learning techniques, we propose a deep neural network model to predict user satisfaction in wireless networks using context information. Finally, we conduct a comprehensive study to tune the proposed model in order to achieve the best performance. The results of our experiment show the feasibility and preeminence of the proposed model.

I. Introduction

As explained above, in the near future, wireless networks will be expected to support a wider range of applications and use cases, such as vehicular ad-hoc networks and virtual reality applications. Such applications require network services to be delivered with a variety of network performance characteristics (e.g., rate, latency, security, and quality of experience (QoE)), which poses fundamental technical challenges for the management of user experience. Enabling wireless networks to understand and characterize the relationship between network performance and user experience will empower networks to make more personalized decisions (e.g., configurations) and optimized actions (e.g., resource allocation). Personalizing wireless networks is the cornerstone of optimum resource allocation and user experience management. In Part I, we proposed a data-driven AI-based wireless network personalization framework, which enables networks to micro-manage resources and make fine-grained personalized decisions based on dynamically changing user needs and expectations. One of the main enablers of the proposed framework in Part I is user satisfaction measurement and monitoring.

In wireless networks, user satisfaction is highly subjective, complicated, and changes dynamically depending on various factors. For this reason, mathematical expressions that attempt to model the relationship between user satisfaction and other factors do not yield accurate results. As a result, researchers have begun adopting data-driven approaches which are backed by machine learning (ML) and artificial intelligence (AI) techniques in order to model and predict user satisfaction in wireless networks.

The most popular ML tool used to solve various problems in wireless networks is deep learning [36]. Neural networks (NNs) that have a sufficient number of hidden layers are an example of deep learning models. There are major advantages to applying deep neural networks (DNNs) to model and predict user satisfaction levels in wireless networks. Unlike traditional ML tools, DNNs automate feature extraction from data that has complex structures and correlations, which thus reduce expensive human-dependent tasks that hinder automation and real-time network operations. In addition, data collected from wireless networks is increasingly large and heterogeneous and arrives in different formats and speeds from different sources [37]. In contrast to DNNs, the performance of classical ML does not improve with more data and it cannot handle high dimensional data. Thus, DNNs are considered to be one of the best tools for learning useful patterns for complex and colossal wireless network data.

In this paper, we start by discussing the different types of user satisfaction feedback in wireless networks. We also discuss the user satisfaction prediction problem in the literature and differentiate between the various approaches proposed. Then, we propose a data-driven user satisfaction prediction framework, which is composed of four distinct processes: 1) acquiring context data, 2) capturing the actual user satisfaction values, 3) building the predictive model, and 4) predicting future user satisfaction using unlabeled context data. This framework is designed to isolate the process of capturing real-time user satisfaction values from sensor data and the process of predicting future user satisfaction values from context information. Also, unlike previously proposed models, this framework considers network KPIs as the only network parameter used as part of the context, on which basis user satisfaction values are predicted. Then, to achieve the future user satisfaction prediction part of the framework, we propose a DNN-based learning model. Finally, in order to tune the proposed DNN model, we perform a comprehensive parameters tuning study.

II. Background
A. Types of User Satisfaction Feedback

The collection of user satisfaction feedback could be done in real time or offline in a number of ways that can be either intrusive or non-intrusive. Intrusive collection methods require users to actively interact with the system to record satisfaction information. On the other hand, non-intrusive user satisfaction collection methods employ ML and AI to predict personalized user satisfaction without the need to disturb users.

Examples of intrusive collection methods include surveys and feedback boxes. In wireless networks, the utilization of user feedback from intrusive methods is discussed in [1], [2]. The authors in [1] propose an approach called "user-in-the-loop" which utilizes real-time feedback to integrate spatial demand control to wireless networks where users are motivated to move to less congested areas. The authors in [2] propose a data-guided resource allocation approach where offline feedback data (e.g., network measurements and user complaints) is employed to improve the average user experience.

As noted above in Part I, the intrusive feedback collection methods do not represent all users because the majority of users do not complain, they just change their provider. Furthermore, while users' needs and expectations change rapidly in wireless networks, non-intrusive feedback collection methods enable more frequent feedback data collection which, consequently, increases the accuracy and relevance of networks decisions. Therefore, non-intrusive feedback methods are considered more practical compared to intrusive feedback. Nonetheless, due to the lack of data and the immaturity of the technology required to acquire and utilize non-intrusive user satisfaction feedback in wireless networks, it is not a common discussion topic in the literature and is limited to but a few applications [3]. In this paper, the proposed framework will enable non-intrusive user satisfaction feedback collection in wireless networks.

B. Integrating Satisfaction Information in Wireless Networks

The problem of integrating user satisfaction information in wireless networks for the purpose of further optimizing resources has been approached in various ways. The concept of QoE in wireless networks was defined at the International Telecommunication Union (ITU-T) as "the overall acceptability of an application or service, as perceived subjectively by the end-user." Although this definition is highly subjective, the research community has aimed to narrow it down in order to enable the utilization of such information in wireless networks. In the literature, QoE models are categorized into mathematical models and ML models. Mathematical QoE models are formulations designed to find a specific QoE value for a certain set of parameters. For example, the authors in [38] argue that the QoE has a logarithmic nature described by the law of Weber-Fechner. Experiments and research in QoE modeling have shown that the correlation between variables affecting QoE is rather complex and highly dynamic. As a result, mathematical modeling is incapable of accurately modeling or predicting user experience in wireless networks. Therefore, ML has been widely used to capture these complex correlations with a view to providing us with deeper insight and stronger conclusions. In the literature, the proposed solutions for modeling and predicting user experience in wireless networks differ in terms of input feature design, level of personalization, and ML tools utilized. Researchers have applied different types of ML algorithms, such as recurrent neural networks (RNN), Bayesian modeling, and DNNs [39]-[41]. Also, researchers have proposed various input feature designs to feed into their proposed learning models. We categorize these designs as follows:

- Input features are a set of network KPIs [2], [42].
- Input features are a combination of network parameters and measurements aggregated directly from sensors. For example, the authors in [43] proposed monitoring user QoE using a set of network parameters and EEG signals collected from sensors placed near the brain.
- Input features are a combination of context variables and network parameters [44].
- Input features are a combination of context variables, network parameters, and sensor measurements [40].

Lastly, the proposed user experience prediction approaches vary in terms of the level of personalization, which we categorize in two ways: averaged QoE prediction and personalized QoE prediction. Systems based on averaged QoE prediction are designed to perform actions based on the predicted average QoE for all users in the network [2], [44]. Although this approach is simple and easy to implement, it lacks accuracy since user preferences and behavior in wireless networks vary widely depending on complex and dynamic factors. By contrast, personalized QoE prediction aims to predict QoE for each user using data with a set of features recorded from the same user to ensure consistency and relevance [43].

III. User Satisfaction Prediction Framework

Figure 28:
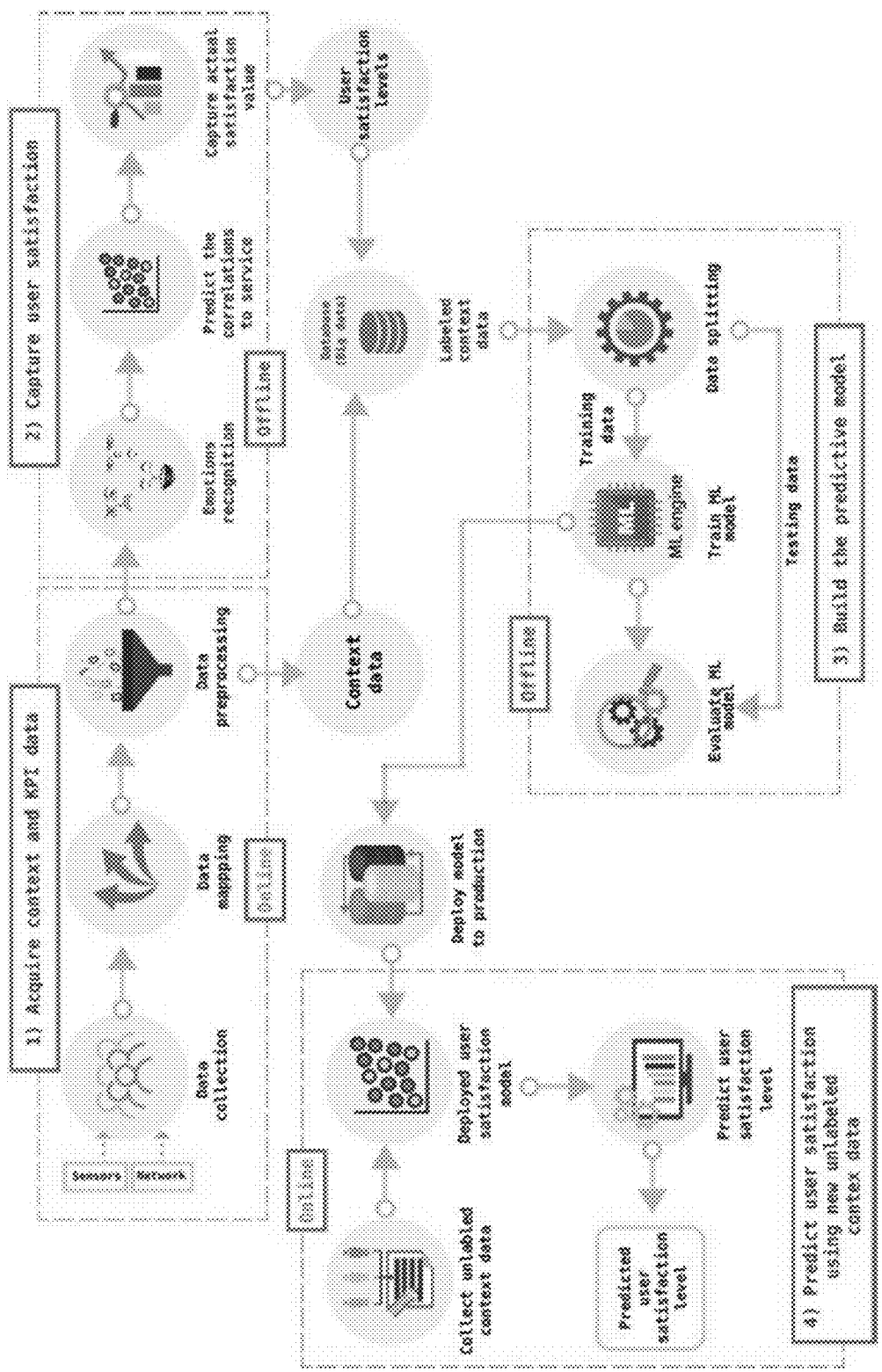
FIG. 28 presents a process flow diagram of an exemplary big data-driven satisfaction prediction framework in an embodiment of the invention.

As noted above, data collected from communication networks are massive, complex, unstructured, and increase in three dimensions: volume, velocity, and veracity. The problem of extracting user satisfaction knowledge from this huge amount of data also presents two subproblems: a big data problem and an AI problem. In this section, we propose a novel approach for measuring and predicting user satisfaction in wireless networks. FIG. 28 illustrates the complete framework we envision for predicting user satisfaction in wireless networks. This framework is designed to autonomously predict future personalized user satisfaction values in real-time for each user in the network in a non-intrusive manner. The proposed framework consists of the following four processes:

1) Acquire Context and KPI (Key Performance Indicator) Data

Data collection—The first step is to acquire context data, which can be done by monitoring sensors, aggregating and analyzing collected data, and predicting missing and future context information. Besides, KPI data is collected from the network and aggregated with context information. The authors in [45] provide some details on the process of acquiring and monitoring user context data. As mentioned above, using all types of network parameters in the user satisfaction prediction problem is very popular in the literature. However, since user experience is directly influenced by the network KPIs, and due to the fact that, as far as the user is concerned, the changes in network parameters directly affects KPIs, our framework suggests considering KPIs as the only network variables.

Figure 29:
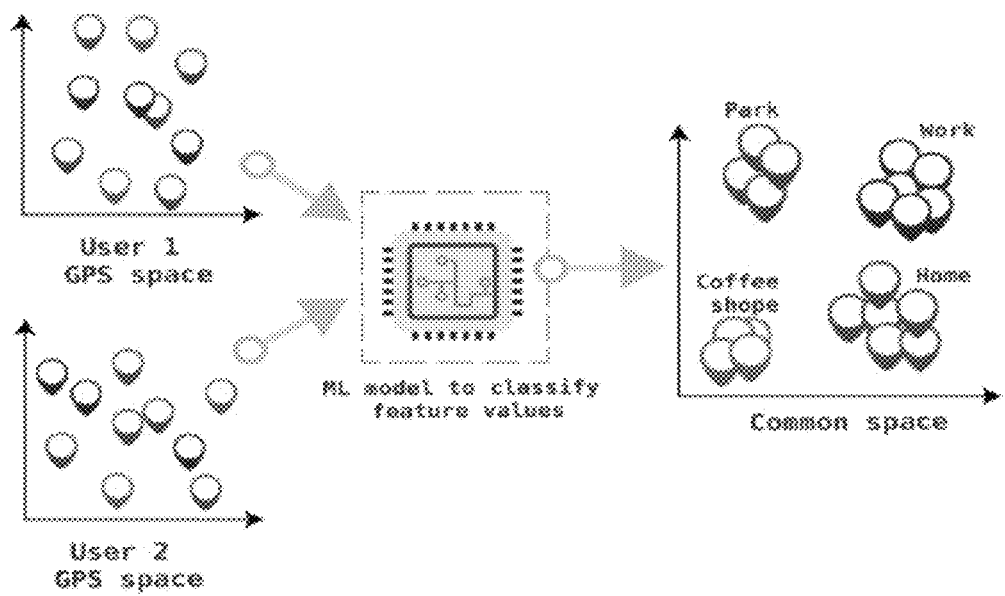
FIG. 29 presents a schematic diagram of an exemplary data mapping for user location feature.

Data mapping—The second step is to map data from different users to shared space. Mapping user data is a valuable step as it enables ML models to capture correlations and inherent patterns. For instance, in FIG. 29, we illustrate an example of location feature mapping to a common space. User location is acquired from GPS sensors and is recorded as unique coordinates. Generally, user satisfaction behavior is actually correlated to a particular type of location (e.g., home) rather than GPS coordinates. In order to enable the ML model to extract relevant user satisfaction information, the recorded coordinates should be classified into location types. In FIG. 29, in the left side, feature values (GPS coordinates) are shown in their original input space where each user has his/her own space. After passing the coordinates through the ML model, the common feature space is obtained. In this example, samples belong to four location classes. The color indicates the class of an instance.

Data preprocessing—The third step is to retransform data and extract useful features. This step is important because it contributes to the reduction of noise and irrelevant data, which can degrade the predictive model's performance.

2) Capture User Satisfaction

The second process in the framework is labeling context data by the actual user satisfaction values. The proposed process to capture actual user satisfaction is as follows:

Emotions recognition—The first step is to predict and measure user emotions and feelings. The detection of user emotions in a non-intrusive manner is widely discussed in computational intelligence literature. Emotions can be monitored using different types of data input, such as images and video [46], speech and sound [47], [48], body language [49]-[51], and other commercial sensors [8], [52].

Predict the correlation to service—The next step is to estimate the correlation between measured user feelings and the performance of the service being used by the user. This step is necessary due to the fact that detected feelings are mostly not related to provided service performance.

Predict the actual user satisfaction—The next step is to utilize user feelings which are related to the service in order to estimate actual satisfaction levels. Then, the estimated satisfaction levels are used to label context values recorded by the network. Processes 1 and 2 are designed to collect and label user data in an automated way in order to make the framework scalable and increase network intelligence and ability to detect users' actual needs and demands.

3) Build the Predictive Model

At this stage, the network has enough labeled data to build a user satisfaction prediction model for each user with a good performance. There are several ML algorithms that can be employed and different techniques to tune the models depending on the type of data being utilized.

4) Predict User Satisfaction Using New Unlabeled Data

Finally, the fourth process in our proposed framework is to predict future unlabeled user satisfaction values for each user from the context-satisfaction datasets aggregated by the network and stored in the database.

In order to assess the practicality of the proposed framework, the steps that need to be performed during the communication session (i.e., online) should be assessed. As shown in FIG. 28, the first process involves relatively fast operations, such as data collection and preprocessing. On the other hand, the second and third processes involve cumbersome, time-consuming, and complex operations, such as training, validating, and implementing the ML models. Nonetheless, since they are implemented offline, they should not affect the network pro-activity. Finally, the fourth process is operating during the communication session and it involves fast operations, such as using the ML models to performance predictions. Therefore, implementing this process in real-time would not raise practicality concerns.

In this paper, we implement the third and fourth process in this framework. In order to enable the ML model to build accurate user satisfaction predictors for each user, in Parts I, II and III, we proposed a user satisfaction model called the Zone of Tolerance (ZoT). The ZoT model assumes a non-linear relation between user satisfaction and the variable $\Delta$, which is the difference between the KPIs demanded by the network and those provided by it. In comparison to the QoE model, the ZoT model is designed to be personalized to each user and to dynamically change with the context in order to reflect the real characteristics of user behavior in the network. In addition, satisfaction values are modeled as discrete values (0-5) which makes the process of user satisfaction monitoring and prediction easier, stable, and more accurate. The rest of this section discusses the process of building a DNN model in order to predict user satisfaction from context data, which are the third and fourth processes in our framework.

IV. Dataset Analysis and Preprocessing

A. Dataset Description

A lack of published user behavior data labeled with ground truth user satisfaction information is holding back innovation into new approaches for monitoring and predicting user satisfaction in order to utilize it for personalizing wireless networks. Unfortunately, such data is not publicly available, and there are several reasons for this, including privacy and confidentiality concerns. Therefore, in Parts II and III, we proposed synthetic user behavior satisfaction datasets that can be utilized for data-driven user satisfaction prediction and optimization. The datasets are designed meticulously to have realistic characteristics and therefore to behave in the same manner as a real user behavior dataset. The designed datasets mimic real user data collected using processes 1 and 2 in the proposed framework. The datasets are publicly available in a GitHub repository [15]. In Part II, we proposed a specific dataset for four distinct personas. For the purpose of this section, we will work with the working professional persona dataset (WPP). Table V shows the features of the WPP dataset and an example of their values (the dataset in [15] has other features, such as real sensor measurements. However, for the purpose of this paper, we consider only the features listed in Table V).

TABLE V

Features of the WPP dataset

| No. | Feature name | Units | Example |
| --- | --- | --- | --- |
| 0 | Date | — | Jan. 10, 2018 |
| 1 | Time | — | 14:55:02 |
| 2 | Day | — | Wednesday |
| 3 | Classified days | — | Weekday |
| 4 | Time period | — | Afternoon |
| 5 | Location | — | [22, 73] |
| 6 | Location name | — | work |
| 7 | Speed | km/hr | 5.2 |
| 8 | Speed range | — | low |
| 9 | Activity | — | Walking |
| 10 | Request arrived | — | 1 |
| 11 | Application | — | WhatsApp |
| 12 | Service | — | Picture |
| 13 | Demand rate | kbps | 867 |
| 14 | Min rate | kbps | 600 |
| 15 | Given rate | kbps | 802 |
| 16 | $\Delta$ | — | 65 |
| 17 | Max $\Delta$ | — | 267 |
| 18 | Satisfaction | — | 4.0 |

B. Dataset Filtering

The WPP dataset was recorded for a period of one year with one record for each second. The total number of records is 31,536,000. However, naturally, the user did not use the network during all measuring instances. Hence, the number of records that actually have satisfaction labels is less than the total number of records. The dataset has an indicator feature called Request arrived which is set to 1 when the user requests a service from the network. The filtered number of records is 38,166.

C. Data Shuffling and Scaling

In order to improve the DNN model quality and its predictive performance, the features and the satisfaction labels are synchronously shuffled. Also, since feature scaling is an important step in using DNN models, we apply MinMax scaling, which is typically done via the following equation:

$$X_{scaled} = \frac{x_i - \min(X)}{\max(X) - \min(X)}, \forall\, x_i \in X, \tag{1}$$

D. Encoding Categorical Values

Neural networks do not accept categorical values. Hence, encoding categorical values is needed prior to feeding the data into the model. In this paper, we encode categorical values using one-hot encoding.

E. Data Balancing

Figure 30:
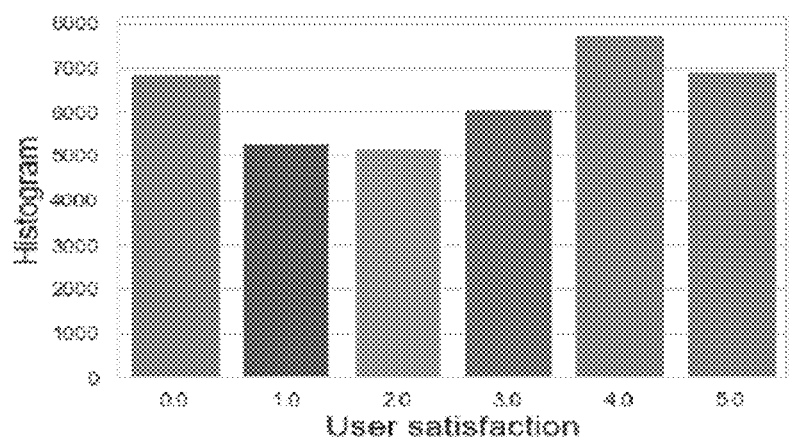
FIG. 30 presents a histogram for user satisfaction classes of the WPP dataset in an embodiment of the invention.

One of the most important preprocessing steps for NNs is to check whether we have unbalanced training data. Training NNs using unbalanced data will result in ignoring the classes with smaller representation in the dataset, which creates a biased predictor. In FIG. 30, we plot the histogram for the user satisfaction classes of the considered WPP dataset. The histogram of the classes shows that this dataset is highly imbalanced. In order to address this issue, we oversampled our dataset using the SMOTE algorithm [53].

F. Data Splitting

The dataset is split into 70% training set, 25% validation set, and 5% test set. The validation set will be used to tune the DNN model and the test set will be used to perform the hold-out test to make sure that the model generalizes well on new testing data. Stratified sampling is used to ensure that the statistics of satisfaction labels are similar for both the training and testing sets.

V. Model Structure and Formulation

Figure 31:
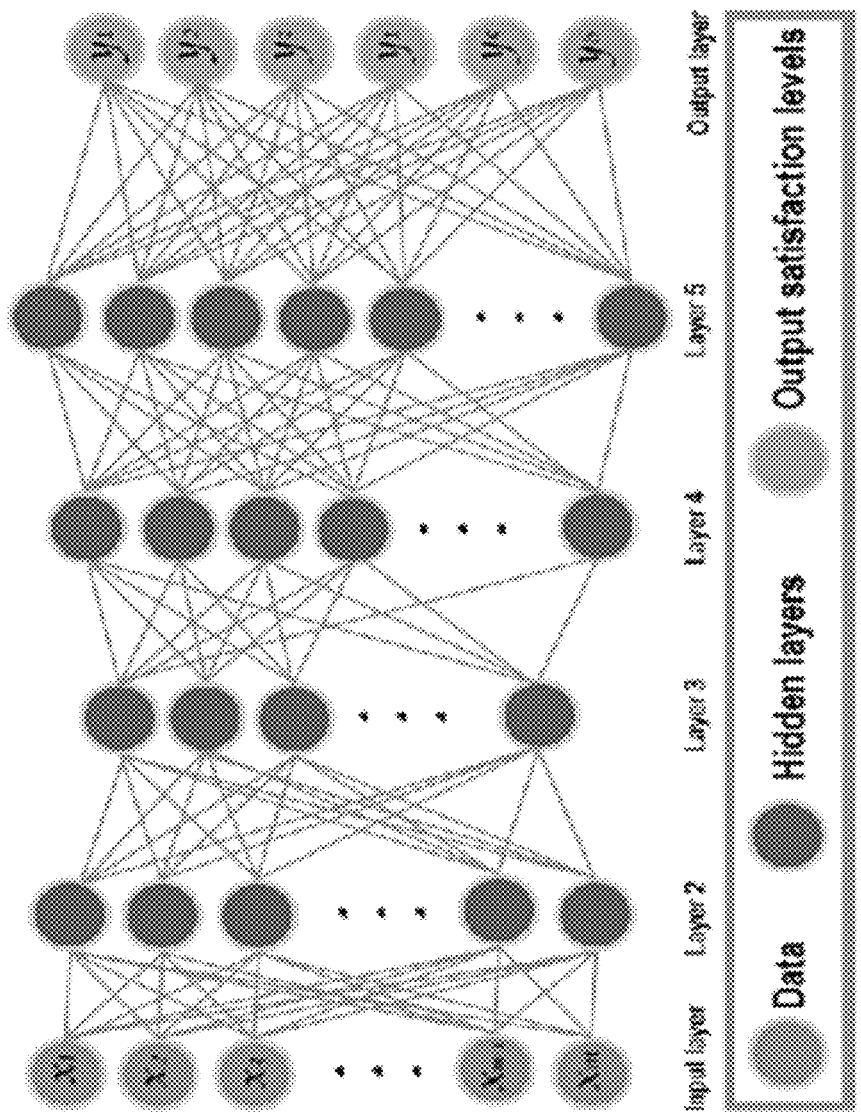
FIG. 31 presents an exemplary network structure of the proposed DNN model in an embodiment of the invention.

As shown in FIG. 31, our network architecture consists of 6 layers. The first layer is the input data layer. The input matrix is denoted by $X=[x_1, x_2, \ldots, x_m]$, where m is the number of inputs (or features) fed into the network. Layers 2 to 5 are the hidden layers, and layer 6 is the output layer with 6 nodes. The number of nodes per hidden layer will be tuned in the following section for the purpose of improving the prediction performance (i.e., classification accuracy) of the model. The output of each neuron is computed through two steps. The first step is to calculate the weighted linear combination of the inputs. Then, the second step is to calculate the nonlinear transformation of the output of the first step. Updating the DNN parameters is divided into two processes:

1) Forward Propagation

The output of each layer is updated using the following equation:

$$v_i^l = \phi\left(\sum_{i=1}^{h_{l-1}} w_{k,i}^l v_j^{l-1} + b_k^l\right), \tag{2}$$

where l is the layer, $w_{k,i}^l$ is the weight of the connection from neuron (i, l−1) to neuron (k, l), $b_k^l$ is the bias of the (k, l) unit, and $\varphi(\,)$ is a nonlinear activation function. There are several activation functions discussed in the literature. Of these, we have chosen the rectified linear unit (ReLU) function, which is given by the following:

$$\phi(\,)=\mathrm{relu}(v)=\max(0,v). \tag{3}$$

The output score is computed from the first layer to the sixth layer. Since we have a multi-class classification problem, we use the categorical cross-entropy as our cost function, which is given by $$\mathcal{J}(w, b) = \frac{1}{m}\sum_{i=1}^{m} \mathcal{L}(\hat{y}_i, y_i) \tag{4}$$

$$= -\frac{1}{m}\sum_{i=1}^{m}\left(y_i \log\!\left(v_i^{|L|}\right) + (1-y^{y_i})\log\!\left(1-v_i^{|L|}\right)\right), \tag{5}$$

where L denotes the loss function, yi and ỹi are the labeled and the predicted outputs, and L is the number of layers.

2) Backwards Propagation

After completing the forward propagation calculations, through the hidden layers, the information flows back from layer L to the first layer in order to compute the gradient of L. The parameters of the networks are updated until the loss is minimized. Using gradient descent (GD), the gradient is updated as follows:

$$w_{t+1,i} = w_{t,i} - \eta\frac{\partial \mathcal{L}}{\partial w}. \tag{6}$$

VI. Experiment Results and Analysis

The implementation of the experiments in this paper were done in python. The DNN model was built using the Tensor-Flow library. TensorFlow is a high-performance computational framework with a highly flexible structure. Originally developed by Google's engineers, TensorFlow comes with strong support for machine learning and especially deep learning algorithms. In addition, the Sklearn library was used for preprocessing the data, whereas seaborn and matplotlib were used for visualization purposes.

A. Improving the Performance of DNN

In order to optimize the performance of our DNN model, we utilize various state-of-the-art search and tuning techniques to yield the best performance.

1) Number of Layers and Hidden Units

The first step is to choose the best DNN architecture that yields the best performance. Hence, we performed a grid search to choose the number of neurons per hidden layer. Based on the output of the search process, we choose the following structure:

First hidden layer (Layer 2): 1024 neurons.
Second hidden layer (Layer 3): 512 neurons.
Third hidden layer (Layer 4): 512 neurons.
Fourth hidden layer (Layer 5): 128 neurons.

2) Optimization Methods

There are several optimization algorithms proposed in the literature to update the weights of DNNs. The most popular algorithm is GD. For large datasets, GD is very slow and difficult to control because it requires gradient calculation for the entire dataset. In order to rectify this problem, stochastic gradient descent (SGD) is proposed. SGD is faster because it is designed to perform parameter updates for each training example. SGD updates the model parameters according to the following rule:

$$w_{t+1,i} \Leftarrow w_{t,i} - \eta\frac{\partial \mathcal{L}(w^T x_i + b, y_i)}{\partial w_{t,i}}. \tag{7}$$

Although SGD has an improved performance, GD and its variants suffer from several problems including the difficulty of choosing the learning rate and the fact that the learning rate is applied to all parameter updates. If the data is sparse, where features have different frequencies, updating all of them is highly inefficient. Adagrad is proposed to allow the learning rate η to adapt based on the frequency of the parameter, and therefore, it is well-suited for working with sparse datasets [54]. Adagrad updates the model parameters according to the following rule:

$$w_{t+1,i} \Longleftarrow w_{t,i} - \eta \frac{\partial \mathcal{L}(w^T x_i + b, y_i)}{\partial w_{t,i}} \cdot \frac{1}{\sqrt{G_t + \epsilon}}, \quad (8)$$

where $G_{t,ii}$ is a diagonal matrix. The main disadvantage of Adagrad is that η is always decaying which makes the process slower. Another modified and improved optimizer is the adaptive moment estimation (Adam). Similar to Adagrad, Adam also calculates the adaptive η for each parameter. However, unlike Adagrad, Adam also keeps an exponentially decaying average of past gradients [55]. Adam updates the model parameters according to the following rule:

$$w_{t+1,i} \Longleftarrow w_{t,i} - \eta \frac{\hat{m}_t}{\sqrt{\hat{v}_t + \epsilon}}, \quad (9)$$

where m̂t and v̂t are the estimates of the first and second moments, respectively.

Figure 32:
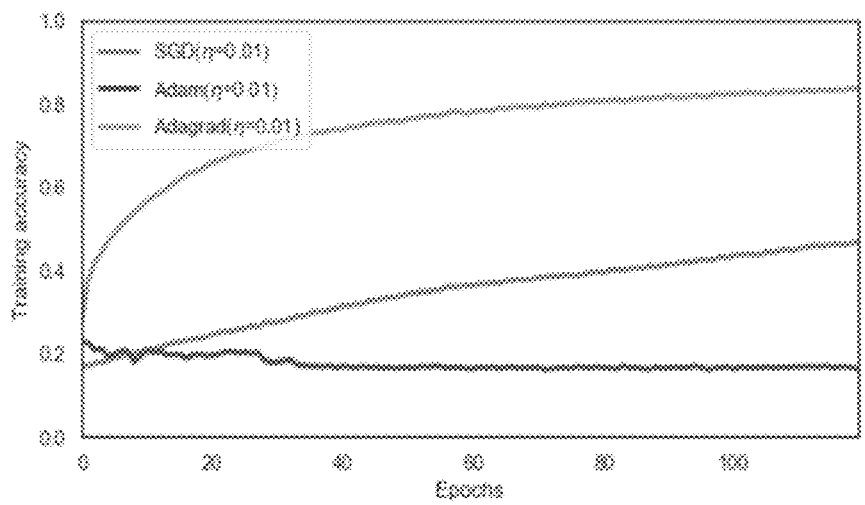
FIG. 32 presents a graph comparing the accuracies of DNNs using different optimization methods.

In order to decide which algorithm best suits our dataset and the DNN model, in FIG. 32, we compare the DNN model accuracies for the three aforementioned algorithms. As shown in FIG. 32, Adam achieved the lowest accuracy convergence. Although SGD will eventually coverage to good accuracy, it is very slow compared to Adagrad. Adagrad achieved the fastest convergence and it converged to the best accuracy, which is why we chose Adagrad as our optimization algorithm.

3) Learning Rate η

Figure 33:
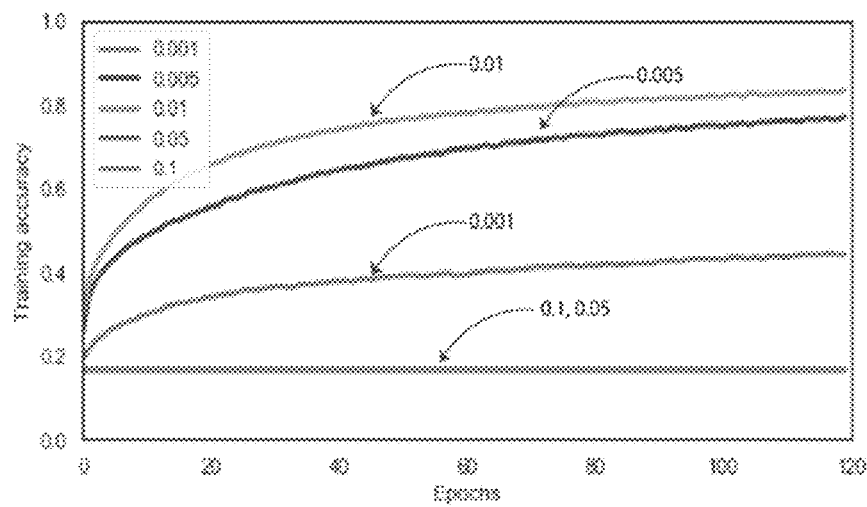
FIG. 33 presents a graph comparing the training accuracy of DNNs using different learning rates.

Choosing the proper η is one of the most important steps in building DNNs. A very small η will lead to painfully slow convergence, whereas too large of an η could hinder convergence and cause fluctuations. In FIG. 33, we plot the training accuracy of the proposed DNN with the Adagrad optimizer and three different learning rates. The first thing we notice is the very slow convergence of η=0.001 optimizer. This indicates that η=0.001 is too small for our DNN model. By contrast, η=0.1 and η=0.05 optimizers converge to a low accuracy, which indicates that they are too big for the model. As shown in FIG. 33, the fastest and best performing optimizer is the η=0.01 optimizer; hence, we chose it for our model. Of course, the person skilled in the art would have no difficulty selecting an appropriate value for η to suit their particular design parameters.

4) Other Tuning Parameters

In addition to the DNN structure, the optimization algorithm, and η, we have tuned other parameters, such as the weight initialization technique. We have studied the impact of implementing the following initializers: zeros, uniform, normal, he normal, and leCun uniform. The results showed that our DNN model achieved the best performance with the leCun uniform initializer. Other parameters, such as batch size and the number of epochs were tuned to 128 and 120, respectively. In addition, in order to reduce overfitting and make the model generalize better, we have used regularization. In the literature, there are two main strategies to regularize NNs, dropout and L1 and L2 regularization. L1 and L2 are the most popular types of regularization strategies, and they update the general cost function by integrating another term to reduce the values of the weight matrices. Dropout is also a very interesting regularization technique and it is widely used in the field of deep learning [56]. Dropout randomly picks some nodes and removes them and all the incoming and outgoing connections associated with it. For our DNN design, we choose to integrate dropout into each layer. The dropout rate was tuned to 41% for each layer.

B. The Performance of the Final Model

In this section, we first study the validation accuracy vs. training set size. Then, we perform a training-validation test to evaluate the performance of the model. Finally, we performed a hold-out test and a 10-folds cross-validation (CV) test to ensure that our DNN model is not overfitted.

1) Impact of Training Data Size

Figure 34:
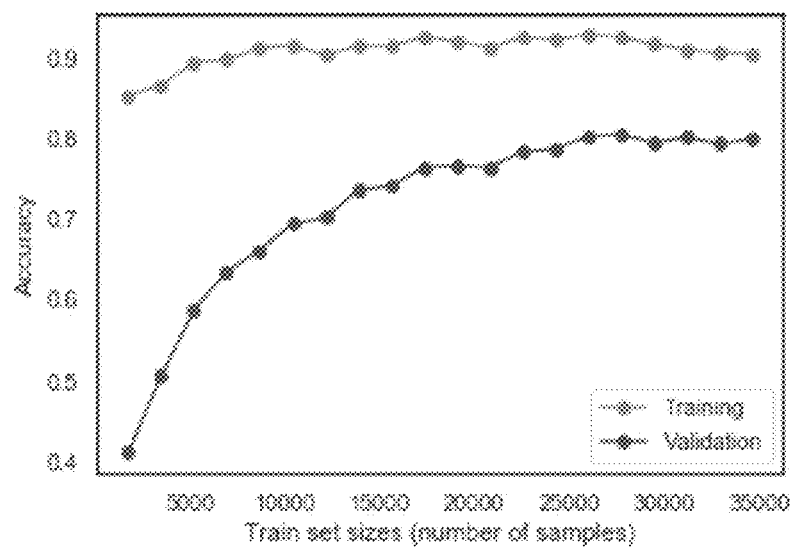
FIG. 34 presents a graph comparing the DNN model performance for different training data sizes.

Studying the effect of the training data size is an important part of the process. In FIG. 34, we plot the accuracy of our DNN model vs. different training sizes. It can be seen that too few examples will result in low test accuracy. Moreover, FIG. 34 illustrates an increasing trend in test accuracy, which means that as more information becomes available to the wireless network, the performance of the user satisfaction predictor improves.

2) Performance Results

Figure 35:
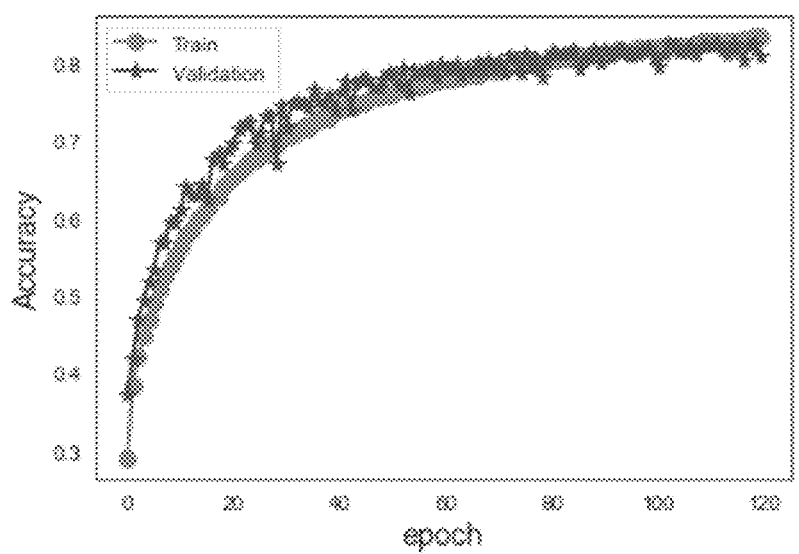
FIG. 35 presents a graph comparing training and validation accuracy for the chosen DNN model.

In order to check the performance of our model, we perform a training-validation test. FIG. 35 illustrates the change in training accuracy and validation accuracy with the increasing number of epochs. From FIG. 35, it can be noted that the training and validation accuracies increase gradually with the increasing number of epochs. At 120 epochs, the training accuracy is 92%, whereas the validation accuracy reaches around 82%. In addition, we perform a hold-out test to check if the predictor is able to achieve comparable accuracy using the test set. The accuracy of the hold-out test is 0.81%, which indicates the DNN design generalizes on new data. Finally, in order to further validate the performance of the DNN model, we perform a CV test. Although CV is not widely used for NNs due to its computational complexity, for the purpose of this paper, we perform a 10-fold CV test. The recorded average accuracy is 84.08% with 0.94% confidence interval. It is worth noting that since there are six satisfaction levels, the random choice accuracy level is 0.166. Therefore, an average accuracy of 84.08% is considered very good and it can be further improved by training the network with more data.

VII. Conclusion

In this paper, we proposed a framework to enable data-driven user satisfaction monitoring and prediction in wireless networks. The importance of the proposed framework stems from the fact that it isolates the process of sensing, capturing, and predicting actual user satisfaction values from sensor data, and it isolates the process of predicting future user satisfaction values on the basis of context information. The framework was proposed as consisting of four processes. This paper focused on the third and fourth of these processes, which involved building the predictive model and predicting user satisfaction values on the basis of context information using a deep neural network (DNN) model. In addition, in order to tune the model and maximize its accuracy, we performed a comprehensive study to choose the best model parameters. The results of the experiment showed that our proposed DNN model was able to predict future user satisfaction values with an average accuracy of 84.08%. More importantly, our proposed framework will pave the way for the innovation of new, less complicated and more accurate user satisfaction prediction approaches.

Part VI: Personalized Resource Allocation in Wireless Networks: An AI-Enabled and Big Data-Driven Multi-Objective Optimization This aspect of the present invention addresses the personalized decision-making process that is responsible for making optimized, fine-grained, and personalized actions in wireless networks. The decision process in personalized wireless networks is based on the intelligence created by Machine Learning (ML) engines. The primary use of ML in personalized networks is to build surrogate models for user satisfaction behavior, which is highly dynamic and continuously evolving.

In order to understand the invention, some fundamental concepts associated with personalized wireless networks and the various decision-making processes in wireless networks required for the personalization of the resource allocation process are presented. The main premise of personalized resource allocation is to achieve optimum allocation such that maximum user satisfaction levels are achieved using a minimum amount of resources. To this end, personalized wireless networks should be designed to optimize two correlated and contradicting objectives in real-time: user satisfaction and resource utilization. The described optimization problem is referred to herein as the Optimum Personalized Resource Allocation (OPA) problem.

As described here, OPA can be modelled as a Multi-Objective Optimization (MOO) problem. In wireless networks, decisions are made in real-time; in order to maintain the proactivity of the network, the optimization process and decisions are also required to be in real-time. Although exact optimization algorithms that are based on mathematical programming produce the best possible solutions, they are slow and computationally expensive; hence not feasible due to the complexity of OPA. Instead, to speed up the optimization process, data-driven evolutionary optimization is used to approximate the Pareto front solutions. In view of this, the benefits and challenges of using data-driven Evolutionary MOO (EMOO) in personalized wireless networks are considered.

Another important aspect of the problem is integrating user satisfaction behavior into the optimization process. To actualize this in real-time, the present invention makes use of a surrogate model to approximate the personalized user satisfaction behavior of network users. This model is a surrogate model in the sense that it provides an approximation of personalized user satisfaction. This is in contrast to endeavouring to interpret and consider the minutia of every user's needs, which would clearly be an impractically complicated and calculation intensive process. The proposed surrogate model is ML-based and built using Deep Neural Networks (DNNs). Then, in order to maintain and manage the surrogate models, the present invention also makes use of a surrogate-management framework that employs the collection of select user satisfaction feedback measurements in real-time to reduce the risk of solutions divergence and the effect of uncertainty introduced by surrogate models. In addition, the surrogate-management framework can be designed to continuously enhance the performance of the surrogate models as more data arrive in the network. Afterward, the OPA problem is formulated and solved using EMOO. Through several experiments, optimum Pareto front solutions for various EMOO algorithms were analyzed then, using the best algorithm, the personalized and non-personalized networks were compared in terms of saved resources and user satisfaction levels. Moreover, the effect of uncertainty introduced by the surrogate models on the quality of the produced Pareto front solutions can be evaluated. Finally, a scalability analysis to explore the effect of higher numbers of users and the effect of varying the Number of Function Evaluations (NFEs) on the performance of the simulated algorithms and the quality of solutions was conducted.

II. Wireless Network Personalization: Challenges and Solutions

This section summarizes the design and implementation-related challenges that need to be overcome to realize wireless network personalization proposed solutions.

A. Integration into Wireless Networks

Figure 36:
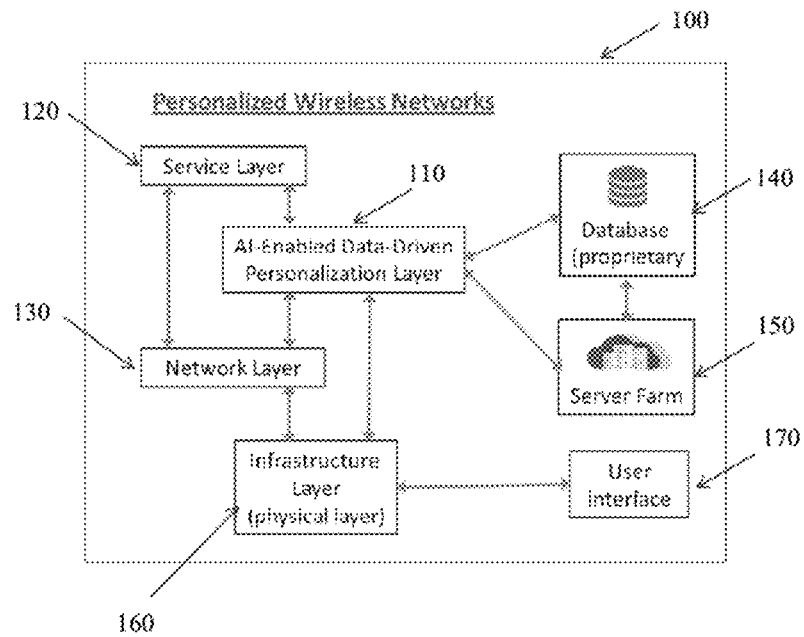
FIG. 36 presents a block diagram of a Wireless network personalization architecture incorporating a big data-driven AI-based layer, in an exemplary embodiment of the invention.

The first design challenge of personalized networks is the integration of network personalization into current wireless networks. Wireless networks are already complex and highly structured systems. As shown in FIG. 36, the wireless network 100 of the present invention consolidates a personalization layer 110 into wireless network layers. As used herein, a "personalization layer" is an intelligent layer dedicated to personalizing network decisions and is responsible for digesting and analyzing data, modeling complex and dynamic user behavior using ML, and utilizing the created intelligence in making optimized and personalized network decisions. This design enables wireless network personalization to act as an orthogonal system that can be supported in any wireless network, and hence reduce complexity. Also, this type of modularity enables the personalization of diverse sets of applications and problems in networks. To address the integrability issue, a framework for integrating personalization into current wireless networks may include the process of data collection, processing, and the process of utilizing user satisfaction behavior information to learn, predict, and optimize based on user needs and expectations in a certain context.

In the personalized wireless network 100 of the present invention, the AI-enabled data-driven personalization layer 110 is typically introduced between the service layer 120 and the network layer 130. This personalization layer 110 is connected to all layers in the network 100. The personalization layer 110 is also connected to a storage database 140 and to a server farm (computation engine) 150 used to perform the Multi-objective optimization of both user satisfaction and the provided QoS. The result of the Multi-objective optimization is to determine a resource block (RB) allocation vector and power allocation for each user requesting resources. These RB allocation vectors and power allocations are typically stored on the server farm 150 and are transmitted to the network layer 130 to be effected. The infrastructure layer 160 is the actual physical network, which includes the hardware components such the basestations, switches, routers, transport components, etc. The network operators will have some arrangement of user interfaces 170 to monitor and manage these components. Of course, other architectures and implementation details are also possible, as would be clear to the person skilled in the art.

B. Measuring User Satisfaction

The present invention addresses a second design challenge of wireless network personalization, which is to find a way to quantify and measure user satisfaction in wireless networks, as personalized networks require the continuous measurement and tracking of user satisfaction. As explained above, in wireless networks, user satisfaction is highly subjective, complicated, and changes dynamically depending on various factors; however, mathematical expressions that attempt to model the relationship between user satisfaction and other factors do not yield accurate results. Data-driven approaches backed by ML and AI techniques are the best strategy to model and predict user satisfaction in wireless networks. In the absence of a dynamic user satisfaction model, researchers and service providers cannot dynamically quantify and predict real-time personalized satisfaction behavior of users in wireless networks.

In the present invention, a dynamic user satisfaction model based on the notion of Zone of Tolerance (ZoT) is provided. As shown in FIG. 7, and described in greater detail primarily in Part II, user satisfaction is divided into levels, where each level is associated with a certain range of QoS. The division and number of satisfaction levels may vary depending on service providers' preferences. In order to achieve a satisfaction level i, the user should receive a QoS within ZoTi. The gap between demanded QoS ($QoS_d$) and provided QoS ($QoS_p$) is the main factor influencing user satisfaction in wireless networks and is incorporated into the satisfaction model, as shown in FIG. 7, as variable $\Delta$, the difference between the demanded and provided QoS ($QoS_d$-$QoS_p$). $QoS_{ai}$ is the minimum (adequate) QoS required to achieve a satisfaction level i. In the ZoT model, each user satisfaction behavior (i.e., the relation between and satisfaction) is associated with a certain context. As used herein, "context" is a multi-variate variable composed of various context variables, such as time, location, and speed. In the present invention, QoS can be a vector with several elements, such as rate, reliability, latency, and jitter. In a simple model, QoS is defined solely by rate.

C. Data Collection

AI is a key component in wireless network personalization, making data a necessary requirement. Understanding the types of data that can be mined to personalized wireless networks is cardinal for the successful integration of this technology. However, the lack of publicly available user data due to confidentiality and privacy concerns is slowing down the research and development in wireless network personalization and holding back innovation into new approaches for monitoring and predicting user satisfaction. The present invention proposes a synthetic dataset structure designed based on Bayesian networks as well as Markov chain models. The proposed synthetic user behavior-satisfaction datasets can be utilized for data-driven user satisfaction prediction and optimization from context information. The synthesized datasets are meticulously designed to have realistic characteristics and behave in the same manner as a real user behavior dataset. Examples of such datasets include, but are not limited to, those publicly available in a GitHub repository [15], designed for four distinct personas. Table VI shows the features of the Working Professional Persona (WPP) dataset and an example of their values.

TABLE VI

Features of the WPP dataset

| No. | feature name | Units | Example |
| --- | --- | --- | --- |
| 0 | Date | — | Jan. 10, 2018 |
| 1 | Time | — | 14:55:02 |
| 2 | Day | — | [HTML]000000 Wednesday |
| 3 | Classified days | — | Weekday |
| 4 | Time period | — | Afternoon |
| 5 | Location | — | [21, 73] |
| 6 | Location name | — | work |
| 7 | Speed | km/hr | 5.2 |
| 8 | Speed range | — | low |
| 9 | Activity | — | Walking |
| 10 | Request arrived | — | 1 |
| 11 | Application | — | WhatsApp |
| 12 | Service | — | Picture |
| 13 | Demand rate | kbps | 867 |
| 14 | Min rate | kbps | 600 |
| 15 | Given rate | kbps | 802 |
| 16 | $\Delta$ | — | 65 |
| 17 | Max. $\Delta$ | — | 267 |
| 18 | Satisfaction | — | 4.0 |

D. Optimum Decision Making

Finally, the present invention addresses a fundamental design challenge of the process of integrating the optimized decisions made by the data-driven intelligent personalization layer with network decisions in order to make relevant personalized actions within personalized wireless networks.

III. Data-Driven Surrogate-Assisted Evolutionary Multi-Objective Optimization

Many problems in all sorts of research fields are formulated as optimization problems. While optimization problems were traditionally approached using mathematical programming, the complexity level of current problems have led researchers in academia and industry to move towards more heuristics/metaheuristics optimization algorithms that are less sensitive to the formulation of the optimization problem. This is considerably important for wireless network optimization problems due to their scale and complexity level. Generally, heuristics/metaheuristics optimization algorithms are of two main classes, Evolutionary Algorithms (EAs) and Swarm Intelligence-based Optimization Algorithms (SIOAs).

A. Evolutionary Optimization Algorithms

Figure 37:
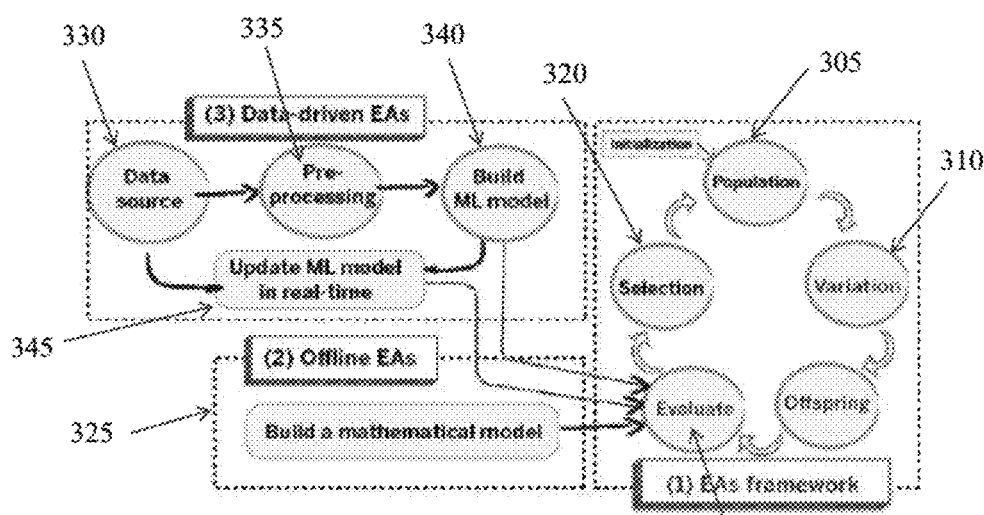
FIG. 37 presents a process flow diagram comparing data-driven (online) and offline EAs frameworks.

EAs are a class of metaheuristics population-based optimization algorithms, where multiple candidate solutions are maintained in parallel. EAs are designed based on the idea of the survival of the "fittest" solution in order to evolve a population that is a good approximation of a desired global optimum [62]. The fitness of an evolved solution is a measure of its quality at solving the problem. Block 1 in FIG. 37 illustrates the process cycle of evolutionary computation. At each cycle, EAs begin with generating parents (populations of candidate solutions). Then, offspring solutions are generated using various variation operations, such as crossover and mutation. Lastly, in order to select the parent solution for the next cycle, the quality (or fitness) of the generated offspring solutions are evaluated using the objectives and constraints, the best fitting offspring becoming the new parent.

One advantage of EAs is that they do not necessitate analytical modeling and formulation of the objectives and constraints functions associated with the optimization problem. Another advantage of EAs is that they can operate with little domain knowledge, which creates more robust models that are less susceptible to the various mathematical features of problems, such as convexities and discontinuities. Another advantage that adds to the robustness of EAs is that they are based on stochastic search, which samples the entire population making them less vulnerable to local optimums.

Since EAs rely on iterating the evaluation process of the objective and constraints associated with the solutions population, the higher the degree of accuracy required, the higher the computational power required. Supercomputers and distributed computing technologies are improving rapidly to the point that the use of big data analytics and EAs for practical near-real-time applications are currently possible.

B. Online vs. Offline Optimization

Although EAs do not require the analytical and mathematical formulation of objectives and constraints, most EAs in the literature assume the availability of such models. Optimization algorithms that assume the availability of mathematical models to assess objectives and constraints are referred to as offline optimization algorithms. Unfortunately, offline optimization is not a valid approach for many dynamic problems that involve rapidly changing features, requirements, and behaviors. In comparison, online optimization continuously digests data from the problem's environment to make decisions based on updated information flowing to the algorithm, making the optimization process more dynamic and adaptive. As used herein, EAs based on data from the problem environment are called data-driven evolutionary optimization algorithms. As shown in FIG. 37, the main difference between offline EAs (Block 2, FIG. 37) and data-driven EAs (Block 3, FIG. 37) is the method used in the evaluation process. Offline EAs utilize analytical objectives and constraints to evaluate the fitness of solutions, whereas data-driven EAs utilize data-driven models. The present invention utilizes a data-driven model to estimate real-time user satisfaction in networks; hence, data-driven (online) EAs are utilized to find the optimum decisions.

FIG. 37 summarizes the different ways EAs are being utilized to solve problems in the literature. The actual processes in the blocks are not new, and the calculations in each Block are as follows:

Referring to Block 1 of FIG. 37, the main loop of the evolutionary algorithm consists of the following:
- 305: Population: the evolutionary algorithm starts by generating a population of individual solutions.
- 310: Variation and offspring: Genetic operators are applied to generate a second population of the solutions.
- 315: Evaluate: the fitness value (i.e., the objective functions values) of the solutions population is calculated in order to evaluate the quality of each solution.
- 320: Selection: A portion of the solutions is selected to breed a new generation of solutions. This process is based on the fitness value calculated in the previous step, where the fittest (best) solutions are selected.

The selected population is used to breed another population and so on. The cycle continues until the optimum solution is reached, or the number of evaluations (number of cycles) could be fixed at a certain value.

The evaluation process of the fitness function can be done in two different ways, per Block 2 or Block 3 of FIG. 37.

Block 2 (off-line optimization) may be performed by modeling the objective or fitness function mathematically and using this function along with other variables from the environment to evaluate the fitness of the solutions 325.

Block 3 (online optimization) may be performed by building an ML prediction model to model the objective functions. The process of building the ML model consists of:
- 330: Collecting relevant data.
- 335: Preprocessing data and preparing it to be ingested by the ML model.
- 340: Training the ML model using the prepared data
- 345: As more data arrive, the ML model is trained (online) and updated to improve performance of the network.

The personalized wireless network of the present invention uses a combination of both: a mathematical formulation to model the wireless network environment and an ML model to predict and optimize user satisfaction levels in the network.

C. Interactive Evolutionary Computation

Interactive Evolutionary Computation (IEC) is evolutionary computation applied to optimize systems based on humans' subjective opinions and expectations [63]. The IEC technology embeds a user in the optimization system in which the user is considered to be a black box. There are several reasons for integrating user input with particular EAs as opposed to other optimization methods. One reason is that EAs do not require the use of gradient information to search the space, which in most scenarios cannot be computed for such problems.

Figure 38:
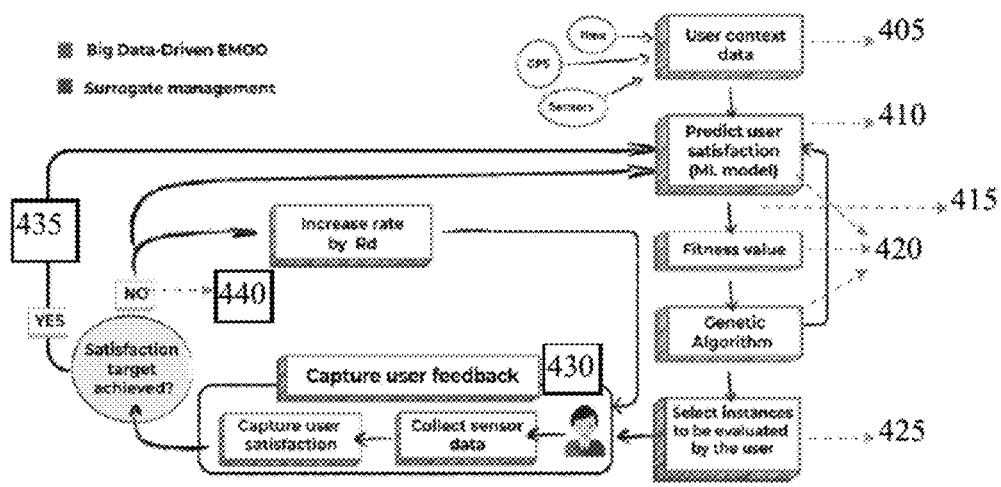
FIG. 38 presents a process flow diagram of an Evolutionary Multi-Objective Optimization (EMOO) management framework to optimize personalized wireless networks.

Although decisions in personalized wireless networks are optimized based on users' subjective opinions and expectations, users are not actively logging their satisfaction levels. Instead, as shown in FIG. 38, user satisfaction is captured in a non-intrusive manner from sensor data using AI. Also, the trained user satisfaction ML engine models user behavior and expectations, which enables the network to repeatedly evaluate user satisfaction in the optimization process in a non-intrusive manner and in a relatively short time. Considering the fact users are involved in the personalized optimization process, the proposed OPA problem addressed by the present invention can be considered as an IEC problem. In the literature, many researchers proposed solutions to improve the performance and efficiency of IEC problems. For example, preference-based (or progressive) interactive evolutionary optimization reduces the required numbers of function evaluations by involving the decision-maker in the intermediate generations of the algorithm; hence focus computations on the targeted Pareto front solutions [64], [65]. Even though IEC-based algorithms have several benefits and can greatly enhance the performance of optimization algorithms, for the purpose of the present invention, well-known Multi-Objective Evolutionary Algorithms (MOEAs) that are not necessarily optimized for IEC problems are employed.

IV. Surrogates in Personalized Wireless Networks

The micromanagement and personalization of wireless networks require the continuous tracking and measurement of personalized user satisfaction behavior for all users. Such a level of granularity and dynamic behavior modeling cannot be achieved using traditional mathematical models or average-based ML models. Instead, the present invention comprises a big data-driven satisfaction prediction framework, which is designed based on the proposed user ZoT model described herein. The framework comprises personalized ML models optimized based on context data collected by the network. The output personalized satisfaction behavior models are employed by personalized networks to personalize the allocation of resources based on the satisfaction behavior of each user.

A. Why Surrogates are Advantageous

In the optimization literature, ML models that are used to estimate the relationship between the inputs and outputs of systems are known as ML-based surrogate models (or meta-models). In this section, the main reasons for adopting a surrogate model in the personalized wireless networks of the invention are discussed.

1) Real-Time User Satisfaction Evaluation

Although user satisfaction behavior in wireless networks cannot be modeled analytically, the network can still capture satisfaction measurements from users. Although these measurements may not be done in real-time, they can act as exact functional evaluations (or reference evaluations) for the evolutionary optimization algorithm. The problem with measuring user satisfaction is the associated cost. Collecting data and extracting user satisfaction information is expensive and time-consuming. Due to the nature of wireless network applications, wireless networks are designed to make decisions in real-time. Therefore, for practical reasons, real-time network decisions should not be dependent on captured user satisfaction. Evolutionary optimization of wireless network problems will not be able to afford thousands of real-time evaluations required by EAs. Instead, surrogate models, which are comparatively faster and rely on historical data and user patterns to predict user satisfaction values in real-time, may be very useful in implementing personalized wireless networks.

2) Dynamically Evolving User Satisfaction Models

User expectations of wireless networks change dynamically with several factors that constitute multi-variate contexts. Also, the speed of behavioral changes can be in the order of seconds, which imposes another limitation on the modeling process of user behavior in wireless networks. Although user patterns may be repetitive in their short term behavior and expectations, their long term behavior and satisfaction patterns can change. This can be explained by different factors, such as age, professional development, career type, etc., which are usually accompanied by interest changes. Since the surrogate models are built using ML models, and are continuously trained and validated through user feedback data, they are able to capture the short term changes in user behavior patterns as well the behavioral changes over the long run. This ensures the dynamic design and adaptivity of the network.

B. Management of Surrogates in Personalized Networks

Management of surrogates, which involves the process of using and updating the models, plays a major role in maintaining acceptable performance of surrogate-assisted optimization [67]. Generally, surrogate models are assumed to be of high fidelity; hence, exact fitness functions are not utilized in evolutionary optimization computations. Nevertheless, this approach can result in convergence to incorrect solutions [68]. In the present invention, the OPA problem does not have an exact fitness function, such that the implemented MOEAs are solely dependent on the approximated ML-based surrogates. FIG. 38, illustrates the proposed framework for solving the OPA problem using evolutionary computation. As shown in FIG. 38, the proposed framework relies on the trained ML-based user satisfaction surrogates to compute the satisfaction fitness values during the optimization process. Even though the exact fitness function for user satisfaction behavior in personalized wireless networks does not exist, user satisfaction feedback may be measured and utilized to enhance the accuracy of the implemented surrogates and prevent the network from converging to inaccurate solutions. As shown in FIG. 38, user satisfaction feedback is measured and fed back to the surrogate model in order to actively validate and correct inaccurate solutions produced by the optimizer. Also, the surrogate model uses continuously arriving data samples to learn and enhance its performance. Moreover, when the measured user satisfaction levels do not match the optimized targeted levels by the optimizer, as illustrated in FIG. 38, the proposed framework may gradually increase/decrease the provided resources to the user by $R_d$ while continuously measuring the actual user satisfaction levels. Then, the collected user satisfaction behavior data at that particular context is used to enhance the performance of the approximated ML-based satisfaction surrogate. This process prevents wireless networks from continuously providing services to users with satisfaction levels that do not meet the service providers' standards and requirements.

FIG. 38 depicts the management data flow and decision making in the personalized wireless network of the present invention. User context data, such as time, GPS, and location are collected from each user (405), generally from sensors in the User's device such as microphones or cameras, or from the operating system of the device via an API. This is followed by predictions and modeling of user satisfaction being performed for different values of QoS by the trained ML user satisfaction models (410). The ML model is used as input to the fitness function of the optimization problem (415). The fitness function consists of two objective functions shown in equations (9a) and (10a). The evolutionary optimization algorithm uses the fitness function to find the optimum allocation of resources (420). To continuously validate the output of the optimization algorithm, select instances are evaluated by the user (in a non-intrusive manner) in order to find the actual user satisfaction level for the provided QoS (425). The actual user satisfaction levels are then measured and extracted from user sensor data (430). If the actual satisfaction measured matches the predicted user satisfaction by the ML model used by the optimization problem, the network will feed this data back to the model to continuously train and improve (435).

If the actual satisfaction measured does not match the predicted user satisfaction by the ML model used by the optimization problem, the network should increase QoS by $R_d$ and continuously measure the actual user satisfaction levels until the required satisfaction level for the user is achieved by the network (440).

Finally, the network will update the ML satisfaction prediction model based on the new collected user satisfaction feedback from the user (reiteration of 430). Notably, only a small number of instances are re-evaluated and validated by the real user satisfaction behavior in the network. In one example of the invention, the number of re-evaluations is a variable that is optimized by the network based on the accuracy of the predictor being used and based on other variables in the environment. In addition, the algorithm to choose the number of re-evaluations variable can be a combination of the uncertainty of predictions (which can be evaluated for many ML algorithms) and the last time the predictions were validated (i.e., periodic checks) to ensure that the system is providing the correct satisfaction level to the user.

C. Surrogate Model Design and Performance

Various ML models can be utilized to build surrogates, including linear models, support vector machines [69], and Gaussian processes [70]. The present invention utilizes a big data-driven framework to build ML-based surrogate models in order to predict user satisfaction in wireless networks. The proposed framework is designed to automate the process of data collection, preprocessing, prediction, and validation, which maintains a seamless integration with the highly dynamic design of wireless networks. For the present invention, DNNs are adopted to capture the complicated patterns that exist within the collected user data. Advantages of employing DNNs to model and predict user satisfaction levels in wireless networks include, but are not limited to, scalability and ability to automate feature extraction from data having complex structures and correlations. A simple DNN model suitable for the present invention comprises four layers as follows:

First hidden layer (Layer 2): 128 neurons.
Second hidden layer (Layer 3): 32 neurons.
Third hidden layer (Layer 4): 16 neurons.
Fourth hidden layer (Layer 5): 8 neurons.

Data fed into the model are pre-processed using several steps including scaling, encoding, and balancing. Details of the implemented preprocessing steps for the personalized networks dataset suitable for the present invention are presented in [66]. Table VII summarizes the performance of the utilized DNN model from a 10-fold cross-validation test.

TABLE VII

Performance of the adopted DNN design in terms of accuracy
Accuracy of individual folds in %

| fold-1 | fold-2 | fold-3 | fold-4 | fold-5 | fold-6 | fold-7 | fold-8 | fold-9 | fold-10 |
|---|---|---|---|---|---|---|---|---|---|
| 95.45 | 95.76 | 94.61 | 95.66 | 95.64 | 94.93 | 95.46 | 95.54 | 95.30 | 95.41 |

| Average Accuracy | Std. of Accuracy |
|---|---|
| 95.38% | 0.34% |

Figure 39:
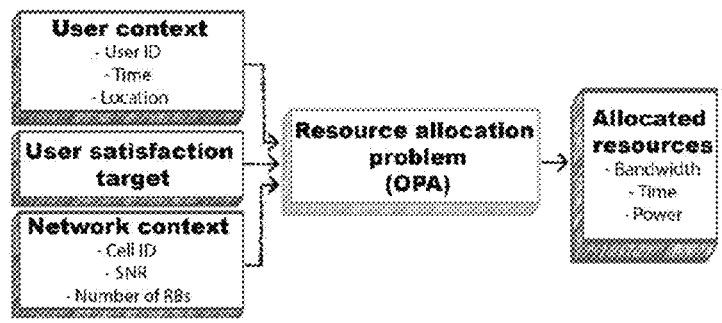
FIG. 39 presents a schematic diagram showing inputs and outputs of the Optimum Personalized Resource Allocation (OPA) problem for wireless networks.

V. Data-Driven Multi-Objective Optimization of Resources in Personalized Wireless Networks As shown in FIG. 39, the resource allocation algorithm for personalized wireless networks accepts two groups of inputs, user context values, and network/system context values. User context, as used herein, is a set of variables that affect user satisfaction behavior in the network such as user ID, time, location, speed, application, and $QoS_d$. Network context, as used herein, is the set of network variables that affect network conditions, such as noise power, channel gain, Signal to Noise Ratio (SNR), packet rate, and throughput. Taking into consideration user and network context, each user is assigned a set of Resource Blocks (RBs) determined based on the predicted user satisfaction behavior at each particular instant. The resource allocation algorithm will output the optimum set of RBs for each user such that the required satisfaction level is achieved using the minimum amount of resources.

A. Problem Description

Usually, resource scheduling problems for networks are modeled as an optimization problem with a single objective that maximizes throughput, spectral efficiency, or fairness under certain constraints. It has also been proposed that the objective could be a trade-off between throughput/spectral efficiency and fairness [71]. In this document, OPA is modeled as a MOO problem. MOO problems are used to model optimization problems with more than one conflicting objective. OPA is defined as a bi-objective optimization problem that maximizes two conflicting objective functions: the total $\Delta$ ($QoS_d$–$QoS_p$) for all users, which represents the amount of saving in network resources, and the average satisfaction for all users. Typically, MOO problems are solved by finding the set of mutually non-dominant solutions called the Pareto front. Since, in a Pareto front solution set, there is no solution better than the other as all solutions trade off the conflicting objective functions [72] the network can make granular personalized resource allocation decisions using MOO, along with the available satisfaction data for each user, to ensure that the required satisfaction level is achieved with the minimum cost (i.e., resources).

B. Problem Formulation

1) System Model

Let $B=\{1, 2, \ldots, B\}$ eNBs (evolved NodeBs are base stations which are operable to handle radio resource management and handover decisions) available in the network. The number of user equipment connected to eNB b is denoted by $U_b=\{u_{(1,b)}, u_{(2,b)}, \ldots, u_{(I_b,b)}\}$, where $I_b$ is the number of users connected to eNB b. Without loss of generality, $I_b$ is assumed to be constant for all $b \in B$. For each eNB $b \in B$, the number of available RBs (resource blocks) is denoted by $N=\{n_1, n_2, \ldots, N\}$. We define $h_{b,u_b}^{(n)}$ where $u_b \in U_b$, as the link gain between eNB b and $u_b$ over RB n. The Power Signal to Interference Noise Ratio (SINR) between eNB b and $u_b$ over RB n is as follows:

$$\gamma_{b,u_b}^{(n)} = \frac{P_{b,u_b}^{(n)} h_{b,u_b}^{(n)}}{\sum_{\forall u_b \in U_b, j \neq b, j \in B}^{n} P_{b,u_b}^{(n)} h_{b,u_j}^{(n)} + N_0 B_{RB}}, \quad (1)$$

where $P_{b,u_b}^{(n)}$ is the power assigned for the link between b and $u_b$ over RB n for all $b \in B$, $N_0$ denotes the thermal noise, and $B_{RB}$ is the resource block bandwidth. The power allocation vector for user i connected to eNB b is $\mathcal{P}_{b,u_b}=[P_{b,u_b}^{(1)}, P_{b,u_b}^{(2)}, \ldots, P_{b,u_b}^{(N)}]$, simplicity, it is assumed that interference between cells is negligible and SINR for all $b \in B$ is reduced to the following SNR:

$$\gamma_{b,u_b}^{(n)} = \frac{P_{b,u_b}^{(n)} h_{b,u_b}^{(n)}}{N_0 B_{RB}}. \quad (2)$$

The achievable downlink data rate for all $u_b \in U_b$ over RB n is given by $$r_{b,u_b}^{(n)} = B_{RB} \log_2(1+\gamma_{b,u_b}^{(n)}). \quad (3)$$

2) Solution Encoding: Resource Block and Power Allocation

The RB allocation indicator is denoted by binary decision variable $x_{u_b}^{(n)} \in \{0,1\}$ where $$x_{u_b}^{(n)} = \begin{cases} 1, & \text{if } RB\ n \text{ is assigned to } u_b, \\ 0, & \text{otherwise}. \end{cases} \quad (4)$$

The RB allocation vector for user $u_b$ connected to eNB b is $\mathcal{X}_{u_b}=[x_{u_b}^{(1)}, x_{u_b}^{(2)}, \ldots, x_{u_b}^{(N)}]$ In each frame, the total rate achieved by $u_b$ over the allocated RBs is given by $$\mathcal{R}_{u_b} = \sum_{n=1}^{N} x_{u_b}^{(n)} r_{b,u_b}^{(n)}, \quad (5)$$

for all $u_b \in U_b$. Consequently, $\Delta_{u_b}$, which refers to the amount of saved resources by user $u_b$, is given by $$\Delta_{u_b} = \mathcal{D}_{u_b} - \mathcal{R}_{u_b}, \quad (6)$$

where $D_{u_b}$ is the rate demanded by user $u_b$ connected to eNB b. The sum of $\Delta_{ub}$ for all $u_b \in U_b$ is given by $$\Delta u_b = \sum_{u_b \in U_b} D_{u_b} - \mathcal{R}_{u_b}. \quad (7)$$

The total rate achieved by all users connected to eNB b is given by $$\mathcal{R}_b = \sum_{u_b \in \mathcal{U}_b} \mathcal{R}_{u_b}. \qquad (8)$$

3) Data Driven Optimization

Let $A_{u_b}$ be a J-dimensional feature space for $u_b$, where $A_{u_b} = [a_{(1,u_b)}, a_{(2,u_b)}, \ldots, a_{(J,u_b)}]$ and $a_{(j,u_b)}$ is the value of feature j for user $u_b$. As mentioned earlier, since personalized satisfaction is predicted using the data collected from users, the output of a satisfaction level $S_{u_b}$ is predicted using the deployed and tuned ML-based surrogate model. The inputs for the surrogate model are user ID, context features $A_{u_b}$, and user demand $D_{u_b}$.

4) Optimization Problem Formulation

In order to solve OPA, a MOO problem can be formulated with two objectives: 1) maximize the average $\Delta_{u_b}$ (i.e., amount of saved resources) for all users and 2) maximize the average satisfaction for all users. The formulated MOO has two decision variables: $\mathcal{X}_{u_b}$ and $P_{u_b}$. Each objective function is associated with a set of constraints and is formulated as follows:

Maximize the Average $\Delta_{u_b}$ for all Users:

$$\max_{\mathcal{X}_{u_b}, \mathcal{P}_{u_b}} \frac{1}{I_b} \sum_{u_b \in \mathcal{U}_b} \left( \mathcal{D}_{u_b} - \sum_{n=1}^{N} x_{u_b}^{(n)} r_{b,u_b}^{(n)} \right), \qquad (9a)$$

s.t.

$$\sum_{u_b \in \mathcal{U}_b} x_{u_b}^{(n)} \leq 1 \,, \forall n \in N \qquad (9b)$$

$$\sum_{u_b \in \mathcal{U}_b} \sum_{n=1}^{N} x_{u_b}^n P_{b,u_b}^n \leq \mathcal{P}_b^{max} \qquad (9c)$$

$$\mathcal{R}_{u_b,b} \leq \mathcal{D}_{u_b} \,, \forall u_b \in \mathcal{U}_b \qquad (9d)$$

$$P_{b,u_b}^{(n)} \geq 0 \,, \forall n \in N, u_b \in \mathcal{U}_b. \qquad (9e)$$

Maximize the Average Satisfaction for all Users:

$$\max_{\mathcal{X}_{u_b}, \mathcal{P}_{u_b}} \frac{1}{I_b} \sum_{u_b \in \mathcal{U}_b} S_{u_b}(A_{u_b}, \qquad (10a)$$

$$, \left( \mathcal{D}_{u_b} - \sum_{n=1}^{N} x_{u_b}^{(n)} r_{b,u_b}^{(n)} \left( P_{b,u_b}^{(n)} \right) \right), \qquad (10b)$$

s.t.

$$\sum_{u_b \in \mathcal{U}_b} x_{u_b}^{(n)} \leq 1 \,, \forall n \in N \qquad (10c)$$

$$\sum_{u_b \in \mathcal{U}_b} \sum_{n=1}^{N} x_{u_b}^n P_{b,u_b}^n \leq \mathcal{P}_b^{max} \qquad (10d)$$

$$\mathcal{R}_{u_b,b} \leq \mathcal{D}_{u_b} \,, \forall u_b \in \mathcal{U}_b \qquad (10e)$$

$$P_{b,u_b}^n \geq 0 \,, \forall n \in N, u_b \in \mathcal{U}_b. \qquad (10f)$$

$$S_{u_b} \geq S_{min,u_b} \,, \forall u_b \in \mathcal{U}_b. \qquad (10g)$$

The first objective function in (9a) maximizes the average $\Delta_{u_b}$ ($\overline{\Delta u b}$) in order to maximize resource-saving in the network. On the other hand, the second objective function in (10a) maximizes the average satisfaction for all users. Both objective functions contradict each other; hence, the solution set is expected to be a Pareto front, where the optimum points trade-off both objectives.

As for constraints, the first objective function (9a) has four constraints, of which constraint (9b) ensures that each RB is being used by no more than one user during a single instance. Also, the second constraint (9c) prevents each eNB from allocating a total power more than the budget power $P_b^{max}$. The third constraint (9d) limits the rate provided to each user to values less than the demanded rate $Ru_b$,b. The fourth constraint (9e) ensures that the allocated power for each user $P_{b,u_b}^{(n)}$ is a positive value. On the other hand, the second objective function (10a) has five constraints. Constraints (10c), (10d), (10e), and (10f) are similar to the constraints associated with the objective function in (9a). The last constraint (10g) maintains a minimum satisfaction specified for each user. This constraint is added to differentiate among the targeted satisfaction levels for different users; hence, enable the network to provide a wider range of service quality levels and pricing policies.

VI. EMOO of Resources in Personalized Wireless Networks

In the context of the present invention, the implementation of the optimization formulation considers the optimization of the decision variable whereas $P_{u_b}$ is assigned $\mathcal{X}_{u_b}$ a constant value for all users.

A. Solution Encoding

As noted in Section V-B2, an OPA solution for one user is encoded as a binary vector, $\mathcal{X}_{u_b}$ which represents a set of RBs available in the networks. With this in mind, the combined solution for all users is an $I_b \times N$ matrix in the form of $$\mathcal{X}_{sol} = \begin{Bmatrix} x_{u_{(1,b)}}^{(1)} & x_{u_{(1,b)}}^{(2)} & \cdots & x_{u_{(1,b)}}^{(N)} \\ x_{u_{(2,b)}}^{(1)} & x_{u_{(2,b)}}^{(2)} & \cdots & x_{u_{(2,b)}}^{(N)} \\ \cdots & \cdots & \cdots & \cdots \\ x_{u_{(I_b,b)}}^{(1)} & x_{u_{(I_b,b)}}^{(2)} & \cdots & x_{u_{(I_b,b)}}^{(N)} \end{Bmatrix}. \qquad (11)$$

A solution $\mathcal{X}_{u_b}$ is feasible if it meets the constraints associated with both objectives (9a) and (10a).

B. Objective Functions

The proposed OPA problem in Section V-B4 is a bi-objective optimization problem with two objectives (1) average $\Delta_{u_b}$ ($\overline{\Delta u b}$) in (9a) and (2) average satisfaction in (10a). Each solution is evaluated in terms of the aforementioned contradicting objectives. In other words, maximizing user satisfaction will require lower Δs; hence, minimum resource-saving, and vice versa. The final Pareto front solutions trade-off these contradicting objectives.

C. Population Initialization

The population consists of M solutions in the form of $I_b \times N$ matrices. The initial population is generated by drawing the elements of the solution matrices $X_{sol}$ from a random binary uniform distribution.

D. Selected MOEAs

The performance of five MOEAs useful in solving OPA were investigated: non-dominated sorting evolutionary algorithm II (NSGA-II) [73], its successor NSGA-III [74], an indicator-based MOEA called ε-MOEA [75], and SPEA2, which is a multi-objective evolutionary algorithm that incorporates the concept of elitism [76].

E. Evolutionary Operators

Binary tournament selection was used as the selection operator for all algorithms [77]. The Half Uniform Crossover (HUX) operator and bit flip, were utilized for crossover and mutation, respectively [78]. The population size used across all experiments is 100 solutions.

F. Stopping Criteria

In practice, wireless networks make decisions and perform actions in real-time; therefore, decision time is considered a crucial factor in solving OPA. In EMOO, decision time is proportional to the NFEs. Since OPA is a large scale optimization problem, practical systems are required to implement the appropriate techniques in order to meet the associated time constraint and, therefore, the stopping criterion for the implemented simulation is set to a predefined NFEs.

EXAMPLES

The performance of MOEAs described in the previous section in solving the formulated OPA problem were evaluated. The best performing MOEA is used to simulate personalized and non-personalized wireless networks in order to compare them in terms of saved resources and user satisfaction, including the impact of errors and uncertainty introduced by the ML surrogate on the performance of MOEAs. Several experiments to study the complexity and scalability of the proposed optimization problem were also conducted.

The prototype and simulations were done using Python 3.7.6. The DNN model was built using the TensorFlow library. The scikit-learn library was used for preprocessing the data, whereas seaborn and Mat-plotlib were used for visualization purposes. MOO was performed using the Platypus library.

Example 1: Experimental Settings

1) Cellular Network Environment

Consider a cell within a cellular network that covers Ottawa, Canada. The cell has one eNB and is connected to users moving within its coverage area. The area of the cell is divided into a k*k grid. The cellular network environment is simulated using the parameters listed in Table VIII. The cellular network operator collects context data from users and stores it in a database. The collected data are of two types, real-time user satisfaction levels and context values. Measurements are recorded at each measuring instant. The period between two measuring instances is referred to as a Time Slot (TS). The service provider collects data from the users using a TS length of one second, and the amount of resources consumed within each TS is recorded. Also, for the sake of simplicity, it is assumed that all users have the same minimum requirement for user satisfaction.

TABLE VIII

Cellular network simulation parameters

| Parameter name | Parameter value |
| --- | --- |
| Maximum number of available RBs | 100 |
| Number of subcarriers per RB | 12 |
| RB bandwidth ($B_{RB}$) | 180 kHz |
| Carrier frequency | 2 GHz |
| UE thermal noise density | −174 dBm/Hz |
| Grid size (k) | 100 |
| Flat fading | Rayleigh |
| Number of users ($I_b$) | 4 |
| Number of eNBs | 1 |
| $S_{min,ub}$ | 4 |
| $P_{max}$ | 1 Watt |

2) Performance Metrics

The design of MOO metrics usually considers three main performance criteria: capacity, convergence, and diversity [79]. Capacity metrics quantify the ratio (or number) of non-dominated solutions in the solution space S that conforms to the predefined reference set. To measure MOO performance in terms of capacity, the Overall Non-dominated Vector Generation Ratio (NGR) [80] was calculated. NGR describes the capacity ratio of S with respect to R, and is given as $$NGR(\mathbb{S}, \mathbb{R}) = \frac{|\mathbb{S}|}{|\mathbb{R}|}, \quad (12)$$

where |.| is the cardinality or number of elements in the set. In contrast to capacity, convergence metrics measures the proximity of the solution set S to the reference set R. To measure MOO performance in terms of convergence, the Generational Distance (GD) [73] is calculated as follows:

$$GD(\mathbb{S}, \mathbb{R}) = \frac{\left(\sum_{i=1}^{|\mathbb{S}|} d_i^2\right)^{\frac{1}{2}}}{|\mathbb{S}|}, \quad (13)$$

where d is the smallest distance from $s \in S$ to the closest solution in R, and is given as $$d_i = \min_{r \in R} \|F(s_i) - F(r)\|.$$

where $s_i \in S$. The symbol denotes the Euclidean distance and $F=(f_1(s), f_2(s))$, where $f_1$ is defined in (9a) and $f_2$ is defined in (10a). As for measuring the performance of MOO in terms of diversity, the Spacing (SP) metric [81] is calculated as follows:

$$SP(\mathbb{S}) = \sqrt{\sum_{i=1}^{|\mathbb{S}|} \frac{(d_i - h)^2}{|\mathbb{S} - 1|}}. \quad (14)$$

In addition to the aforementioned metrics, the Hypervolume (HV) [82] and the Inverted Generational Distance (IGD) [83], [84] were calculated. HV and IGD measure the performance of MOO in terms of both convergence and diversity. HV is a performance metric for MOO, where it quantifies the volume in the objective space that is dominated by the solution set S. HV is calculated as follows:

$$HV(\mathbb{S}, \mathbb{R}) = \text{volume}\left(\bigcup_{i=1}^{|\mathbb{S}|} v_i\right), \quad (15)$$

where v is the hypercube associated with s∈S, and R is a reference point. On the other hand, IGD is calculated as follows:

$$IGD(\mathbb{S}, |R|) = \frac{\left(\sum_{i=1}^{|P|} d_i^2\right)^{\frac{1}{2}}}{|R|}. \quad (16)$$

It is worth noting that the goal is to maximize HV and SP, whereas GD and IGD are better when they are minimized.

3) Reference Set Generation

Figure 40:
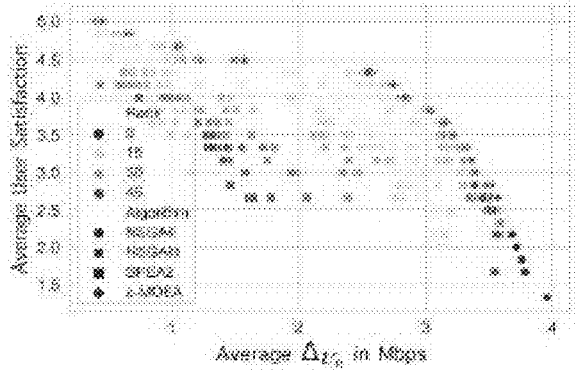
FIG. 40 presents a graph of the generated approximation sets of the Pareto front solutions by the considered MOEA algorithms.
Figure 41:
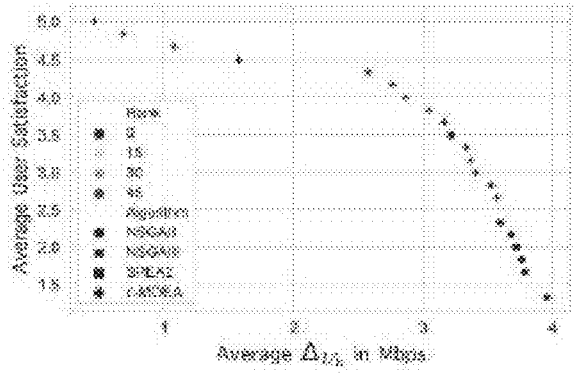
FIG. 41 presents a graph of the non-dominated Pareto front reference solution set extracted from the multiple sets generated by the considered MOEA algorithms.

In order to evaluate the performance and the quality of the Pareto front solutions, these were compared to a Reference set R, which is the Pareto optimal set [87]. Since the optimal set is not known, the best-known approximation of the Pareto optimal set as the reference set was used. The approximation of the optimal Pareto set for each instance is performed using the MOEAs listed in Section VI-D. Each MOEA is run 30 times and the final Pareto front solutions are merged into one set. Then, the set of merged Pareto front solutions is utilized to extract the set of non-dominated solutions, which represents the approximated Pareto front reference set R. Using the simulation parameters in Table VIII, both objectives, the average $\Delta_{ub}$ ($\overline{\Delta ub}$) vs. the average satisfaction for a single exemplary instance, were plotted. For illustrative purposes, the minimum satisfaction allowed in the network was set to $Smin,u_b=1$. FIG. 40 illustrates the generated solution sets by NSGAII, NSGAIII, SPEA2, and ε-MOEA and their computed ranks. The Pareto front solutions are the set of solutions in the merged solution set that have the minimum rank (i.e., rank equal to zero), which are referred to as the non-dominated solutions set. In FIG. 41, the extracted optimum Pareto front solution set is plotted. The Pareto front solutions provide a trade-off between both objectives. Lower $\overline{\Delta ub}$ values (i.e., a higher amount of consumed resources) offer higher user satisfaction levels in the network. To achieve a certain satisfaction level in the network, the optimum Pareto front solution for each instance is used to find the required minimum amount of resources. Depending on the service provider policy and the required $Smin,u_b$, the personalized network will operate at the Pareto front solution point that achieves the required average satisfaction using the minimum resources. For the instance depicted in FIG. 41, if the required average satisfaction level for all users is 4, $\overline{\Delta ub}$ should be less than or equal to 2.9, which is the maximum (i.e., optimum) $\overline{\Delta ub}$ solution.

Example 2: Statistical Analysis of MOEAs Performance Results

In this experiment, the performance of the considered MOEAs were evaluated and compared in terms of the metrics described in Section VII-A2. Since some of the performance metrics use the reference set R as a parameter, an approximation of the reference set is computed for each instance. In order to test the significance of the performance results obtained in this section, non-parametric tests [85] were used. First, the Friedman N×N procedure was used to validate the existence of statistical differences among the results obtained by all algorithms. The Friedman test examines the null hypothesis ($H_0$) that the performance results for all algorithms come from the same distribution. A significance level (α) of 0.05 was chosen. This means that if p-value is less than 0.05, the $H_0$ is rejected; hence, there exist statistical differences between the algorithms' performance results. Otherwise, $H_0$ cannot be rejected and the samples are likely coming from the same statistical distribution. If the Friedman test suggests the rejection of $H_0$, several post-hoc tests are performed to examine the statistical difference of each algorithm from every other algorithm. The performed post-hoc tests are Conover, Wilcoxon, Nemenyi, and Mann-Whitney [86].

In this experiment, to ensure the consistent performance of the chosen algorithm across all instances, a number of instances $N_m$ from the WPP dataset described in Section II-C were chosen randomly. For each instance, MOEAs described in Section VI-D were run to solve the formulated OPA problem. Then, the performance metrics described in Section VII-A2 were computed. To ensure the statistical significance of the performance results for each instance, this process is repeated $N_s$ times for each instance in the selected $N_m$ instance set. Thereafter, the mean of each performance metric and for each algorithm is computed over all $N_s$ runs. The computed mean data are used to compare the algorithms.

1) Sample Size Sufficiency

Figure 42A:
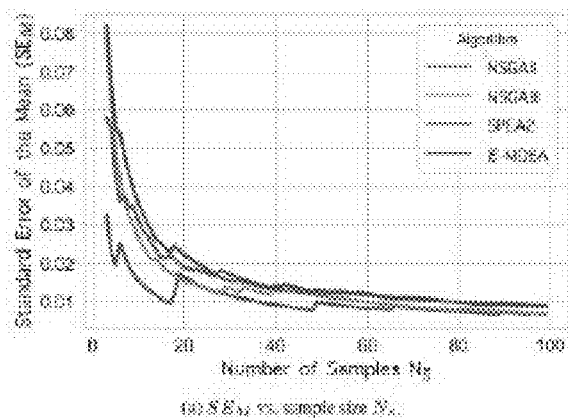
FIGS. 42a and 42b present graphs of the Standard Error of the Mean (SEM) vs. sample sizes, FIG. 42a showing SEM vs. sample size NS and FIG. 42b showing SEM vs. sample size Nm.
Figure 42B:
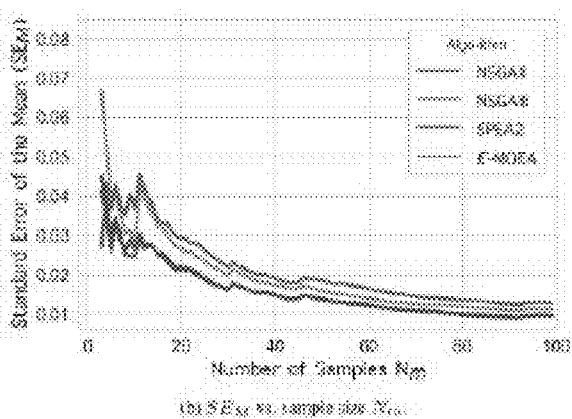

Before proceeding with the performance results comparison, it is important to determine whether the sample size is large enough to support the experiment. This has to do with the fact that too small a sample size may produce inconclusive results. In the literature, different sample sizes are used, yet a clear justification of the selection is rarely provided. One approach to choose a sufficient sample size $N_m$ and $N_s$ is to examine their relationship with the Standard Error of the Mean ($SE_M$), given as:

$$SE_M = \frac{\sigma}{\sqrt{n}}, \quad (17)$$

where σ is the sample standard deviation and n is the number of samples [87]. A maximum $SE_M$ of 0.05 was chosen. In FIG. 42a and FIG. 42b, the $SE_M$ for the sample sizes $N_m$ and $N_s$, respectively, were computed and plotted. Using the $SE_M$ data in FIG. 42a and FIG. 42b, a value of 30 samples was chosen for $N_s$ and $N_m$, which achieves $SE_M$ lower than 0.05.

2) Statistical Analysis

Using the chosen $N_s$ and $N_m$ values, the described statistical analysis experiment was performed. Table IX summarizes the statistical and Friedman test results of the performed experiment. The Friedman test results show that the p-value for all performance metrics are less than α=0.05; hence, the test rejects $H_0$ and accepts the alternative hypothesis $H_a$. Consequently, Friedman test results suggest that, for each performance metric, there is a significant statistical difference among the metric values calculated for all algorithms.

TABLE IX

Statistical and Friedman test results

| Metric | | Algorithms | | | | p-value | Statistics |
|---|---|---|---|---|---|---|---|
| | | NSGAII | NSGAIII | SPEA2 | ε-MOEA | | |
| HV | Rank | 3.520 | 3.880 | 1.970 | 4.580 | <0.001 | 336.184 |
| | Mean | 0.504 | 0.507 | 0.367 | 0.535 | | |
| | Max | 0.721 | 0.723 | 0.629 | 0.722 | | |
| | Min | 0.213 | 0.199 | 0.012 | 0.266 | | |

TABLE IX-continued

Statistical and Friedman test results

| Metric | | Algorithms | | | | p-value | Statistics |
|---|---|---|---|---|---|---|---|
| | | NSGAII | NSGAIII | SPEA2 | ε-MOEA | | |
| GD | Rank | 1.460 | 2.600 | 4.940 | 4.000 | <0.001 | 331.808 |
| | Mean | 0.013 | 0.019 | 0.098 | 0.038 | | |
| | Max | 0.051 | 0.054 | 0.048 | 1.086 | | |
| | Min | 0.004 | 0.005 | 0.010 | 0.007 | | |
| IGD | Rank | 2.640 | 2.570 | 4.120 | 1.720 | <0.001 | 164.392 |
| | Mean | 0.221 | 0.217 | 0.318 | 0.192 | | |
| | Max | 0.669 | 0.578 | 1.307 | 0.558 | | |
| | Min | 0.070 | 0.054 | 0.077 | 0.049 | | |
| SP | Rank | 3.120 | 2.080 | 3.985 | 4.810 | <0.001 | 363.668 |
| | Mean | 11.039 | 6.036 | 16.440 | 26.232 | | |
| | Max | 19.728 | 16.882 | 33.966 | 69.815 | | |
| | Min | 4.739 | 1.184 | 0.000 | 3.267 | | |
| NGR | Rank | 3.980 | 2.145 | 5.000 | 2.875 | <0.001 | 388.476 |
| | Mean | 1.168 | 0.627 | 8.094 | 0.675 | | |
| | Max | 2.539 | 0.873 | 15.940 | 0.910 | | |
| | Min | 0.716 | 2.590 | 0.077 | 9.206 | | |
| | API | −3.472 | 2.303 | −5.597 | 3.611 | | |

In order to select the best performing algorithm, the evaluated ranks by the Friedman test were used to compute a new metric, which is referred to as the Algorithm Performance Indicator (API), defined as follows:

$$API = |w_{HV}|e^{j\theta_{HV}}*HV_r + |w_{SP}|e^{j\theta_{SP}}*SP_r + |w_{NGR}|e^{j\theta_{NGR}}*NGR_r + |w_{GD}|e^{j\theta_{GD}}*GD_r + |w_{IGD}|e^{j\theta_{IGD}}*IGD_r$$ (18)

where $HV_r$, $NCR_r$, $CD_r$, $ICD_r$, $SP_r$ are the algorithm ranks of HV, NGR, GD, IGD, and SP. In addition, $|wi|$ and $\theta_i \forall i \in [HV, SP, NCR, CD, ICD]$ are the magnitude and phase of the weight $w_i$. The weights magnitude can be chosen based on the importance of each metric to the requirements of the problem being addressed. Nonetheless, in the context of the present invention, the same weight value of ⅕ was assigned to all weights; hence, all indicators are assumed to be of equal importance in the final score. As mentioned earlier, some metrics are better when their values are higher and others are the opposite. To reflect this in the API score, $\theta=0$ was assigned for the metrics that are better when they are higher (i.e., HV, SP) and $\theta=\pi$ for those that are better when they are lower (i.e., GD, IGD). In comparison to other metrics, NGR could have $\theta=0$ or $\pi$ depending on the value of $NCR_r$. This is because $NCR_r<1$ is indicative of missing non-detected Pareto front solutions, whereas $NCR_r>1$ is indicative of a higher number of detected solutions compared to the reference set solutions R. Therefore, the closer NGR is to 1, the better the quality of the Pareto front solutions. To incorporate this in the API equation, $\theta_{NGR}$ is defined by $$\theta_{NGR} = (1-\beta)\pi,$$ (19)

where β is given by $$\beta = \begin{cases} 0, & NGR > 1 \\ 1, & NGR \leq 1 \end{cases}.$$ (20)

Table IX, lists the API score for each algorithm. Of the four algorithms, ε-MOEA achieved the highest score of 3.611 and was used for the personalized network simulations in the subsequent experiments.

Before accepting the aforementioned results, it should be verified that the statistics for ε-MOEA are significantly different for the other algorithms. To test that, the described pairwise post-hoc tests were performed and results summarized in Table X. Although the post-hoc tests failed to reject $H_0$ for some of the metrics computed for NSGAII and NSGAIII, ε-MOEA showed a significant statistical difference from every other algorithm.

TABLE X

Pairwise comparison of algorithms rejected by the posthoc tests

| Algorithms | HV | GD | IGD | SP | NGR |
|---|---|---|---|---|---|
| NSGAII vs. NSGAIII | | ✓ | | ✓ | ✓ |
| NSGAII vs. SPEA2 | ✓ | ✓ | ✓ | ✓ | ✓ |
| NSGAII vs. ε-MOEA | ✓ | ✓ | ✓ | ✓ | ✓ |
| NSGAIII vs. SPEA2 | ✓ | ✓ | ✓ | ✓ | ✓ |
| NSGAIII vs. ε-MOEA | ✓ | ✓ | ✓ | ✓ | ✓ |
| SPEA2 vs. ε-MOEA A | ✓ | ✓ | ✓ | ✓ | ✓ |

Example 3: Personalized vs. Non-Personalized Wireless Networks

The goal of this experiment is to provide insights into the dynamics of personalized wireless networks and to show how they can be used to save the scarce network resources and improve user satisfaction levels in a controlled manner. The behavior of Surrogate-assisted Personalized Wireless Networks (SPN) is compared to Direct Feedback Personalized Wireless Networks (FPN) (i.e., networks utilizing direct user satisfaction feedback). The latter approach was used as a benchmark to study how user satisfaction surrogates can deteriorate the optimum solutions of OPA, and consequently the resource savings and user satisfaction levels in the network. SPN and FPN are also compared to the Non-Personalized Network (NPN), which tries to maximize the utilization of the available resources and maximize the provided rate. The wireless networks simulated in this section have four active users and NFEs is set to 5000 evaluations. The simulation time frame is set to 50 minutes. The networks described in this section are simulated at a resolution of one second (i.e., TS=1 second) and the optimization of OPA is run at every second within the simulation time frame. For visualization purposes, the results were averaged over 30 second intervals. Notably, the simulated SPN does not employ the surrogate management framework illustrated in FIG. 38.

The first advantage of the personalized networks of the invention is saving resources compared to current wireless networks. The amount of saved resources for both SPN and FPN is measured by $QoS_{NP} - QoS_P$, where $QoS_{NP}$ is the QoS provided by the non-personalized network and $QoS_P$ is the QoS provided by the personalized network, both in Megabits per seconds (Mbps). FIG. 43(a) compares the amount of saved resources for FPN and SPN. Similar trends and patterns were observed between both networks, which is indicative of the validity of the produced solutions by the surrogate-assisted OPA problem. Also, it was observed that the SPN spends fewer resources compared to the FPN; consequently, SPN achieved higher resource-savings. With this in mind, saved resources by the FPN is the maximum achievable amount that does not compromise the required satisfaction levels required by the network operator.

As mentioned earlier, another advantage of personalized networks is maintaining a specific user satisfaction level. In order to analyze the user satisfaction levels achieved by the simulated three networks, in FIG. 43(b) the average satisfaction levels for the four users vs. time were compared for NPN, FPN. Also, for SPN, the average satisfaction levels predicted by the surrogate model (SPN-estimated) were plotted. In order to benchmark the predicted satisfaction results, the actual satisfaction levels measured using direct user feedback (SPN-feedback) were plotted. The first observation from FIG. 43(b) is that the satisfaction levels for NPN and FPN networks are above the specified minimum of $S_{min,Ub}=4$. One important observation from FIG. 43(b) is the gap between the estimated (SPN-estimated) and the actual satisfaction levels for SPN (SPN-feedback). Although the SPN achieved superior amounts of saved resources compared to FPN (see FIG. 43(a)), it failed to achieve the required average satisfaction level of 4. This is due to the satisfaction uncertainty introduced by the surrogate model, which led the SPN to further reduce resources below the minimum required to achieve $S_{min,Ub}=4$.

These findings emphasize the importance of an effective surrogate management strategy to avoid the deterioration and divergence of user satisfaction levels resulting from false satisfaction predictions in the network.

Example 4: The Impact of Uncertainty Introduced by Surrogates on the Performance of MOEAs Generally, as shown in the previous experiment, the estimation error introduced by surrogates impacts the network's ability to use accurate user satisfaction information in the optimization process. The magnitude of this impact depends on several factors including, but not limited to, the performance of the utilized surrogate model. To further study this assumption, the following experiment was performed. In order to vary the performance level of the surrogate, the amount of training data was gradually increased. The accuracy and the amount of data used for training are recorded for each surrogate model. Then, using the set of trained surrogate models, MOEAs are run to solve the OPA problem. For each surrogate model, each MOEA is run for 30 times; thereafter the average HV is computed. FIG. 44 compares the average HV values for the surrogate models with varying performance levels. As shown in FIG. 44, as the quality of the employed surrogate model improves, the quality of the OPA solutions of all algorithms generally improves with different levels.

Example 5: Scalability Analysis

In order to evaluate the scalability of the proposed formulation, the effect of variables that contribute to the complexity of the problem were explored. For our formulated problem, the number of users $U_b$ determines the size of the problem decision variables; therefore, increases the complexity of the problem. Another factor that impacts the complexity of the problem is the required quality of solutions. Higher quality solutions usually require higher NFEs; thereby, higher amounts of computing resources. In this section, the effect of $U_b$ and NFEs on complexity is explored.

1) The Impact of the Number of Network Users on Complexity

The following experiment was performed to study the effect of the number of network users $U_b$ on OPA. Using a random instance, selected MOEAs considered are run 30 times for varying number of users $U_b$. NFEs is set to 5000 evaluations for each run. Then, HV is computed and averaged over the 30 runs for each $U_b$. FIG. 45 depicts the averaged HV values vs. the number of users $U_b$ for the considered MOEAs. From FIG. 45, a descending HV trend is observed as the number of users increases. Accordingly, it was concluded that, as the complexity of the problem increases, the quality of the output solutions decreases for a fixed amount of computing resources.

2) The Impact of the Required Solution Quality on Complexity

Figure 46:
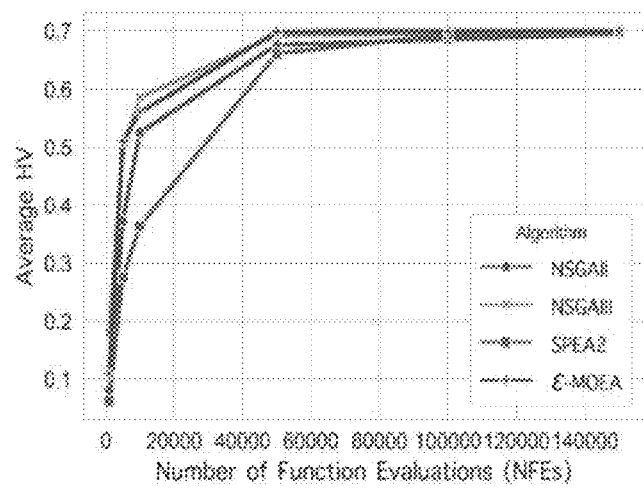
FIG. 46 presents a graph showing the Number of Function Evaluations (NFEs) vs. average HV for NSGAII, NSGAIII, SPEA2, and ε-MOEA.

In order to further improve the quality of the solutions as the complexity of the problem increases, MOEAs need a higher number of evaluations for each run; hence, more computing resources are required. In order to investigate this assumption, using a random instance, the average HV with varying NFEs was computed. In this experiment, the number of network users is fixed at 6 users. FIG. 46 compares the average HV vs. NFEs for the considered MOEAs. As anticipated, the HV values rise as the NFEs increase. After a certain NFEs limit, the average HV stagnates. In practice, the network should be able to decide the optimum NFEs in order to optimize the utilization of computing resources and make the computations more efficient. Usually, the optimum NFEs depends on several factors, including the network environment, the number of users, and the selected MOEA algorithm.

Conclusions

The complexity and the requirements of the emerging 5G and beyond applications make AI and ML a valuable tool for managing wireless networks. The strategy of the invention is to optimize two correlated and contradicting objectives: saving resources as well as maintaining high levels of user satisfaction. To this end, enabled by a big data-driven AI layer, wireless network personalization is proposed to optimize these two objectives, and thereby make fine-grained optimized decisions in networks. Due to the complexity and novelty of the proposed technology, several challenges had to be overcome. This document presented discussions on several design-related issues, including the integration of personalization into current wireless networks and modeling user satisfaction in wireless networks. The document focused on the decision-making process, which is part of the wireless network personalization framework. Particularly, a MOO formulation is described which models the personalized resource allocation problem in wireless networks. The proposed MOO problem was solved using evolutionary optimization due to its practicality and speed. Also, statistical analysis was conducted to verify the significance of the obtained results in this study. Using a dataset that represents a personalized wireless network environment, a simulation proof-of-concept prototype was built to solve the formulated problem. The prototype was utilized to demonstrate the benefits of implementing personalized networks in contrast to non-personalized networks. Also, the effect of uncertainty introduced by the ML surrogate models was examined. Lastly, a scalability analysis was performed to investigate the effect of increasing the number of problem variables, such as the number of users, on the complexity and quality of solutions.

Commercial Assessment

Future wireless networks, along with their ability to connect billions of devices with very high QoS, are expected to remain a profitable business. In order to prepare for this huge expected demand in mobile broadband, there is a need to find ways to optimize network resources efficiently. If network users continue to pay, on average, the same amount for their network subscription, profit will decrease rapidly until the cost per gigabyte (GB) overruns the profit per GB. One important lever to address this and to ensure that mobile broadband remains affordable will be to reduce the Total Cost of Ownership (TCO) per GB.

Two factors are fundamental to reducing TCO: production cost per GB and revenue per GB. There are many approaches used to reduce production cost per GB, such as increasing network energy efficiency. Although reducing production cost per GB is effective, the most powerful way to reduce TCO and to increase profitability is to find new revenue streams in order to increase the revenue per GB. One of the current adopted ways to increase revenue is maximizing network resources utilization through sharing resources in all aspects and dimensions. However, there are further effective ways to empower operators to better monetize their assets and resources. On one hand, the rapidly improving technology could enable operators to adopt new business models with an increased level of granularity. Technology could allow for a more detailed decision-making process to utilize resources in the most cost-effective way. On the other hand, current network subscription plans are described as All You Can Eat Data plans (AUCED) where end users are allowed to use the network as much as they like without the worry of extravagant charges. Such plans are profitable but definitely do not maximize profit. Operators currently adopt a fair resource allocation scheme where user perception of good QoS is not taken into consideration. New technologies could enable operators to I) adopt micro-plans instead of AUCED plans and II) adopt personalized instead of fair resource allocation schemes. Personalizing the network experience is a key enabler for the adoption of such micro plans.

As explained above, current wireless telecommunication networks are over-provisioned to achieve an unnecessarily high QoS value that would be acceptable to most users. This non-granular, average-based, single objective approach is currently adopted by all operators. In contrast, embodiments of the invention provide network operators with improved flexibility of operation in terms of personalized user satisfaction (rather than one averaged satisfaction value good for most users) and the amount of consumed resources.

Embodiments of the invention also provide at least the following advantages:
1) Personalized networks are able to efficiently exploit network resources in order to achieve the ultimate balance between user experience and profit.
2) The multi-objective formulation of the optimization problem will give operators the flexibility to choose the most suited operating point depending on many factors.
3) Personalization can enable better crisis management by allowing operators to move the operating point to lower satisfaction values and utilize resources for more critical applications.
4) Personalized networks allow operators to maintain a certain user satisfaction level and hence maintain their customers retention by meeting their expectations.
5) Personalized networks can enable operators to attract more customers with a variety of service price preferences. In other words, user satisfaction can be personalized to each user based on the service price charged by the operator.
6) Personalized networks result in better user experience which yields a win-win situation for both operators and users.

The technology and framework proposed for wireless network can be applied to any network with users (e.g., wired network and WiFi). In addition, it can be applied to other businesses and applications that require user feedback to improve the service. However, for the purpose of our work, we engineered the features in our ZoT model to fit wireless networks.

Embodiments of the invention can be integrated to the current networks at no extra cost in terms of infrastructure. However, there may be extra computation power needed to operate the network. In addition, user feedback should be captured, quantified and labeled based on the proposed ZoT mode. Many companies could have interest in this technology especially in the telecom industry, including, for example: incumbent network operators, incumbent network equipment vendors and manufacturers, new entrants to wireless and networking systems, and companies in the big data and data analytics industry.

Additional Options and Alternatives

The present invention has been described with regard to one or more embodiments. However, it will be apparent to persons skilled in the art that a number of variations and modifications can be made without departing from the scope of the invention as defined in the claims.

While these embodiments focus on the two primary objectives: i) maximize average user satisfaction ii) minimize the allocated resources by the network, it is clear that other implementations of the system may include the following:
1) automate hyper parameter tuning and machine learning model selection;
2) augment and semi-synthesize a big data dataset with many users and user personas;
3) develop a distributed parallelized version of the algorithms and optimizers;
4) use customized heuristic and metaheuristics algorithms to solve the formulated multi-objective problem;
5) use a different satisfaction mapper function to replace the stair function;
6) modeling satisfaction as a continuous value;
7) use different ML design models to achieve persona and user satisfaction prediction;
8) adding different context features to the dataset design. The more features, the more accurate results are achieved by the ML models; and
9) using different multi-objective formulations to achieve the same goal. The goal of the multi-objective optimizer is to provide service providers with a Pareto-front solution. This solution trades off satisfaction with the amount of recourse required. The optimizer provides service providers with the flexibility to choose a personalized user satisfaction target for each user and find the minimum amount of resources to achieve this target.

The teachings described herein need not be limited to wireless networks or even to communication networks. The framework and functionality of extracting and/or predicting context and user satisfaction in an unobtrusive way, in real time, can be applied in a broad range of applications. At the very least, these applications would include connected and autonomous vehicles, battlefield (tactical) scenarios, gaming and wearables (AV/RV, haptics, etc.) In fact, the teachings set out herein can be applied to any context in which application delivery can be fined-tuned in real-time based on a number of factors including the end user's likes/dislikes, ambiance, circumstances, mood, how much she/he is willing to pay, etc.

Conclusions:

The method steps of the invention may be embodied in sets of executable machine code stored in a variety of formats such as object code or source code. Such code may be described generally as programming code, software, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments of the invention may be executed by a computer processor or similar device programmed in the manner of method steps, or may be executed by an electronic system which is provided with means for executing these steps. Similarly, an electronic memory medium such as computer diskettes, hard drives, thumb drives, CD-Roms, Random Access Memory (RAM), Read Only Memory (ROM) or similar computer software storage media known in the art, may be programmed to execute such method steps. As well, electronic signals representing these method steps may also be transmitted via a communication network.

All citations are hereby incorporated by reference.

REFERENCES

[1] R. Schoenen and H. Yanikomeroglu, "User-in-the-loop: spatial and temporal demand shaping for sustainable wireless networks," IEEE Commun. Mag., vol. 52, no. 2, pp. 196-203, February 2014.

[2] Y. Bao, H. Wu, and X. Liu, "From prediction to action: Improving user experience with data-driven resource allocation," IEEE J. Sel. Areas Commun., vol. 35, no. 5, pp. 1062-1075, May 2017.

[3] X. Hu, J. Cheng, M. Zhou, B. Hu, X. Jiang, Y. Guo, K. Bai, and F. Wang, "Emotion-aware cognitive system in multi-channel cognitive radio ad hoc networks," IEEE Commun. Mag., vol. 56, no. 4, pp. 180-187, April 2018.

[7] C. Corneanu, F. Noroozi, D. Kaminska, T. Sapinski, S. Escalera, and G. Anbarjafari, "Survey on emotional body gesture recognition," IEEE Transactions on Affective Computing, pp. 1-1, October 2018.

[9] S. Li and W. Deng, "Reliable crowdsourcing and deep locality-preserving learning for unconstrained facial expression recognition," IEEE Trans. Image Process., vol. 28, no. 1, pp. 356-370, September 2018.

[10] A. Parasuraman, V. A. Zeithaml, and L. L. Berry, "A conceptual model of service quality and its implications for future research," The Journal of Marketing, pp. 41-50, October 1985.

[11] A. Kaloxylos, "A survey and an analysis of network slicing in 5G networks," IEEE Communications Standards Magazine, vol. 2, no. 1, pp. 60-65, March 2018.

[13] P. Christen and A. Pudjijono, "Accurate synthetic generation of realistic personal information," in Proc. 2009 Pacific-Asia Conference on Knowledge Discovery and Data Mining, Bangkok, Thailand, April 2009, pp. 507-514.

[14] R. Alkurd, I. Abualhaol, and H. Yanikomeroglu. A synthetic user behavior dataset design for data-driven AI-based personalized wireless networks. [Online]. Available: https://github.com/rawanalkurd/Personalization-Framework-Datasets.

[15] D. Anguita, A. Ghio, L. Oneto, X. Parra, and J. L. Reyes-Ortiz, "A public domain dataset for human activity recognition using smartphones." in Proc. 2013 European Symposium on Artificial Neural Networks, Computational Intelligence and Machine Learning (ESANN), Bruges, Belgium, April 2013, pp. 437-442.

[16] R. Kwan, C. Leung, and J. Zhang, "Resource allocation in an LTE cellular communication system," in Proc. of the IEEE International Conference on Communications (ICC), 2009, pp. 1-5.

[17] A. Parasuraman, V. A. Zeithaml, and L. L. Berry, "Alternative scales for measuring service quality: A comparative assessment based on psychometric and diagnostic criteria," Journal of Retailing, vol. 70, no. 3, pp. 201-230, 1994.

[18] H. Gjoreski, M. Ciliberto, F. J. O. Morales, D. Roggen, S. Mekki, and S. Valentin, "A versatile annotated dataset for multimodal locomotion analytics with mobile devices," in Proc. of the 15th ACM Conference on Embedded Network Sensor Systems, 2017, p. 61.

[19] R. O. Duda, P. E. Hart, and D. G. Stork, Pattern Classification. John Wiley & Sons, 2012.

[20] R. Alkurd, I. Abualhaol, and H. Yanikomeroglu, "Enabling wireless network personalization using Zone of Tolerance modeling and predictive analytics." U.S. Provisional Pat. Ser. No. 62/724,195, filed on 31, Aug. 2018.

[21] J. Pruitt and T. Adlin, The persona lifecycle: keeping people in mind throughout product design. Elsevier, 2010.

[22] J. Manoogian III and J. Elvekrog, "Targeting users based on persona data," June 2014, U.S. Pat. No. 8,751,305.

[23] M. Haas and W. H. Kunz, "How to master the challenges of service mass customization: A persona-based approach," in Handbook of Research in Mass Customization and Personalization. World Scientific, 2010, pp. 603-621.

[24] B. A. Knott, R. R. Bushey, J. M. Martin, and S. Andrews, "Method, software and system for developing interactive call center agent personas," March 2009, U.S. Pat. No. 7,512,545.

[25] J. Li, M. Galley, C. Brockett, G. P. Spithourakis, J. Gao, and B. Dolan, "A persona-based neural conversation model," arXiv preprint arXiv:1603.06155, 2016.

[26] S. Kujala and M. Kauppinen, "Identifying and selecting users for user-centered design," in Proc. of the Third Nordic Conference on Human-Computer Interaction. ACM, 2004, pp. 297-303.

[27] A. Shahri, M. Hosseini, M. Almaliki, K. Phalp, J. Taylor, and R. Ali, "Engineering software-based motivation: A persona-based approach," in Proc. 2016 IEEE Tenth International Conference on Research Challenges in Information Science (RCIS), June 2016, pp. 1-12.

[28] R. Sinha, "Persona development for information-rich domains," in Proc. CHI'03 Extended Abstracts on Human Factors in Computing Systems. ACM, 2003, pp. 830-831.

[29] F. Tanudjaja and L. Mui, "Persona: a contextualized and personalized web search," in Proc. of the 35th Annual Hawaii International Conference on System Sciences, January 2002, pp. 1232-1240.

[30] J. An, H. Kwak, and B. J. Jansen, "Validating social media data for automatic persona generation," in Proc. 2016 IEEE/ACS 13th International Conference of Computer Systems and Applications (AICCSA), November 2016, pp. 1-6.

[31] N. Tu, X. Dong, P. P. Rau, and T. Zhang, "Using cluster analysis in Persona development," in Proc. 2010 8th International Conference on Supply Chain Management and Information, October 2010, pp. 1-5.

[32] A. Géron, Hands-on Machine Learning with Scikit-Learn and Tensor-Flow: Concepts, Tools, and Techniques to Build Intelligent Systems. O'Reilly Media, Inc., 2017.

[33] A. Coates and A. Y. Ng, "The importance of encoding versus training with sparse coding and vector quantization," in Proc. of the 28th International Conference on Machine Learning (ICML-11), 2011, pp. 921-928.

[34] T. Howley, M. G. Madden, M.-L. O'Connell, and A. G. Ryder, "The effect of principal component analysis on machine learning accuracy with high dimensional spectral data," in Proc. of 2005 International Conference on Inno-

[35] P. Baldi and K. Hornik, "Neural networks and principal component analysis: Learning from examples without local minima," Neural Networks, vol. 2, no. 1, pp. 53-58, 1989.

[36] C. Zhang, P. Patras, and H. Haddadi, "Deep learning in mobile and wireless networking: A survey," IEEE Communications Surveys Tutorials, pp. 1-1, 2019.

[37] M. A. Alsheikh, D. Niyato, S. Lin, H. Tan, and Z. Han, "Mobile big data analytics using deep learning and apache spark," IEEE Network, vol. 30, no. 3, pp. 22-29, May 2016.

[38] P. Reichl, S. Egger, R. Schatz, and A. D'Alconzo, "The logarithmic nature of QoE and the role of the Weber-Fechner law in QoE assessment," in 2010 IEEE International Conference on Communications, May 2010, pp. 1-5.

[39] N. Eswara, S. Ashique, A. Panchbhai, S. Chakraborty, H. P. Sethuram, K. Kuchi, A. Kumar, and S. S. Channappayya, "Streaming video QoE modeling and prediction: A long short-term memory approach," IEEE Transactions on Circuits and Systems for Video Technology, pp. 1-1, 2019.

[40] S. Tasaka, "Bayesian hierarchical regression models for QoE estimation and prediction in audiovisual communications," IEEE Transactions on Multimedia, vol. 19, no. 6, pp. 1195-1208, June 2017.

[41] X. Tao, Y. Duan, M. Xu, Z. Meng, and J. Lu, "Learning QoE of mobile video transmission with deep neural network: A data-driven approach," IEEE Journal on Selected Areas in Communications, pp. 1-1, 2019.

[42] M. Lopez-Martin, B. Carro, J. Lloret, S. Egea, and A. Sanchez-Esguevillas, "Deep learning model for multimedia quality of experience prediction based on network flow packets," IEEE Communications Magazine, vol. 56, no. 9, pp. 110-117, September 2018.

[43] X. Tao, C. Jiang, J. Liu, A. Xiao, Y. Qian, and J. Lu, "QoE driven resource allocation in next generation wireless networks," IEEE Wireless Communications, vol. 26, no. 2, pp. 78-85, April 2019.

[44] V. Vasilev, J. Leguay, S. Paris, L. Maggi, and M. Debbah, "Predicting QoE factors with machine learning," in 2018 IEEE International Conference on Communications (ICC), May 2018, pp. 1-6.

[45] P. Makris, D. N. Skoutas, and C. Skianis, "A survey on context-aware mobile and wireless networking: On networking and computing environments' integration," IEEE Communications Surveys Tutorials, vol. 15, no. 1, pp. 362-386, First 2013.

[46] B. Xu, Y. Fu, Y. Jiang, B. Li, and L. Sigal, "Heterogeneous knowledge transfer in video emotion recognition, attribution and summarization," IEEE Transactions on Affective Computing, vol. 9, no. 2, pp. 255-270, April 2018.

[47] C. Wu and W. Liang, "Emotion recognition of affective speech based on multiple classifiers using acoustic-prosodic information and semantic labels," IEEE Transactions on Affective Computing, vol. 2, no. 1, pp. 10-21, January 2011.

[48] K. Wang, N. An, B. N. Li, Y. Zhang, and L. Li, "Speech emotion recognition using fourier parameters," IEEE Transactions on Affective Computing, vol. 6, no. 1, pp. 69-75, January 2015.

[49] N. Fourati and C. Pelachaud, "Perception of emotions and body movement in the emilya database," IEEE Transactions on Affective Computing, vol. 9, no. 1, pp. 90-101, January 2018.

[50] A. Kleinsmith and N. Bianchi-Berthouze, "Affective body expression perception and recognition: A survey," IEEE Transactions on Affective Computing, vol. 4, no. 1, pp. 15-33, January 2013.

[51] Z. Yang and S. S. Narayanan, "Modeling dynamics of expressive body gestures in dyadic interactions," IEEE Transactions on Affective Computing, vol. 8, no. 3, pp. 369-381, July 2017.

[52] C. Qing, R. Qiao, X. Xu, and Y. Cheng, "Interpretable emotion recognition using EEG signals," IEEE Access, vol. 7, pp. 94 160-94 170, 2019.

[53] H. M. Nguyen, E. W. Cooper, and K. Kamei, "Borderline over-sampling for imbalanced data classification," in Proc. fifth International Workshop on Computational Intelligence & Applications, vol. 2009, no. 1. IEEE SMC Hiroshima Chapter, 2009, pp. 24-29.

[54] J. Duchi, E. Hazan, and Y. Singer, "Adaptive subgradient methods for online learning and stochastic optimization," Journal of Machine Learning Research, vol. 12, no. July, pp. 2121-2159, 2011.

[55] D. P. Kingma and J. Ba, "Adam: A method for stochastic optimization," arXiv preprint arXiv:1412.6980, 2014.

[56] N. Srivastava, G. Hinton, A. Krizhevsky, I. Sutskever, and R. Salakhutdinov, "Dropout: a simple way to prevent neural networks from over-fitting," The Journal of Machine Learning Research, vol. 15, no. 1, pp. 1929-1958, 2014.

[57] J. Tang, X. Shu, R. Yan, and L. Zhang, "Coherence constrained graph lstm for group activity recognition," IEEE Transactions on Pattern Analysis and Machine Intelligence, pp. 1-1, 2019.

[58] M. Chen, Y. Zhang, Y. Li, S. Mao, and V. C. M. Leung, "EMC: Emotion-aware mobile cloud computing in 5G," IEEE Network, vol. 29, no. 2, pp. 32-38, March 2015.

[59] R. Alkurd, I. Abualhaol, and H. Yanikomeroglu, "Big data-driven and AI-based framework to enable personalization in wireless networks," IEEE Communications Magazine, vol. 58, no. 3, pp. 18-24, March 2020.

[62] K. Deb, Multi-Objective Optimization Using Evolutionary Algorithms. John Wiley & Sons, 2001, vol. 16.

[63] H. Takagi, "Interactive evolutionary computation: fusion of the capabilities of ec optimization and human evaluation," Proceedings of the IEEE, vol. 89, no. 9, pp. 1275-1296, September 2001.

[64] J. Kim, J. Han, Y. Kim, S. Choi, and E. Kim, "Preference-based solution selection algorithm for evolutionary multiobjective optimization," IEEE Transactions on Evolutionary Computation, vol. 16, no. 1, pp. 20-34, February 2012.

[65] K. Deb, A. Sinha, P. J. Korhonen, and J. Wallenius, "An interactive evolutionary multiobjective optimization method based on progressively approximated value functions," IEEE Transactions on Evolutionary Computation, vol. 14, no. 5, pp. 723-739, October 2010.

[66] R. Alkurd, I. Abualhaol, and H. Yanikomeroglu, "User satisfaction prediction framework for personalized networks: A deep neural network approach," submitted to 2020 IEEE Global Communications Conference (Globecom).

[67] Yaochu Jin and J. Branke, "Evolutionary optimization in uncertain environments—a survey," IEEE Transactions on Evolutionary Computation, vol. 9, no. 3, pp. 303-317, June 2005.

[68] Y. Jin, M. Olhofer, and B. Sendhoff, "On evolutionary optimization with approximate fitness functions," in Proc. 2nd Annual Conference on Genetic and Evolutionary Computation (GECCO). Morgan Kaufmann Publishers Inc., 2000.

[69] I. Loshchilov, M. Schoenauer, and M. Sebag, "A mono surrogate for multiobjective optimization," in Proc. the 12th Annual Conference on Genetic and Evolutionary Computation (GECCO), 2010.

[70] B. Liu, Q. Zhang, and G. G. E. Gielen, "A Gaussian process surrogate model assisted evolutionary algorithm for medium scale expensive optimization problems," IEEE Transactions on Evolutionary Computation, vol. 18, no. 2, pp. 180-192, April 2014.

[71] O. Grøndalen, A. Zanella, K. Mahmood, M. Carpin, J. Rasool, and O. N. Østerbø, "Scheduling policies in time and frequency domains for LTE downlink channel: a performance comparison," IEEE Transactions on Vehicular Technology, vol. 66, no. 4, pp. 3345-3360, April 2017.

[72] J. Cho, Y. Wang, I. Chen, K. S. Chan, and A. Swami, "A survey on modeling and optimizing multi-objective systems," IEEE Communications Surveys Tutorials, vol. 19, no. 3, pp. 1867-1901, May 2017.

[73] K. Deb, A. Pratap, S. Agarwal, and T. Meyarivan, "A fast and elitist multiobjective genetic algorithm: NSGA-II," IEEE Transactions on Evolutionary Computation, vol. 6, no. 2, April 2002.

[74] K. Deb and H. Jain, "An evolutionary many-objective optimization algorithm using reference-point-based non-dominated sorting approach, part I: Solving problems with box constraints," IEEE Transactions on Evolutionary Computation, vol. 18, no. 4, pp. 577-601, August 2014.

[75] M. Basseur and E. Zitzler, "Handling uncertainty in indicator-based multiobjective optimization," International Journal of Computational Intelligence Research, vol. 2, no. 3, pp. 255-272, 2006.

[76] E. Zitzler, M. Laumanns, and L. Thiele, "SPEA2: Improving the strength Pareto evolutionary algorithm," Eidgenössische Technische Hochschule Zürich (ETH), Institut für Technische, Tech. Rep., 2001.

[77] B. L. Miller, D. E. Goldberg et al., "Genetic algorithms, tournament selection, and the effects of noise," Complex systems, vol. 9, no. 3, pp. 193-212, 1995.

[78] A. Zhou, B.-Y. Qu, H. Li, S.-Z. Zhao, P. N. Suganthan, and Q. Zhang, "Multiobjective evolutionary algorithms: A survey of the state of the art," Swarm and Evolutionary Computation, vol. 1, no. 1, pp. 32-49, 2011.

[79] S. Jiang, Y. Ong, J. Zhang, and L. Feng, "Consistencies and contradictions of performance metrics in multiobjective optimization," IEEE Transactions on Cybernetics, vol. 44, no. 12, pp. 2391-2404, December 2014.

[80] D. A. Van Veldhuizen and G. B. Lamont, "On measuring multiobjective evolutionary algorithm performance," in Proc. 2000 Congress on Evolutionary Computation (CEC00), July 2000.

[81] J. R. Schott, "Fault tolerant design using single and multicriteria genetic algorithm optimization." Air force Inst. of Tech. Wright-Patterson AFB OH, Tech. Rep., 1995.

[82] E. Zitzler and L. Thiele, "Multiobjective evolutionary algorithms: a comparative case study and the strength pareto approach," IEEE Transactions on Evolutionary Computation, vol. 3, no. 4, pp. 257-271, November 1999.

[83] H. Li and Q. Zhang, "Multiobjective optimization problems with complicated Pareto sets, MOEA/D and NSGA-II," IEEE Transactions on Evolutionary Computation, vol. 13, no. 2, pp. 284-302, April 2009.

[84] E. Zitzler, L. Thiele, M. Laumanns, C. M. Fonseca, and V. G. da Fonseca, "Performance assessment of multiobjective optimizers: an analysis and review," IEEE Transactions on Evolutionary Computation, vol. 7, no. 2, pp. 117-132, April 2003.

[85] S. Garcia, D. Molina, M. Lozano, and F. Herrera, "A study on the use of non-parametric tests for analyzing the evolutionary algorithms' behaviour: a case study on the cec '2005 special session on real parameter optimization," Journal of Heuristics, vol. 15, no. 6, p. 617, May 2008.

[86] J. Hsu, Multiple Comparisons: Theory and Methods. CRC Press, 1996.

[87] G. W. Brown, "Standard Deviation, Standard Error: Which 'Standard' Should We Use?" American Journal of Diseases of Children, vol. 136, no. 10, pp. 937-941, October 1982. [Online]. Available: https://doi.org/10.1001/archpedi.1982.03970460067015.

What is claimed is:

1. A method of managing wireless network resources, comprising:
   (a) establishing a model to quantize user satisfaction into a number of discrete QoS (Quality of Service) levels; and
   (b) responding to a user request for network resources, by:
      (i) identifying a context of the user request, wherein the context comprises one or more variables which contribute to or shape user satisfaction;
      (ii) determining a predicted satisfaction level based on said identified context, using a surrogate machine learning process;
      (iii) determine a QoS level based on the predicted satisfaction level, by solving an Evolutionary Multi-Objective Optimization (EMOO) problem, wherein the EMOO problem comprises two objectives: maximizing resource savings in the network and maximizing average satisfaction for all users; and
      (iv) satisfying the user request by allocating network resources based on said determined QoS level.

2. The method of claim 1, further comprising:
   (v) capturing user satisfaction feedback; and
   (vi) using said user satisfaction feedback to adjust the surrogate machine learning process.

3. The method of claim 1, wherein QoS comprises at least one metric selected from the group consisting of: data rate, reliability, latency and jitter.

4. The method of claim 1, wherein the context comprises one or more of the parameters: time, day, location, speed, activity, service request arrival, application choice, application service choice, request rate demand, given rate, and $\Delta$ (the difference between desired quality of service level and offered quality service level).

5. The method of claim 2, wherein the surrogate machine learning process comprises an algorithm selected from the group consisting of: a NSGAII (non-dominated sorting evolutionary algorithm II), a NSGAIII (non-dominated sorting evolutionary algorithm III), a SPEA2 (Strength Pareto Evolutionary Algorithm 2), and an $\varepsilon$-MOEA (an indicator-based multi-objective evolutionary algorithm).

6. The method of claim 4, wherein the context parameters are organized into a tree structure.

7. The method of claim 4, wherein the context parameters are organized into multiple tree structures, each of said multiple tree structures being directed to a set of users with similar behavioral patterns or personas.

8. The method of claim 1, wherein the context comprises activity, and activity is predicted using machine learning from data collected using user sensors.

9. The method of claim 1, wherein determining a predicted satisfaction level based on said context further comprises generating a synthetic dataset which provides the predicted satisfaction level for a given set of context values.

10. The method of claim 1, wherein determining a predicted satisfaction level based on said context further comprises generating a dataset which provides the predicted satisfaction level for a given set of context values.

11. The method of claim 10, wherein generating a dataset to provide the predicted satisfaction level for a given set of context values further comprises:
   (a) acquiring context data;
   (b) associating the acquired context data with user satisfaction values; and
   (c) measuring the correlation between the user satisfaction values and the service being used by the user.

12. The method of claim 10, wherein acquiring context data further comprises:
   (a) acquiring context data via monitoring sensors;
   (b) aggregating and analyzing collected data; and
   (c) predicting missing and future context information.

13. The method of claim 10, wherein said user satisfaction values are obtained by capturing and sensing actual user satisfaction levels using sensors including microphones and cameras.

14. The method of claim 1 where user feedback is used to validate the predicted satisfaction level, error data being fed to the predictive model for relearning.

15. The method of claim 1, wherein allocating network resources further comprises allocating network resources as a Pareto-based multi-objective solution.

16. A system for managing wireless network resources comprising:
   (a) a wireless base station;
   (b) a user device operable to communicate with said wireless base station; and
   (c) a wireless network for receiving user communications via said wireless base station;
   wherein said wireless base station is operable to affect the method of claim 1.

17. A system comprising:
   (a) a wireless base station;
   (b) a user device operable to communicate with said wireless base station; and
   (c) a wireless network for receiving user communications via said wireless base station, wherein said wireless network includes an intelligent, big data driven layer, operable to respond to a request for network resources from said user device, by:
      (i) identifying a context of the user request, wherein the context comprises one or more variables which contribute to or shape user satisfaction;
      (ii) determining a predicted satisfaction level based on said identified context, using a surrogate machine learning process;
      (iii) determining a QoS (Quality of Service) level based on the predicted satisfaction level, by solving an Evolutionary Multi-Objective Optimization (EMOO) problem, wherein the EMOO problem comprises two objectives: maximizing resource savings in the network and maximizing average satisfaction for all users; and
      (iv) satisfying the user request by allocating network resources based on said determined QoS level.

18. The system of claim 17, wherein the wireless network is further operable to:
   (v) capture user satisfaction feedback; and
   (vi) use said captured user satisfaction feedback to adjust the surrogate machine learning process.

* * * * *